United States Patent
De Juan, Jr. et al.

(10) Patent No.: US 12,504,648 B2
(45) Date of Patent: Dec. 23, 2025

(54) ASTIGMATISM CORRECTING CONTACT LENSES

(71) Applicant: JOURNEY1, Inc., South San Francisco, CA (US)

(72) Inventors: Eugene De Juan, Jr., South San Francisco, CA (US); Yair Alster, Tel Aviv (IL); Barak Azmon, Tel Aviv (IL); Yoni Manor, Haifa (IL); Omer Rafaeli, Rishpon (IL); Matt Clarke, South San Francisco, CA (US); Jonathan Shahar, Tel Aviv (IL)

(73) Assignee: JOURNEY1 INC, South San Francisco, CA (US)

( * ) Notice: Subject to any disclaimer, the term of this patent is extended or adjusted under 35 U.S.C. 154(b) by 0 days.

(21) Appl. No.: 18/830,986

(22) Filed: Sep. 11, 2024

(65) Prior Publication Data

US 2025/0004303 A1 Jan. 2, 2025

Related U.S. Application Data

(63) Continuation of application No. PCT/US2023/015167, filed on Mar. 14, 2023.
(Continued)

(51) Int. Cl.
  *G02C 7/04* (2006.01)
(52) U.S. Cl.
  CPC .................................. *G02C 7/049* (2013.01)
(58) Field of Classification Search
  CPC ........ G02C 7/049; G02C 7/047; G02C 7/048; G02C 7/04; G02C 7/043; G02C 7/045;
  (Continued)

(56) References Cited

U.S. PATENT DOCUMENTS

| | | | | |
|---|---|---|---|---|
| 5,104,213 A | * | 4/1992 | Wolfson | G02B 1/043 351/159.02 |
| 6,036,314 A | * | 3/2000 | Wolfson | G02C 7/04 351/159.02 |

(Continued)

FOREIGN PATENT DOCUMENTS

EP 3893045 10/2021

OTHER PUBLICATIONS

NPL—International Preliminary Report on Patentability dated Sep. 26, 2024 in respect of PCT/US2023/015167.
(Continued)

*Primary Examiner* — Mustak Choudhury
(74) *Attorney, Agent, or Firm* — Mark S. Cohen; PEARL COHEN ZEDEK LATZER BARATZ LLP

(57) ABSTRACT

The present disclosure is directed to contact lenses for the correcting a refractive error, particularly astigmatism, and other corneal irregularities. An exemplary lens comprises an inner portion, a peripheral portion, and a juncture therebetween. The inner portion provides optical correction for an eye. The peripheral portion conforms to a corneal surface of the eye. The juncture is a structurally flexible portion of the ophthalmic lens such that deformation of the peripheral portion in response to conforming to an astigmatism or higher order aberration of the corneal surface does not substantially deform the inner portion. When the lens is placed on the eye, the inner portion vaults over the corneal surface to form a lenticular volume. The optical correction is provided by a combination of the inner portion and the lenticular volume.

29 Claims, 19 Drawing Sheets

Related U.S. Application Data

(60) Provisional application No. 63/377,709, filed on Sep. 29, 2022, provisional application No. 63/332,583, filed on Apr. 19, 2022, provisional application No. 63/329,959, filed on Apr. 12, 2022, provisional application No. 63/319,885, filed on Mar. 15, 2022, provisional application No. 63/319,473, filed on Mar. 14, 2022, provisional application No. 63/319,477, filed on Mar. 14, 2022, provisional application No. 63/319,484, filed on Mar. 14, 2022.

(58) Field of Classification Search
CPC .......... G02C 7/022; G02C 7/00; G02C 7/041; G02C 7/024; G02C 2202/08; G02C 2202/16; G02C 2202/06; G02C 7/044; G02C 2202/24; G02B 27/0025; G02B 1/043; A61B 5/0002; A61B 5/6821; A61B 5/742

See application file for complete search history.

(56) References Cited

U.S. PATENT DOCUMENTS

| | | |
|---|---|---|
| 7,040,757 B2 | 5/2006 | Hall |
| 2004/0182179 A1 | 9/2004 | Metzger |
| 2013/0314665 A1 | 11/2013 | Tung |
| 2015/0077701 A1* | 3/2015 | de Juan, Jr. ............ G02C 7/022 351/159.04 |
| 2015/0138500 A1* | 5/2015 | de Juan, Jr. ............ G02C 7/047 351/159.04 |
| 2016/0370603 A1* | 12/2016 | de Juan, Jr. ............ G02C 7/047 |
| 2021/0181530 A1* | 6/2021 | Alster .................... G02C 7/049 |
| 2021/0240010 A1* | 8/2021 | Portney ................. G02C 7/083 |

OTHER PUBLICATIONS

NPL—Pietraszkiewicz et al (2015). Junctions in shell structures: A review. Thin-Walled Structures, 95, 310-334.

\* cited by examiner

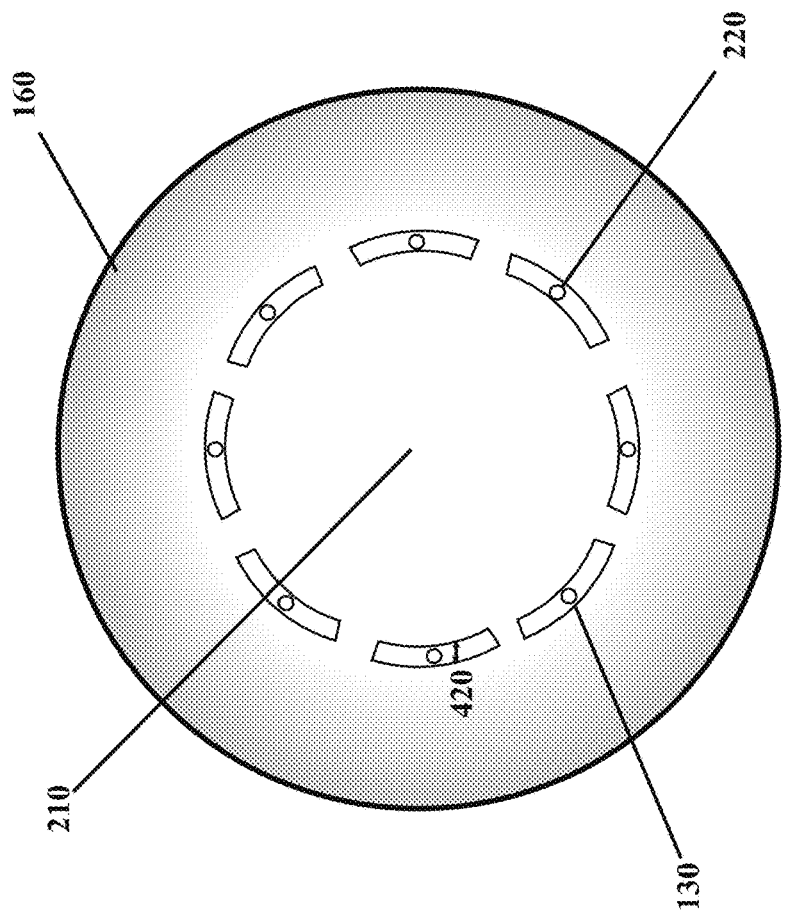
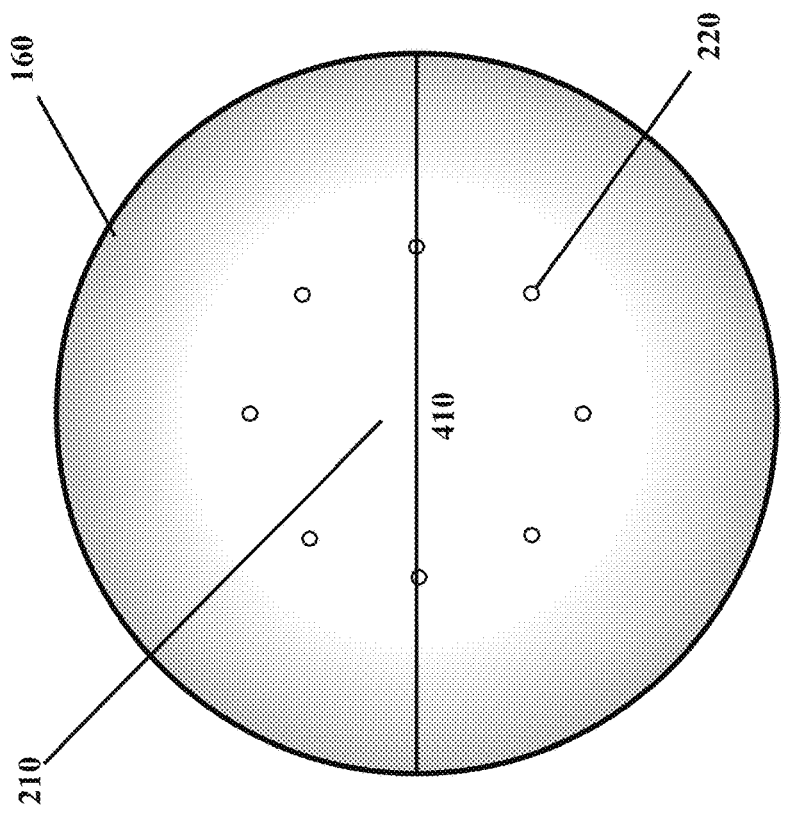

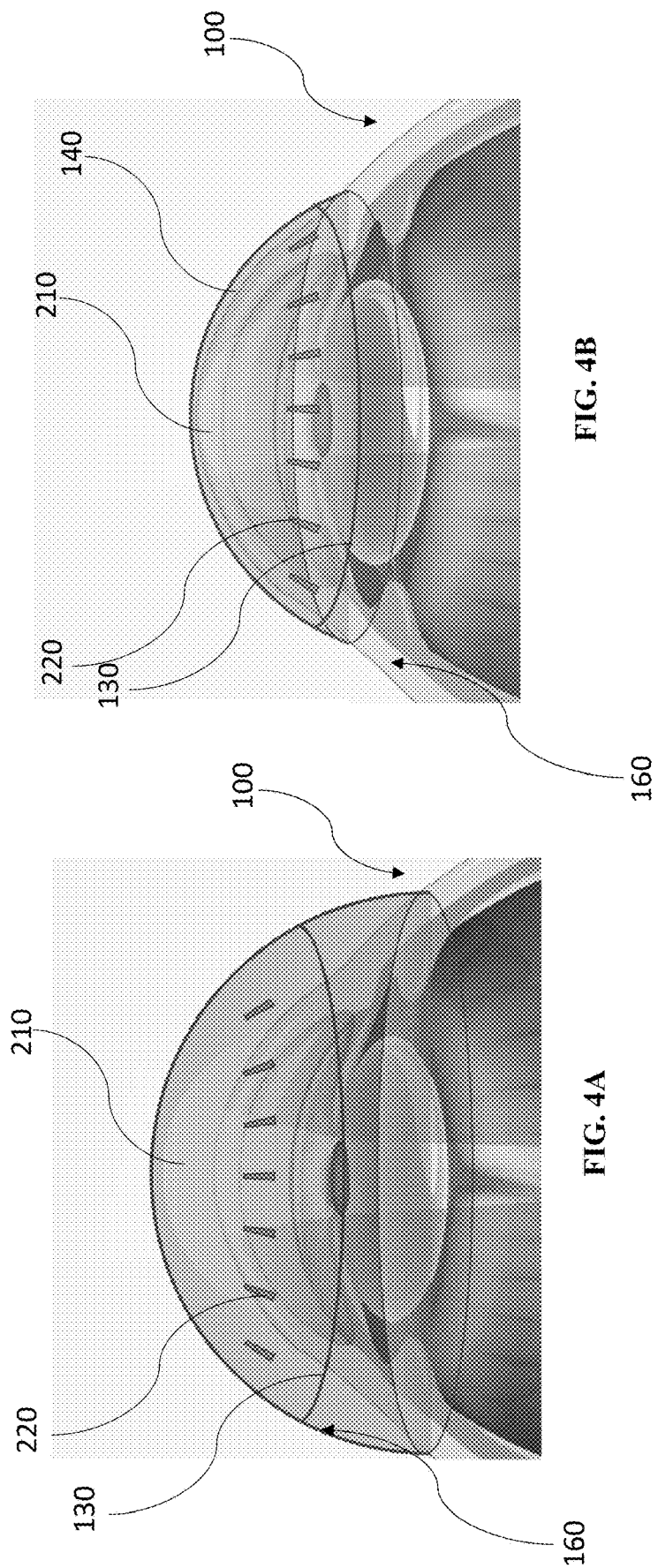

Astigmatic correcting contact lens over the flat meridian

Astigmatic correcting contact lens over the steep meridian

ASTIGMATISM CORRECTING CONTACT LENSES

CROSS REFERENCE

This application is a Continuation of PCT International Application No. PCT/US23/15167, International Filing Date Mar. 14, 2023, which claims the benefit of U.S. Provisional Applications Nos. 63/319,473, filed Mar. 14, 2022, 63/319,477, filed Mar. 14, 2022, 63/319,484, filed Mar. 14, 2022, 63/319,885, filed Mar. 15, 2022, 63/329,959, filed Apr. 12, 2022, 63/332,583, filed Apr. 19, 2022, and 63/377,709, filed Sep. 29, 2022, the contents of which are fully incorporated herein by reference.

BACKGROUND

A person having a refractive error of the eye often suffers from poor vision, such as a blurred or distorted vision as the eye is unable to focus the light onto the retina. Such poor vision may be corrected by eyeglasses, contact lenses, and/or surgery. For those having astigmatism, specialized contact lenses, including but not limited to toric soft lenses and rigid gas permeable (RGP) contact lenses, may be needed to correct the refractive error in at least two meridians. Due to the additional fitting criteria, a large variety of specialized contact lenses meeting these additional criteria need to be manufactured and stored. In addition, the fitting of these specialized contact lenses may be more time-consuming than fitting of conventional contact lenses. Therefore, there is a need for solutions to reduce the number of different contact lenses needed to be manufactured and stored.

SUMMARY

A refractive error of the eye often results in poor vision, such as a blurred or distorted vision, for the person having the refractive error as the eye is unable to focus the light onto the retina. Common refractive errors include, but are not limited to, myopia (nearsightedness), hyperopia (farsightedness), presbyopia, and astigmatism. Astigmatism is often caused by an irregularly shaped cornea, where the non-spherical or variable curvature of the cornea causes light rays to focus at different points on the retina. In some cases, astigmatism may be associated with other eye conditions, such as keratoconus, corneal lesions, scars, and prior corneal surgery, or other refractive errors. In some cases, refractive errors comprise higher order aberrations (e.g., third or higher) that are difficult to correct by cylinder or spherical corrections. These higher order aberrations include, but are not limited to, corneal coma, trefoil aberration, and spherical aberration.

For those having astigmatism and/or a higher order aberration, specialized and/or individualized contact lenses, such as toric soft lenses and rigid gas permeable (RGP) contact lenses, may be needed to correct the refractive error to help focus the light onto the retina. In some cases, to correct for corneal irregularities, specialized and/or individualized contact lenses having a number of different features may be produced. In some cases, the various features allow the lens to align and/or rotate to the particular astigmatism axis of a user, for example, by relying on structural elements such as a prism ballast, dynamic stabilization elements, among others. In some cases, to correct astigmatism a cylindrical lens (a segment cut from a cylinder) may be used, where the cylindric lens has no refractive power along one axis and are concave or convex along the other axis.

In some cases, toric contact lenses for correcting astigmatism needs multiple different designs having different base curves and various features for each power step and each angle step between the two meridians (e.g., steep and flat meridians) to cover a range of astigmatism subjects may have. In some cases, the toric contact lenses have an axis step of 5 or 10 degrees, which would need at least 18 or 36 different lenses to cover the axis/meridian of 180 degrees, at each sphere and cylindrical power combination to cover the range of astigmatisms a patient may have. In some cases, toric contact lenses with a single axis approach result in higher manufacturing complexity, with additional features for stabilizing the rotation of the lens (e.g., prism ballast, dynamic stabilization elements), compared to traditional sphere-correcting contact lenses. In some cases, toric contact lenses with a single axis approach may need significantly more lenses in inventory (e.g., stock keeping unit or SKU) for fitting and/or sales. In addition, the fitting of these specialized contact lenses may be more time-consuming than fitting of conventional contact lenses. The toric contact lenses often require stabilization to position the correcting cylinder at the appropriate axis on the eye, which takes time and may cause temporary discomfort and/or blurred vision for the user. Therefore, there is a need for solutions to reduce the number of different contact lenses needed to be manufactured and stored.

Provided herein are soft contact lenses for correcting an ocular refractive error of an eye (e.g., astigmatism), the lens comprising: an inner portion, a peripheral portion, and a juncture connecting the inner portion and the peripheral portion. In some embodiments, the juncture is configured to allow the inner portion to vault over a portion of a cornea to form a lenticular volume in between the inner portion and the cornea when the lens is placed on the eye. In some embodiments, the juncture is configured to allow at least a portion of the peripheral portion to conform to an ocular surface (e.g., cornea) when the lens is placed on the eye. In some embodiments, the juncture reduces the transfer of deformation and/or elastic energy of the peripheral portion to the inner portion when the peripheral portion conforms to an ocular surface. In some embodiments, the reduction in transfer of deformation and/or elastic energy to the inner portion allows the inner portion to substantially maintain its shape and vault over the cornea when on the eye. In some embodiments, the lenticular volume is filled with a fluid (e.g., tear fluid). In some embodiments, the lenticular volume forms a tear lens over the corneal surface. In some embodiments, a combination of the inner portion and the lenticular volume is configured to correct the ocular refractive error of the eye. In some embodiments, a shape of the tear lens is stabilized by the inner portion. In some embodiments, such tear lens formed under the inner portion of the lens provides a smooth refractive surface over the cornea to help correct the refractive error. In some embodiments, the dimensions of the tear lens and the volume of the lenticular volume are personalized to the user based on the shape of their cornea regardless of the dimension of the inner portion of the lens. In some embodiments, the soft contact lenses described herein may correct the refractive error independently of rotational orientation and/or without a need for features to provide stable rotational orientation. In some embodiments, the soft contact lenses provided herein may provide a more stable vision correct without a need for rotational stability, with less discomfort, and/or with reduced chance for and/or duration of temporary blurred vision. In some embodiments, the soft contact lenses provided herein may reduce the fitting time, e.g., the time it takes for the user to find the lens prescription that corrects the refractive error to their satisfaction, as there are fewer lens options to try and/or a single design of the lenses provided herein is configured to correct a wide range of refractive errors. In some embodiments, the soft contact lenses described herein may be easier to manufacture due to simpler design and/or without a need for a large number of designs in the supply chain to cover the range of astigmatisms that the patients may have. In some embodiments, the lenses provided herein comprise a juncture and a fenestration. In some embodiments, the juncture and the fenestration may provide improved fluid flow in and out of the lenticular volume, improved oxygen and/or tear fluid transport, and/or less discomfort.

The present disclosure is generally directed to vision and treatment of the eye to provide improved vision. Provided herein are coverings for vision correction, such as soft contact lenses. In some embodiments, provided herein are uses and applications for the correction of a refractive error of an eye, such as an astigmatism. In some embodiments, the refractive error is subsequent to a refractive surgery such as LASIK or PRK. In some embodiments, the contact lenses (e.g., coverings) may mask an astigmatism in an eye of a subject without surgery. In some embodiments, the contact lenses may mask a corneal irregularity in an eye of a subject. In some embodiments, the contact lenses may mask a keratoconus in an eye of a subject without surgery. Provided herein are lenses which may include but are not limited to contact lenses suitable to be positioned on a surface of an eye of a subject.

In one aspect, provided herein is a soft contact lens for correcting an ocular refractive error of an eye (e.g., astigmatism), the lens comprising: an inner portion, a peripheral portion, and a juncture connecting the inner portion and the peripheral portion, wherein the juncture is configured such the inner portion vaults over a portion of a cornea to form a lenticular volume in between the inner portion and the cornea and at least a portion of the peripheral portion conforms to an ocular surface when the lens is placed on the eye.

In another aspect, provided herein is a soft contact lens for correcting an ocular refractive error of an eye (e.g., astigmatism), the lens comprising: an inner portion, a peripheral portion, and a juncture connecting the inner portion and the peripheral portion, wherein the juncture is configured to have a higher flexibility than the peripheral portion or the inner portion or both the peripheral portion and the inner portion.

In another aspect, provided herein is a soft contact lens for correcting an ocular refractive error of an eye (e.g., astigmatism), the lens comprising: an inner portion having an outer circumference, a peripheral portion having an inner circumference, and a juncture connecting the outer circumference of the inner portion and the inner circumference of the peripheral portion, wherein the juncture is configured to reduce a mechanical force transfer from the peripheral portion to the inner portion.

In some embodiments, the juncture allows at least a portion of the peripheral portion deform without substantially deforming the inner portion.

In some embodiments, the juncture allows at least a portion of the peripheral portion to conform to a corneal surface without substantially deforming the inner portion.

In some embodiments, the juncture comprises one or more of flexibility, shape, thickness, curvature, dimension, or material property that is different than that of the inner portion.

In some embodiments, the juncture comprises one or more of flexibility, shape, thickness, curvature, dimension, or material property that is different than that of the peripheral portion.

In some embodiments, the material property comprises a tensile modulus.

In some embodiments, a ratio of the tensile modulus of the juncture to the inner portion is about 1:1 to about 1:100.

In some embodiments, a ratio of the tensile modulus of the juncture to the peripheral portion is about 1:1 to about 1:100.

In some embodiments, a ratio of the tensile modulus of the inner portion to the peripheral portion is about 10:1 to about 1:10.

In some embodiments, the tensile modulus of at least one of the inner portion, the peripheral portion, or the juncture ranges from about 0.1 Megapascals (MPa) to about 4 MPa.

In some embodiments, the material property comprises a tensile strength.

In some embodiments, a ratio of the tensile strength of the juncture to the inner portion is about 1:1 to about 1:100.

In some embodiments, a ratio of the tensile strength of the juncture to the peripheral portion is about 1:1 to about 1:100.

In some embodiments, a ratio of the tensile strength of the inner portion to the peripheral portion is about 10:1 to about 1:10.

In some embodiments, the juncture is located about 1 mm to about 6.5 mm from a center of the lens.

In some embodiments, the juncture has a distance (e.g., a diameter) of about 2 mm to about 9 mm across.

In some embodiments, the juncture comprises one or more of a groove, a thinned region, a hinge, a slit, or a disconnected segment.

In some embodiments, the juncture arranged in a substantially circular shape (e.g., annulus) about a center of the lens.

In some embodiments, the juncture comprises at least two disconnected segments.

In some embodiments, the juncture comprises a structurally weakened portion.

In some embodiments, the juncture is symmetrical.

In some embodiments, the juncture is oriented substantially circumferentially.

In some embodiments, the juncture is oriented substantially radially.

In some embodiments, the juncture has a thinner cross-section than the inner portion or the peripheral portion or the combination thereof.

In some embodiments, the juncture has a width ranging from about 0.1 μm to about 2000 μm.

In some embodiments, the juncture is prepared by removing a portion of the lens comprising the juncture.

In some embodiments, removing the portion of the lens comprises cutting of the portion of the lens.

In some embodiments, removing the portion of the lens comprises chemically treating the portion of the lens.

In some embodiments, the juncture is prepared by chemically treating a portion of the lens comprising the juncture.

In some embodiments, chemically treating comprises selectively curing the portion of the lens.

In some embodiments, the juncture is prepared by electrically treating a portion of the lens comprising the juncture.

In some embodiments, the juncture comprises one or more fenestrations.

In some embodiments, the lens comprises a rigidity from about 1.25E+0.4 Mpa*μm³ to about 5.00E+08 MPa*μm³

In some embodiments, the juncture comprises a rigidity from about 1.60E+03 MPa*μm³ to about 5.00E+08 MPa*μm³.

In some embodiments, a lenticular volume is formed between a posterior surface of the inner portion and a corneal surface of the eye.

In some embodiments, the lens comprises a one or more fenestrations.

In some embodiments, the fenestrations are positioned adjacent to the juncture.

In some embodiments, the lenticular volume is filled with a fluid (e.g., tear fluid).

In some embodiments, the fenestrations are configured to allow a fluid to flow into and out of a lenticular volume.

In some embodiments, the lenticular volume forms a tear lens over the corneal surface.

In some embodiments, the shape of the tear lens is stabilized by the inner portion.

In some embodiments, a combination of the inner portion and the lenticular volume is configured to correct the ocular refractive error of the eye.

In some embodiments, a combination of the inner portion and the lenticular volume is configured to correct the ocular refractive error up to about 5.5 diopters (D).

In some embodiments, the inner portion of a covering is configured to correct the ocular refractive error up to about 5.5 diopters (D).

In some embodiments, the ocular refractive error comprises a corneal irregularity, astigmatism, or higher order aberration of the eye.

In some embodiments, the ocular refractive error is astigmatism.

In some embodiments, an optical correction is provided by a combination of the inner portion and the lenticular volume.

In some embodiments, the lens is configured to correct the ocular refractive error without having to rotationally fit to the eye.

In some embodiments, the inner portion has a first radius of curvature and a peripheral portion has a second radius of curvature.

In some embodiments, the juncture connects an outer circumference of the inner portion and an inner circumference of the peripheral portion.

In some embodiments, the first radius of curvature is equal to or less than the second radius of curvature.

In some embodiments, the peripheral portion is subject to a deformation the first radius of curvature of the inner portion changes less than the second radius of the curvature of the peripheral portion.

In some embodiments, a ratio of the first radius of curvature of the inner portion and the second radius of curvature of the peripheral portion is from about 7:15 to about 3:2.

In some embodiments, the inner portion and peripheral portion have the same radius of curvature when the juncture is in a neutral position (e.g., relaxed position or unbent).

In some embodiments, the inner portion and the peripheral portion have a different radius of curvature when the juncture is in a flexed position (e.g., bent).

In some embodiments, the juncture is configured to bend to allow the peripheral portion to have a different angle than the inner portion.

In some embodiments, the radius of curvature of the inner portion ranges from about 7 mm to about 9 mm.

In some embodiments, the radius of curvature of the peripheral portion ranges from about 6 mm to about 15 mm.

In some embodiments, the first radius of curvature of the inner portion changing less than the second radius of the curvature of the peripheral portion when the peripheral portion is subject to a deformation refers to the peripheral portion deforming from the juncture to increase the second radius of curvature.

In some embodiments, the lens has an average thickness from about 50 μm to about 750 μm.

In some embodiments, the lens has an average thickness from about 200 μm to about 300 μm.

In some embodiments, the inner portion has an average thickness from about 50 μm to about 750 μm.

In some embodiments, the peripheral portion has an average thickness from about 50 μm to about 750 μm.

In some embodiments, the juncture has an average thickness from about 1 μm to about 300 μm.

In some embodiments, the inner portion has a uniform thickness throughout

In some embodiments, the peripheral portion has a non-uniform thickness.

In some embodiments, a thickness of the peripheral portion varies from the inner circumference to an outer circumference of the peripheral portions.

In some embodiments, an average thickness of the peripheral portion is greater than an average thickness of the juncture.

In some embodiments, an average thickness of the peripheral portion near the juncture is greater than an average thickness of the juncture.

In some embodiments, the peripheral portion has a thickness gradient from the juncture to an outer circumference.

In some embodiments, an average thickness of the inner portion is greater than an average thickness of the juncture.

In some embodiments, an average thickness of the inner portion near the juncture is greater than an average thickness of the juncture.

In some embodiments, one or more mechanical properties of the peripheral portion varies from the inner circumference to an outer circumference of the peripheral portions.

In some embodiments, one or more mechanical properties of the peripheral portion varies based on distance from the juncture.

In some embodiments, the peripheral portion has a gradient of one or more mechanical properties from the juncture to an outer circumference.

In some embodiments, the lens comprises a polymeric material.

In some embodiments, the lens comprises one or more of a hydrogel, silicone hydrogel, or silicone.

In some embodiments, the lens comprises one or more of diacetone acrylamide, N,N-dimethylacrylamide, 2-hydroxyethyl methacrylate, methacrylic acid, methyl methacrylate, N-carboxyl vinyl ester, N-vinyl pyrrolidone, poly[dimethylsiloxyl]di[silybutanol]bis[vinyl carbamate], phosphorylcholine, tris-(trimethylsiloxysilyl)propylvinyl carbamate, tris-(hydroxylmethyl)aminomethane, siloxane, or polyvinylpyrrolidone.

In some embodiments, the juncture allows for a portion of the inner portion to vault over a steep meridian and for the peripheral portion substantially conforms to the steep meridian.

In another aspect, provided herein is a method for correcting an ocular refractive error (e.g., astigmatism) of the eye, the method comprising providing the soft contact lens of the disclosure.

In another aspect, provided herein is a method for correcting an ocular refractive error (e.g., astigmatism) of the eye, the method comprising placing the soft contact lens of the disclosure to an ocular surface of the eye.

In another aspect, provided herein is a method for forming a tear lens, the method comprising applying the soft contact lens of the disclosure to an ocular surface of the eye.

In another aspect, provided herein is a method for forming a lenticular volume, the method comprising: applying to an ocular surface of the eye a soft contact lens of the disclosure, wherein the inner portion is configured to form the lenticular volume to form a tear lens over the ocular surface to correct the ocular refractive error.

In one aspect, the present disclosure provides a soft contact lens for correcting an ocular refractive error of an eye. In some embodiments, the soft contact lens comprises a soft lens body. In some embodiments, the soft lens body has a peripheral portion, an inner portion, and a juncture between the peripheral portion and inner portion. In some embodiments, the rigidity of the juncture is less than either the peripheral portion or the inner portion, or both. In some embodiments, at least a portion of the peripheral portion is configured to conform to a corneal surface of the eye when the lens is placed thereon. In some embodiments, the juncture allows the at least a portion of the peripheral portion to conform to the corneal surface without substantially deforming the inner portion. In some embodiments, at least a portion of the inner portion is configured to be suspended above the corneal surface of the eye when the lens is placed thereon forming a lenticular volume between a posterior surface of the soft lens body and the corneal surface of the eye. In some embodiments, at least a portion of the lenticular volume is configured to be filled with a fluid to form a tear lens over the corneal surface for correcting an ocular refractive error of the eye.

In some aspect, the present disclosure provides a soft contact lens for correcting an ocular refractive error of an eye. In some embodiments, the soft contact lens comprises a soft lens body. In some embodiments, the soft lens body has a peripheral portion, an inner portion, and a juncture. In some embodiments, the rigidity of the juncture is less than either the peripheral portion or the inner portion. In some embodiments, at least a portion of the peripheral portion is configured to conform to a corneal surface of the eye when the lens is placed thereon. In some embodiments, the juncture allows the at least a portion of the peripheral portion to conform to the corneal surface without substantially deforming the inner portion. In some embodiments, at least a portion of the inner portion is configured to be suspended above the corneal surface of the eye when the lens is placed thereon forming a lenticular volume between a posterior surface of the soft lens body and the corneal surface of the eye. In some embodiments, at least a portion of the lenticular volume is configured to be filled with a fluid to form a tear lens over the corneal surface for correcting an ocular refractive error of the eye. In some embodiments, the soft lens body is made of a single material.

In some embodiments, the ocular refractive error originates from one or more of a corneal irregularity, coma, astigmatism, or higher order aberration of the eye. In some embodiments, the ocular refractive error is an astigmatism of the eye.

In one aspect, the present disclosure provides a soft contact lens for correcting an astigmatism of the eye. In some embodiments, the soft contact lens comprises a soft lens body. In some embodiments, the soft lens body has a peripheral portion, an inner portion, and a juncture between the peripheral portion and inner portion. In some embodiments, the soft lens body is made of a single material. In some embodiments, the rigidity of the juncture is less than either the peripheral portion or the inner portion. In some embodiments, at least a portion of the peripheral portion is configured to conform to a corneal surface of the eye when the lens is placed thereon. In some embodiments, the juncture allows the at least a portion of the peripheral portion to conform to the corneal surface without substantially deforming the inner portion. In some embodiments, at least a portion of inner portion of the lens body is configured to be suspended above the corneal surface of the eye when the lens is placed thereon forming a lenticular volume between a posterior surface of the soft lens body and the corneal surface. In some embodiments at least a portion of the lenticular volume is configured to be filled with a fluid to form a tear lens over the corneal surface for correcting an astigmatism of the eye.

In some embodiments, at least a portion of the inner portion is suspended further above the surface of the cornea when compared with another portion of the inner portion. In some embodiments, at least a portion of the inner portion is suspended above the surface of the cornea and another portion of the inner portion conforms to the surface of the cornea. In some embodiments, at least a portion of the inner portion and at least a portion of the peripheral portion are suspended above the surface of the cornea. In some embodiments, at least a portion of the inner portion is suspended further above the surface of the cornea when compared with at least a portion of the peripheral portion. In some embodiments, at least a portion of the inner portion conforms to the surface of the cornea and at least a portion of the peripheral portion is suspended above the surface of the surface of the cornea.

The at least the portion of the inner portion may comprise a first portion of the inner portion suspended above the surface of the cornea and a different second portion of the inner portion suspended above the surface of the cornea further, closer, or the same as the first portion of the inner portion. The at least the portion of the peripheral portion may comprise a first portion of the peripheral portion suspended above the surface of the cornea and a different second portion of the peripheral portion suspended above the surface of the cornea further, closer, or the same as the first portion of the peripheral portion.

In some embodiments, the inner portion provides greater correction of an ocular refractive error originating from one or more of a corneal irregularity, coma, astigmatism, or higher order aberration of the eye, than the peripheral portion. In some embodiments, the soft lens body is made of a single material having the same mechanical properties throughout.

In some embodiments, the soft lens body is made of a single polymeric material. In some embodiments, the soft lens body is made of a hydrogel. silicone hydrogel, or silicone, In some embodiments, the soft lens body is made of a single material selected from diacetone acrylamide, N,N-dimethylacrylamide, 2-hydroxyethyl methacrylate, methacrylic acid, methyl methacrylate, N-carboxyl vinyl ester, N-vinyl pyrrolidone, poly[dimethylsiloxyl]di[silybutanol] bis[vinyl carbamate], phosphorylcholine, tris-(trimethylsiloxysilyl) propylvinyl carbamate, tris-(hydroxylmethyl)aminomethane, siloxane, silicone, or polyvinylpyrrolidone.

In some embodiments, the inner portion and the peripheral portion have the same Young's modulus. In some embodiments, the soft lens body has a uniform tensile Young's modulus. In some embodiments, the soft lens body has a tensile Young's modulus from about 0.1 Megapascals ("MPa") to about 4 MPa.

In some embodiments, the inner portion has a rigidity range from about 1.25E+04 Megapascal*micrometers cubed ("MPa*μm3") to about 5.00E+08 MPa*μm3. In some embodiments, the peripheral portion has rigidity range from about 1.25E+04 MPa*μm3 to about 5.00E+08 MPa*μm3. In some embodiments, the rigidity of the inner portion and the peripheral portion is the same. In some embodiments, the rigidity of the inner portion and the peripheral portion is different. In some embodiments, the ratio of the rigidity of the inner portion to the peripheral portion is from about from about 1:3 to about 3:1.

In some embodiments, the soft lens body further comprises an anterior surface. In some embodiments, either the posterior surface and/or the anterior surface of the lens is symmetric about a central axis of the lens when the lens is in the neutral configuration. In some embodiments, the anterior surface of the lens is axially symmetric. In some embodiments, the anterior surface comprises an anterior curvature profile. In some embodiments, the anterior curvature profile is axially symmetric. In some embodiments, the posterior surface is axially symmetric. In some embodiments, the posterior surface comprises a posterior curvature profile. In some embodiments, the posterior curvature profile is axially symmetric. In some embodiments, the soft lens body further comprises a lens volume. In some embodiments, the lens volume is axially symmetric.

In some embodiments, the lens does not provide a cylindric optical power when in a neutral configuration. In some embodiments, the lens corrects an ocular refractive error or an optical aberration of the eye when placed thereon irrespective of the orientation of the lens to a meridian of the eye. In some embodiments, the lens corrects an ocular refractive error or an optical aberration of the eye without being rotationally fit to the eye. In some embodiments, the optical aberration of the eye is a first order aberration or spherical aberration. In some embodiments, the optical aberration of the eye is a second order aberration or cylindrical aberration. In some embodiments, the optical aberration is a third order aberration or coma.

In some embodiments, the inner portion and peripheral portion have the same radius of curvature when the lens is in a neutral configuration. In some embodiments, the inner portion and the peripheral portion have the same radius of curvature. In some embodiments, the inner portion and peripheral portion have the same radius of curvature when the juncture is in a neutral position (e.g., relaxed position or unbent).

In some embodiments, the inner portion and the peripheral portion have a different radius of curvature. In some embodiments, the inner portion and the peripheral portion have a different radius of curvature when the juncture is in a flexed position (e.g., bent). In some embodiments, the inner portion has a radius of curvature from about 7 millimeters ("mm") to about 9 mm. In some embodiments, the peripheral portion has a radius of curvature from about 6 mm to about 15 mm. In some embodiments, the ratio of the radius of curvature of the inner portion and peripheral portion is from about 7:15 to about 3:2. In some embodiments, the posterior surface is continuous except for the juncture.

In some embodiments, the soft contact lens further comprises a plurality of fenestrations configured to allow a fluid to flow into and out of the lenticular volume. In some embodiments, the plurality of fenestrations is positioned adjacent the juncture. In some embodiments, the plurality of fenestrations is positioned on the inner portion. In some embodiments, the plurality of fenestrations is positioned on the peripheral portion. In some embodiments, the plurality of fenestrations is positioned on both the inner portion and the peripheral portion. In some embodiments, the distance between the plurality of fenestrations and a center axis of the lens is from about 1.5 mm to about 6 mm. In some embodiments, the distance between the plurality of fenestrations and the juncture is from about 0 mm to about 4 mm. In some embodiments, the anterior surface is continuous except for the fenestrations.

In some embodiments, the juncture has a has a rigidity range from about 1.60E+03 MPa*μm3 to 5.00E+08 MPa*μm3. In some embodiments, the thickness of the juncture is less than the thickness either the inner portion or the peripheral portion. In some embodiments, the inner portion has a thickness from about 50 micrometers ("μm") to about 750 μm. In some embodiments, the inner portion has a uniform thickness throughout. In some embodiments, the peripheral portion has a non-uniform thickness. In some embodiments, the thickness of the peripheral portion is at least about 50 μm. In some embodiments, the thickness of the peripheral portion is at most about 750 μm. In some embodiments, the juncture has a thickness from about 50 μm to about 750 μm. In some embodiments, the thickness of the juncture 130 is inversely proportional to the thickness of the inner portion 210 and/or the peripheral portion 160, such that the thicker the inner portion 210 and/or the peripheral portion 160 are, the thinner the juncture 130 is. Lenses having a thicker inner portion 210 or peripheral portion 160 and a thinner juncture 130 may have greater structural integrity when suspended over the surface of the cornea 150. In some embodiments, the thickness of the juncture 130 is 5%, 10%, 15%, 20%. 25%, 30%, 35%, 40%, 45%, 50%, 55%, 60%, 65%, 70%, 75%, 80%, 85%, 90%, 95%, or any value therebetween, of either the inner portion 210 or the peripheral portion 160. In some embodiments, the soft lens body further comprises an axially symmetric lens volume. In some embodiments, the juncture comprises one or more of a partially disconnected area, a groove, or a living hinge. In some embodiments, the juncture comprises a groove placed on a posterior surface of the lens. In some embodiments, a groove is placed on an anterior surface of the lens.

In some embodiments, the inner portion has a diameter from about 0 mm to about 7 mm about the center axis of the lens. In some embodiments, the peripheral portion has a diameter from about 1.5 mm to about 17 mm about the center axis of the lens. In some embodiments, the ratio of the diameter of the inner portion to the diameter of the peripheral portion is from about 1:8 to about 4:5.

In some embodiments, the lens has a diameter from about 8 mm to about 17 mm.

In some embodiments, the lens has a sagittal height from about 1 μm to about 50 μm.

In some embodiments, the lenticular volume between the posterior surface of the soft lens body and the corneal surface has a total volume from about 0.0001 microliters ("μL") to 10 μL. In some embodiments, at least one sector (e.g., portion) of the soft lens body from a center of the soft lens body to a peripheral edge of the soft lens body is configured to be suspended over the corneal surface to form at least a portion of the lenticular volume when the lens is disposed over the corneal surface. In some embodiments, any of the at least one sector of the soft lens body is capable of being suspended over the corneal surface to form at least a portion of the lenticular volume when the lens is disposed over the corneal surface.

In some embodiments, soft lens body has no protrusions extending from an anterior surface or a posterior surface.

In some embodiments, the lens does not have a mechanism for stabilizing the rotation of the lens to a particular cylinder of the eye. In some embodiments, the lens does not have orientation features or indicia (e.g., off-color markings on or within the contact lens body, one or more truncations of the peripheral edge of the contact lens body, an asymmetrical shape of the contact lens body, and the like) for stabilizing the rotation of the lens to a particular cylinder of the eye.

In some embodiments, the lenses are bifocal or multifocal lenses.

In some embodiments, a combination of the inner portion and the lenticular volume is configured to correct an ocular refractive error of the eye of the subject. In some embodiments, a combination of the inner portion, the peripheral portion, and the lenticular volume is configured to correct an ocular refractive error of the eye of the subject.

In one aspect, the present disclosure provides a method for correcting an ocular refractive error of the eye using the soft contact lenses of the present disclosure.

In one aspect, the present disclosure provides a method for forming a tear lens using the soft contact lenses of the present disclosure. In some embodiments, the tear lens forms with an asymmetric volume distribution. In some embodiments, the asymmetric volume distribution corrects one or more of a corneal irregularity, coma, astigmatism, or higher order aberration of the eye.

In some embodiments, the method comprises conforming a peripheral portion of the lens to the corneal surface. In some embodiments, a peripheral portion of the lens conforms to a corneal surface.

In some embodiments, the difference in lens curvature between two perpendicular meridians is less than the curvature of the cornea under such lens when such lens is placed on the eye. In some embodiments, the difference in lens curvature in the inner portion between two perpendicular meridians in the lens is less than the curvature between corresponding two perpendicular meridians of the cornea which under such inner portion of the lens when such lens is placed on the eye. In some embodiments, the difference in lens curvature in the peripheral portion between two perpendicular meridians in the lens is less than the curvature between corresponding two perpendicular meridians of the cornea which under such peripheral portion of the lens when such lens is placed on the eye but such difference is relatively reduced in the peripheral portion relative to the inner portion.

In some embodiments, the method comprises reducing a transfer of mechanical force from the peripheral portion to the inner portion by the presence of a juncture between the inner and peripheral portions of the lens, the mechanical force of the peripheral portion being in response to the peripheral portion conforming to the astigmatism or higher order aberration of the eye when the peripheral portion is placed thereon.

In some embodiments, in the asymmetric volume distribution, the volume of a first tear lens sector is different from the volume of a second tear lens sector diametrically opposed to the first tear lens sector. In some embodiments, the volume of the first tear lens sector being different from the volume of the second tear lens sector corrects a coma of the eye.

The ability of the soft contact lenses described herein to be able to mask astigmatism and coma can provide an advantage over many commercially available astigmatism-masking toric contact lenses. While such toric lenses can provide different refractive powers between the vertical and horizontal planes, they may not provide different refractive power within the same vertical or horizontal plane. By contrast, the soft contact lenses provided herein may have multiple sectors, the volume of the tear lens under each sector may be different, and the combination of each sector and tear lens portion directly posterior to its respective sector may provide different refractive power. As further discussed herein, the soft contact lenses described herein may mask astigmatism and coma independently of rotational orientation, while such toric lens require wear in a particular rotational orientation to mask astigmatism.

In another aspect, the present disclosure provides a method for correcting an ocular refractive error of the eye comprising the step of providing optical correction to an eye of a subject with an optical region of a soft contact lens and a lenticular volume between a posterior surface of the lens and a corneal surface when positioned on the eye, wherein the lens is configured to allow a tear fluid to flow into and out of the lenticular volume to form a tear lens over an ocular abnormality to correct an ocular refractive error of the eye.

In another aspect, the present disclosure provides a method for forming a tear lens comprising the step of applying to an eye a soft contact lens having a soft lens body so as to form a lenticular volume between a posterior surface of the soft lens body and a corneal surface of the eye, wherein the soft lens body is configured to allow a tear fluid to flow into and out of the lenticular volume to form a tear lens over an ocular abnormality to correct an ocular refractive error of the eye.

In some embodiments, the soft contact lens is applied to the eye in any orientation such that the lens corrects the ocular refractive error of the eye irrespective of the orientation of the lens to a meridian of eye.

In some embodiments, the soft contact lens has a rigidity range from about $1.25E+04$ MPa*$\mu m^3$ to about $5.00E+08$ MPa*$\mu m^3$.

In some embodiments, the ocular refractive error originates from one or more of a corneal irregularity, coma, astigmatism, or higher order aberration of the eye. In some embodiments, the ocular refractive error is an astigmatism of the eye.

In some embodiments, the one or both of an anterior surface of the lens or a posterior surface of the lens is axially symmetric.

In some embodiments, an inner portion of the lens has a uniform thickness. In some embodiments, an inner portion of the lens has a non-uniform thickness.

In some embodiments, the soft contact lens is made of a single material.

In some embodiments, the combination of the inner portion and the lenticular volume is configured to correct an ocular refractive error of the eye of the subject.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the present disclosure are set forth with particularity in the appended claims. A better understanding of the features and advantages of the present disclosure will be obtained by reference to the following detailed description that sets forth illustrative embodiments, in which the principles of the present disclosure are utilized, and the accompanying drawings (also "Figure" and "FIG." herein), of which:

FIGS. 3A-3J show perspective views of a lens, according to some embodiments.

FIGS. 4A and 4B illustrate a lens positioned above and disposed on the eye of a subject, respectively.

DETAILED DESCRIPTION

Figure 1:
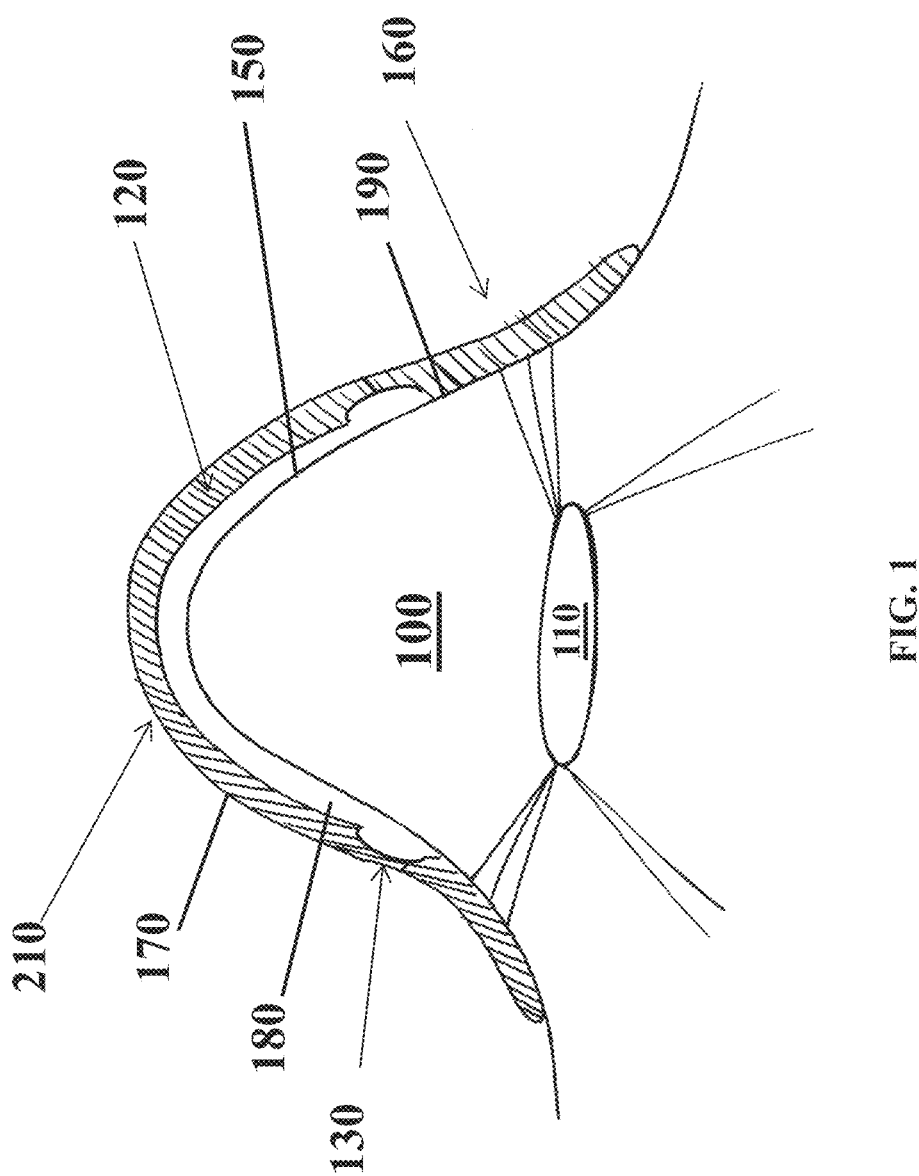
FIG. 1 shows a side sectional view of a lens on an eye of a subject, according to some embodiments.

Provided herein are soft contact lenses for correcting an ocular refractive error of an eye (e.g., astigmatism), the lens comprising: an inner portion, a peripheral portion, and a juncture connecting the inner portion and the peripheral portion. In some embodiments, the juncture connecting an outer circumference of the inner portion and an inner circumference of the peripheral portion. In some embodiments, the juncture is configured such the inner portion vaults over a portion of a cornea to form a lenticular volume in between the inner portion and the cornea. In some embodiments, the juncture is configured such that at least a portion of the peripheral portion conforms to an ocular surface when the lens is placed on the eye. In some embodiments, the juncture is configured to have a higher flexibility than the peripheral portion or the inner portion or both the peripheral portion and the inner portion. In some embodiments, the juncture is configured to reduce a mechanical force transfer from the peripheral portion to the inner portion. In some embodiments, the juncture allows at least a portion of the peripheral portion deform without substantially deforming the inner portion. In some embodiments, the juncture allows at least a portion of the peripheral portion to conform to a corneal surface without substantially deforming the inner portion. In some embodiments, the lenticular volume forms a tear lens over the corneal surface. In some embodiments, a shape of the tear lens is stabilized by the inner portion. In some embodiments, the combination of the inner portion and the lenticular volume is configured to correct the ocular refractive error of the eye up to about 0.1, 0.5, 1, 1.5, 2, 2.5, 3, 3.5, 4, 4.5, 5, or 5.5 diopters (D).

Described herein are soft contact lenses to correct refractive error of the eye of a subject, which comprises a cornea, a lens, and a conjunctiva in the anterior portion of the eye and a retina in the posterior portion of the eye. The subject may be an animal. The subject may be a human, such as a patient. The cornea of the eye is a connective tissue in the anterior portion of the eye that is clear in healthy eyes and refracts light to form an image on the retina. The cornea includes an outer layer of tissue, the epithelium, which protects the underlying tissues of the cornea, such as Bowman's membrane, the stroma and nerve fibers that extend into the stroma and Bowman's membrane. The retina is a light-sensitive layer of tissue located in the posterior portion of the eye and senses light from the image formed on the retina and transmits signals of the image to the brain.

The current disclosure is directed to a contact lens for the treatment of refractive error. A person (e.g., patient) having a refractive error of the eye often has poor vision, such as a blurred or distorted vision, as the eye is unable to focus the light onto the retina. Common refractive errors include, but are not limited to, myopia (nearsightedness), hyperopia (farsightedness), presbyopia, and astigmatism. Astigmatism is often associated with an irregularly shaped cornea, where the non-spherical or variable curvature of the cornea causes light rays to focus at different points on the retina. In some cases, astigmatism may be associated with other eye conditions, such as keratoconus, corneal lesions, scars, and prior corneal surgery, or other refractive errors. In some cases, refractive errors comprise higher order aberrations (e.g., third or higher) that are difficult to correct by cylinder or spherical corrections. These higher order aberrations include, but are not limited to, corneal coma, trefoil aberration, and spherical aberration.

Often, a thin fluid layer, referred to as a tear film, covers the ocular surface. The tear film helps to provide comfort, mechanical, environmental and immune protection, and epithelial health for the ocular surface. In some embodiments, the tear film smooths small irregularities of the ocular surface to provide a smooth refractive surface for vision.

The tear film is shaped substantially by the shape of the underlying cornea. The tear film comprises a liquid that is mostly water but also includes additional components, such as mucoids and lipids. In some embodiments, the tear film comprises a meniscus. In some embodiments, the meniscus is one or more of an upper meniscus or a lower meniscus of the eye of the subject. In some embodiments, a tear meniscus is one or more of an upper meniscus or a lower meniscus of the eye of the subject. The many nerve fibers of the cornea provide sensation to promote blinking that can cover the cornea with the tear film.

In some embodiments, a soft covering or a covering is a lens as described herein. In some embodiments, a soft covering or a covering is a contact lens as described herein. The embodiments described herein can be used to treat an eye in many ways using one or more coverings. In some embodiments, the coverings comprise contact lenses. In some embodiments, the coverings are soft contact lens. In some embodiments, the coverings and/or contact lenses are capable of masking astigmatism. In some embodiments, the coverings and/or contact lenses are used to treat an astigmatism of the eye. Such contact lenses may comprise one or more astigmatism-masking contact lenses. The contact lenses may come in various versions. In some embodiments, the coverings comprise one or more soft lenses which fit normally. In some instances, the contact lenses may be used for long-term vision correction with extended wear. In some embodiments, the contact lenses are used to treat astigmatism. In some embodiments, the coverings and/or contact lenses are used in combination with or after surgery for improved results and/or recovery. In some embodiments, a lens that is placed on a cornea conforms to the peripheral irregularity and does not conform to the central irregularity and the lens has a partially disconnected area between the periphery and the center of lens.

Unlike toric soft contact lenses that require stabilization to position the correcting cylinder at the appropriate axis, the lenses of the present disclosure do not require stabilization. Accordingly, the lenses of the present disclosure may not have a mechanism for stabilizing the rotation of the lens to a particular cylinder of the eye. In some embodiments, the lenses of the present disclosure may not have orientation features or indicia for stabilizing the rotation of the lens to a particular cylinder of the eye. In some embodiments, the lenses of the present disclosure may not include a prism-ballast (e.g., thickness differences across the lens profile that determine the lens rotation orientation) or periballast (i.e., bal-flange). In some embodiments, the lenses of the present disclosure may not have non-prism ballast features such as a thin-zone, double-slab-off, or dynamic stabilization. In some embodiments, the lens does not require adding a back toric or a front toric feature to orient the lens. In some embodiments, the lens is configured to correct the ocular refractive error without having to rotationally fit to the eye. In some embodiments, the lens is configured to correct the ocular refractive error without having to orient into a specific position when fitted to an eye.

In some embodiments, provided herein is a soft contact lens for correcting an ocular refractive error of an eye (e.g., astigmatism), the lens comprising: an inner portion, a peripheral portion, and a juncture connecting the inner portion and the peripheral portion, wherein the juncture is configured such the inner portion vaults over a portion of a cornea to form a lenticular volume in between the inner portion and the cornea and at least a portion of the peripheral portion conforms to an ocular surface when the lens is placed on the eye.

In some embodiments, provided herein is a soft contact lens for correcting an ocular refractive error of an eye (e.g., astigmatism), the lens comprising: an inner portion, a peripheral portion, and a juncture connecting the inner portion and the peripheral portion, wherein the juncture is configured to have a higher flexibility than the peripheral portion or the inner portion or both the peripheral portion and the inner portion.

In some embodiments, provided herein is a soft contact lens for correcting an ocular refractive error of an eye (e.g., astigmatism), the lens comprising: an inner portion having an outer circumference, a peripheral portion having an inner circumference, and a juncture connecting the outer circumference of the inner portion and the inner circumference of the peripheral portion, wherein the juncture is configured to reduce a mechanical force transfer from the peripheral portion to the inner portion.

In some embodiments, the soft contact lens may correct or mask an ocular refractive error of the eye. In some embodiments, the ocular refractive error comprises one or more of a corneal irregularity, coma, astigmatism, or higher order aberration of the eye. In some embodiments, the ocular refractive error comprises a corneal irregularity, astigmatism, or higher order aberration of the eye. In some embodiments, the ocular refractive error is a corneal irregularity. In some embodiments, the ocular refractive error is a coma. In some embodiments, the ocular refractive error is an astigmatism. In some embodiments, the ocular refractive error is a higher order aberration. In some embodiments, the optical aberration of the eye is a first order aberration or spherical aberration. In some embodiments, the optical aberration of the eye is a second order aberration or cylindrical aberration. In some embodiments, the optical aberration is a third order aberration or coma.

In some embodiments, the juncture is configured such that a sector of the inner portion vaults over a portion of a cornea to form a lenticular volume in between such sector of the inner portion and the cornea and at least a portion of the peripheral portion conform to an ocular surface to maintain the lenticular volume under the vaulting sector of the inner portion when the lens is placed on the eye.

Figures 10, 11:
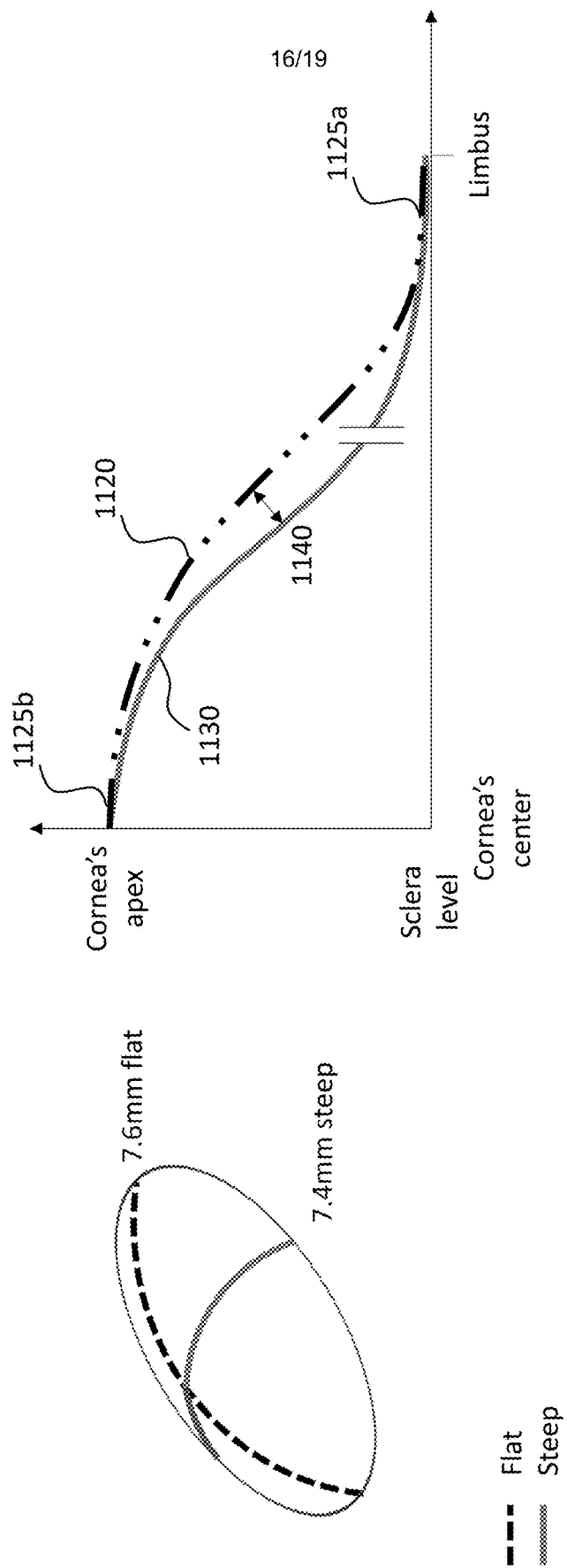
FIG. 10 illustrates an example of a cornea having an astigmatism.
FIG. 11 illustrates the difference in curvature of a cornea having an astigmatism and a lens of the disclosure.

FIG. 10 shows an example of a cornea having an astigmatism comprising a steep meridian (solid line) and a flat meridian (dashed line). For example, a steep meridian may have a smaller base curve (e.g., radius of curvature) than a flat meridian. In some embodiments, the flat meridian has a higher radius of curvature than a steep meridian. In some embodiments, the steep meridian is more curved than the flat meridian. In some embodiments, the steep meridian has a base curve of about 7.4 mm and the flat meridian has a base curve of about 7.6 mm. FIG. 11 is a graph depicting the difference in a meridian of a cornea having an astigmatism 1130 and a contact lens of the disclosure fitted over the astigmatism 1120, where the x-axis represents a distance from the center of the cornea towards the limbus, noted by 1150, and the y-axis represents a distance from the sclera to the cornea's apex. The contact lens 1120 comprises a single base curve when in a neutral configuration, however, when placed on the eye, at least a portion of the peripheral portion conforms to the cornea in an area closer to the limbus 1125*a*. In some embodiments, least a portion of the peripheral portion conforms to the cornea to become relatively flatter. In some embodiments, the height profile of the contact lens 1120 (dash-dotted line) is relatively flat at its center and conforms to the shape of the cornea closer to the cornea's apex 1125*b*. In some embodiments, the center of the contact lens is in contact with the apex of the cornea. The area between the steep portion of the cornea having an astigmatism 1130 and the lens 1120 creates a volume between the cornea and the lens. In some embodiments, 1140 shows the height difference between the posterior surface of the lens and the surface of the cornea.

In some embodiments, the inner portion of the contact lens provided herein drapes over the flat meridian and vaults over the steep meridian. In some embodiments, the juncture is configured to allow at least a portion of the inner portion to vault over a portion of a cornea to form a lenticular volume in between the inner portion and the cornea when the lens is placed on the eye. In some embodiments, the inner portion vaults over the steep meridian due to the fluid that fills the space between the cornea and the inner portion of the lens (e.g., lenticular volume). In some embodiments, the inner portion vaults over the steep meridian due to the juncture and/or fenestration that allow the fluid to access the space between the cornea and the inner portion of the lens. In some embodiments, the fluid that fills the space between the cornea and the inner portion of the lens (e.g., lenticular volume) helps to maintain the shape of the inner portion. In some embodiments, the space is filled with tear fluid. In some embodiments, the height of the space 1140 is determined by the difference between the flat and the steep meridians and/or by the capability of the lens to resist conforming to the steep meridian.

Figure 14B:
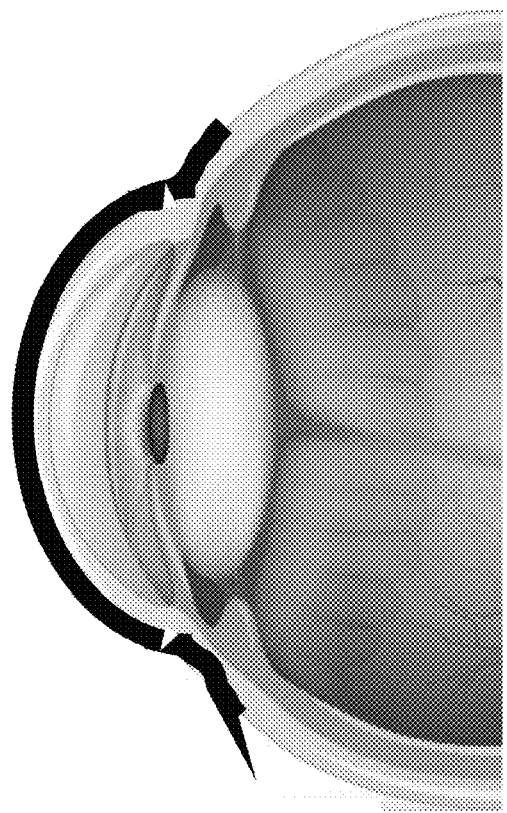
FIGS. 14A and 14B illustrate a contact lens over a steep meridian of an astigmatic cornea and a contact lens over a flat meridian of an astigmatic cornea, respectively.
Figure 14A:
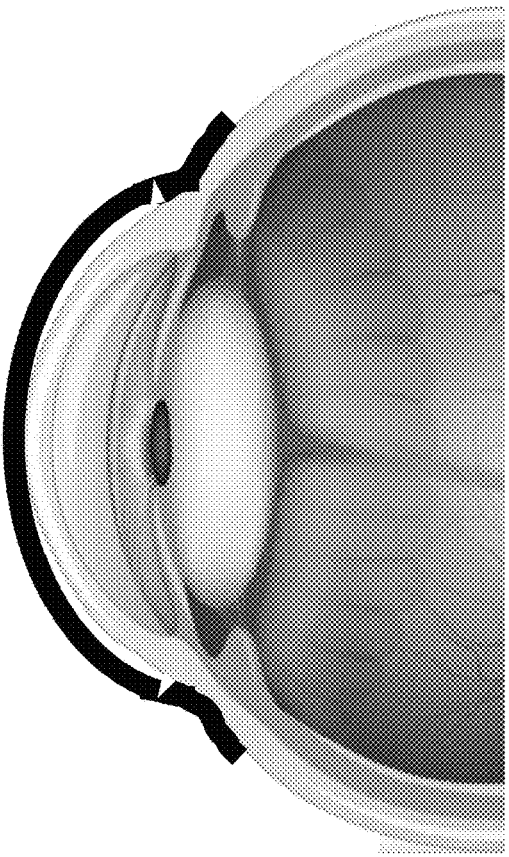

As shown in FIG. 14A, a contact lens of the disclosure over a steep meridian of an astigmatic cornea vaults over the steep meridian. As shown in FIG. 14B, a contact lens of the disclosure over a flat meridian of an astigmatic cornea conforms more closely to the cornea (e.g., drapes over the flat meridian).

In some embodiments, the level of astigmatism is related to the difference in corneal curve between two meridians. In some embodiments, the difference in corneal curve between two meridians is at least about 0.05 mm, about 0.1 mm, about 0.15 mm, about 0.2 mm, or about 0.3 mm. In some embodiments, the difference in corneal curve between two meridians is from about 0.05 mm to about 0.3 mm. In some embodiments, the difference in corneal curve between two meridians is from about 0.1 mm to about 0.3 mm. In some embodiments, the difference in corneal curve between two meridians is about 0.2 mm. In some embodiments, the amount of astigmatism may dictate the value of height difference between the back surface of the lens and the surface of the cornea 1140. For example, 1D of astigmatism may have a lower height different than 2D of astigmatism.

In some embodiments, the height difference between the posterior surface of the inner portion and the surface of the cornea varies across the posterior surface of the inner portion. In some embodiments, the variation of the height difference between the posterior surface of the inner portion and the surface of the cornea across the inner portion is more than about 0.01 µm, about 0.1 µm, about 0.5 µm, about 1 µm, about 5 µm, about 10 µm, about 50 µm, about 100 µm, or about 200 µm. In some embodiments, the variation of the height difference between the posterior surface of the inner portion and the surface of the cornea across the inner portion is more than about 1%, about 5%, about 10%, about 15%, about 20%, about 25%, about 30%, about 35%, about 40%, about 45%, or about 50% of the largest height difference. In some embodiments, the height difference refers to the shortest distance between the posterior surface of the inner portion and the surface of the cornea.

In some embodiments, the lens comprises a juncture positioned between the inner portion and the peripheral portion. In some embodiments, the juncture provides a mechanically weaker portion and/or has increased flexibility. In some embodiments, the flexibility of the juncture allows for the peripheral portion and the inner portion to move separately and/or independently of each other. In some embodiments, the juncture dampens a transfer of a deformation force and/or elastic energy from the peripheral portion when the peripheral portion deforms and/or conforms to the ocular surface (e.g., cornea). In some embodiments, the dampening effect of the juncture allows the inner portion to substantially maintain its shape when the peripheral portion deforms. In some embodiments, the dampening effect of the juncture allows the inner portion to maintain its shape. In some embodiments, the shape of the inner portion comprises a substantially spherical anterior surface. In some embodiments, the maintenance of the shape of the inner portion allows the inner portion to vault over at least a portion of the cornea when the peripheral portion conforms to the ocular surface. In some embodiments, the inner portion vaults over the steep meridian of the cornea and substantially conforms to the flat meridian of the cornea. In some embodiments, the vaulting of the inner portion allows for a tear lens to form. In some embodiments, the vaulting of the inner portion provides a space to be filled with tear fluid in order to form a tear lens. In some embodiments, the tear lens aids in correcting the refractive error of the eye. In some embodiments, the contact lens comprises a vaulted region corresponding to the inner portion. In some embodiments, a lens comprising a vaulted region may comprise a relatively stiffer region to facilitate centering the lens on the eye. In some embodiments, a relatively steep peripheral portion of the lens conforms to the cornea.

Figure 12C:
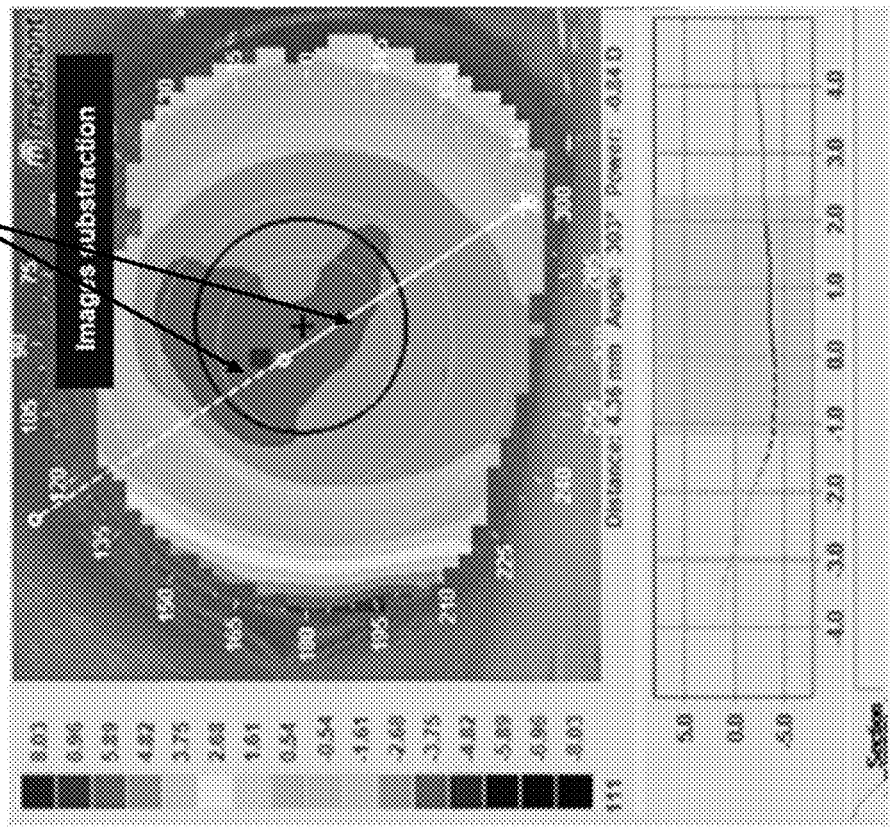
FIGS. 12A-12C illustrate the topography of a bare eye having an astigmatism (FIG. 12A), an eye having a RGP lens (FIG. 12B), and the subtraction of the two images to show the masking provided by the RGP lens (FIG. 12C).
Figure 12A:
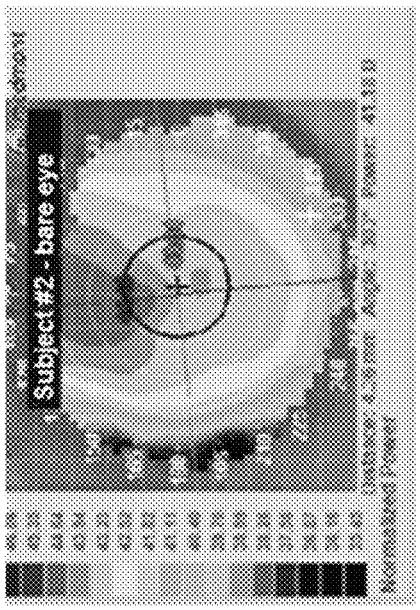
Figure 12B:
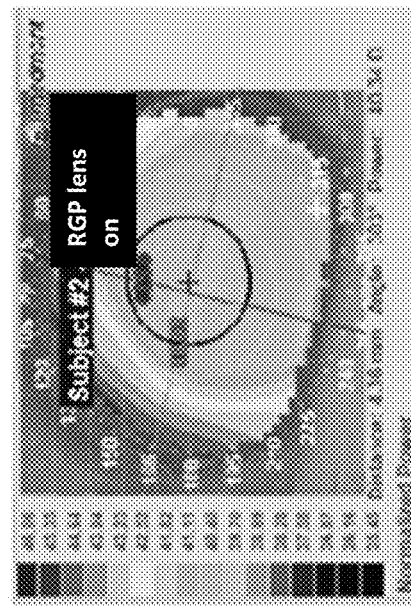
Figure 13C:
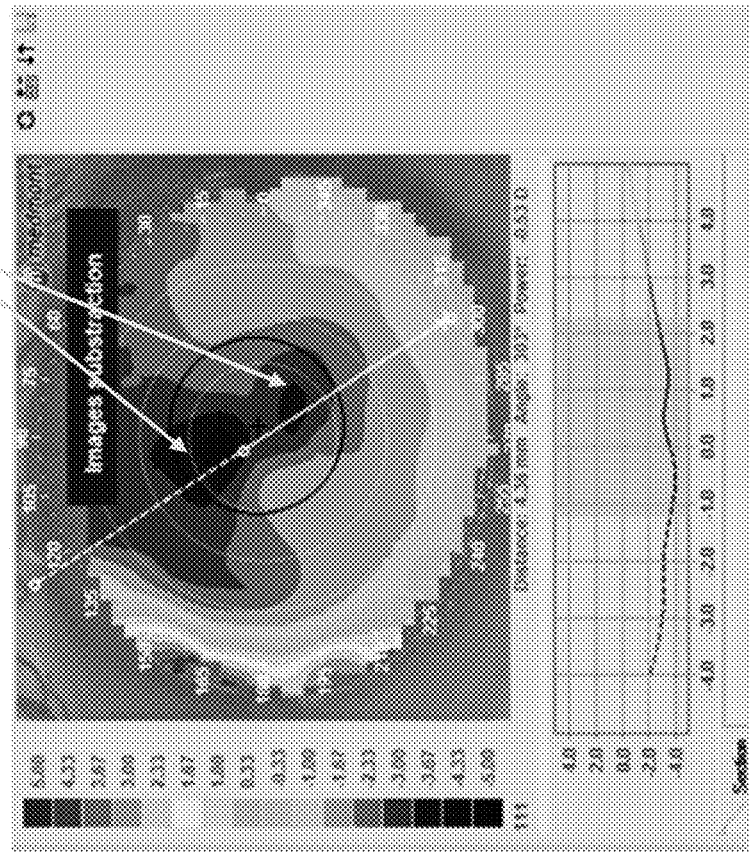
FIGS. 13A-13C illustrate the topography of a bare eye having an astigmatism (FIG. 13A), an eye having a contact lens provided herein (FIG. 13B), and the subtraction of the two images to show the masking provided by the contact lens provided herein (FIG. 13C). The subject is the same as the subject of FIGS. 12A-12C.
Figure 13A:
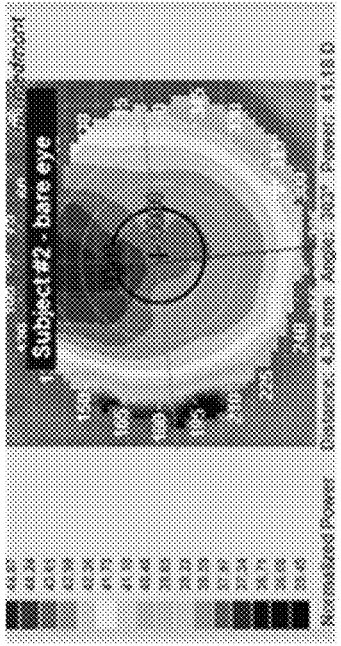
Figure 13B:
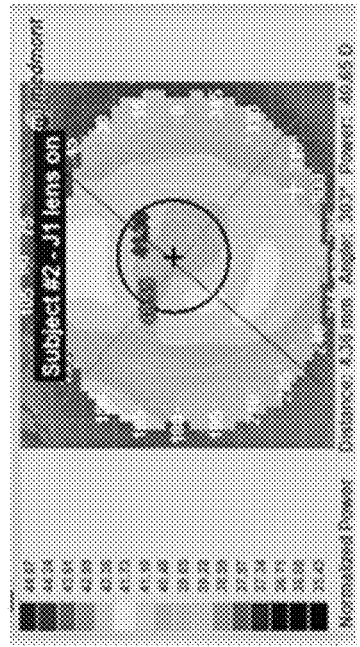

In some embodiments, the contact lens provided herein corrects the refractive error similarly to a RGP lens. In some embodiments, the contact lens provided herein performs similarly to a RGP lens. In some embodiments, the contact lens provided herein performs about 75%, about 80%, about 85%, about 90%, about 95% similarly to a RGP lens. FIGS. 12A-12C illustrate the performance of a RGP lens in masking astigmatism. FIGS. 12A-12C shows topography images of a bare cornea having an astigmatism (FIG. 12A), a cornea having a RGP lens on the cornea (FIG. 12B), and the subtraction of the two images with and without the RGP lens to show the masking provided by the RGP lens (FIG. 12C). For example, as shown in FIG. 12A, the cornea has a steeper curve in the top portion, as indicated by darker shading. FIG. 12B shows the evening out of the curvature of the surface of the eye with the placement of the RGP lens over the astigmatic cornea. FIG. 12C shows the level of masking provided by the RGP lens across the ocular surface, with the level of masking correlating with the darkness of the shading. The darker shade indicates the vaulting of the RGP lens over steep meridian, indicated by the white dotted line. Similarly, FIGS. 13A-13C shows topography images of a bare cornea having an astigmatism (FIG. 13A), a cornea having a contact lens described herein on the cornea (FIG. 13B), and the subtraction of the two images with and without the contact lens to show the masking provided by the contact lens (FIG. 13C). The subject of FIGS. 13A-13C is the same as the subject of FIGS. 12A-12C. For example, as shown in FIG. 13A, the cornea has a steeper curve in the top portion, as indicated by darker shading. FIG. 13B shows the evening out of the curvature of the surface of the eye with the placement of the contact lens over the astigmatic cornea. FIG. 13C shows the level of masking provided by the contact lens across the ocular surface, with the level of masking correlating with the darkness of the shading. The darker shade indicates the vaulting of the contacts lens over steep meridian, indicated by the white dotted line. FIGS. 13B and 13C illustrate the spherical correction provided by the contact lens provided herein. In some embodiments, the anterior surface of the inner portion is substantial spherical in shape.

In some embodiments, the inner portion of the lens described herein provides the optical correction to the user. In some embodiments, the inner portion substantially covers the pupil. In some embodiments, the inner portion substantially covers a dilated pupil of a subject. In some embodiments, the diameter of the inner portion is at least about 3 mm, about 4 mm, about 5 mm, about 6 mm, about 7 mm, about 8 mm, about 9 mm, or about 10 mm. In some embodiments, the diameter of the inner portion is from about 5 mm to about 7 mm. In some embodiments, the diameter of the inner portion is about 6.5 mm. In some embodiments, the diameter of the inner portion is about 6.6 mm. In some embodiments, the radius of the inner portion is at least about 1.5 mm, about 2 mm, about 2.5 mm, about 3 mm, or about 3.5 mm. In some embodiments, the radius of the inner portion is about 3 mm. In some embodiments, the radius of the inner portion is about 3.3 mm. In some embodiments, the radius of the inner portion is about 3.5 mm.

In some embodiments, a combination of the inner portion and the lenticular volume is configured to correct the ocular refractive error of the eye, including but not limited to astigmatism, coma, corneal irregularities, and other corneal shape-related optical aberrations. In some embodiments, the soft contact lenses may correct (i.e., mask) an ocular refractive error or aberration of the eye by at least about 20%, at least 30%, at least 40%, at least 50%, at least 60%, at least 65%, at least 70%, at least 75%, at least 80%, at least 85%, at least 90%, at least 95%, at least 99%, at least or more. In some embodiments, the soft contact lenses may correct an ocular refractive error or aberration of the eye by about 20% or more. In some embodiments, the soft contact lenses may correct an ocular refractive error or aberration of the eye by about 50% or more. In some embodiments, the soft contact lenses may correct an ocular refractive error or aberration of the eye by about 90% or more. In some embodiments, correcting (i.e., mask) an ocular refractive error or aberration of the eye by a certain percentage refers to increasing the visual acuity as compared to that of a normal visual acuity (e.g., 6/6 or 20/20 vision).

In some embodiments, the soft contact lenses may correct (i.e., mask) an astigmatism. In some embodiments, the soft contact lenses may correct (i.e., mask) an astigmatism by at least about 20%, at least 30%, at least 40%, at least 50%, at least 60%, at least 65%, at least 70%, at least 75%, at least 80%, at least 85%, at least 90%, at least 95%, at least 99%, at least or more. In some embodiments, the soft contact lens may correct an astigmatism by about 20% or more. In some embodiments, the soft contact lens may correct an astigmatism by about 25% or more. In some embodiments, the soft contact lens may correct an astigmatism by about 90% or more. In some embodiments, the soft contact lens may correct an astigmatism by about 95% or more. In some cases, the contact lenses may mask an astigmatism by at most about 99%, 95%, 90%, 85%, 80%, 75%, 70%, 65%, 60%, 50%, 40%, 30%, 20%, or less. In some embodiments, correcting (i.e., mask) an astigmatism by a certain percentage refers to increasing the visual acuity as compared to that of a normal visual acuity (e.g., 6/6 or 20/20 vision).

In some embodiments, a soft contact lens may mask astigmatism up to 1 Diopter (D). In some embodiments, the soft contact lens may also mask an astigmatism up to 2 D. In some embodiments, the soft contact lens may also mask an astigmatism up to 3 D. In some embodiments, the soft contact lens may also mask an astigmatism up to 4 D. The soft contact lenses may mask astigmatism by an amount that is within a range defined by any two of the preceding values. In some embodiments, the soft contact lens masks an astigmatism between 1 D and 1.25 D. In some embodiments, the soft contact lens masks an astigmatism between 0.25 D and 1.25D. In some embodiments, the soft contact lens masks an astigmatism between 0.5D and 2.5D. In some embodiments, the soft contact lens masks an astigmatism between 0.1 D and 5 D.

In some embodiments, correcting an ocular refractive error or aberration of the eye comprises masking a diameter of the corneal surface of about 1 millimeter (mm), about 2 mm, about 3 mm, about 4 mm, about 5 mm, about 6 mm, about 7 mm, about 8 mm, about 9 mm, about 10 mm, about 11 mm, about 12 mm, or more. In some embodiments, masking an ocular refractive error or aberration of the eye comprises masking a diameter of the corneal surface by about 12 mm, about 11 mm, about 10 mm, about 9 mm, about 8 mm, about 7 mm, about 6 mm, about 5 mm, about 4 mm, about 3 mm, about 2 mm, about 1 mm, or less. The ocular refractive error or aberration of the eye may have an area within a range defined by any two of the preceding values. In some embodiments, masking an ocular refractive error or aberration of the eye comprises masking a diameter of the corneal surface by about 1 mm to about 12 mm. In some embodiments, the ocular refractive error or aberration of the eye may be positioned between about 8 mm and about 9 mm of the central diameter of the cornea.

In some embodiments, correcting an astigmatism comprises masking a 1 millimeter (mm), 2 mm, 3 mm, 4 mm, 5 mm, 6 mm, 7 mm, 8 mm, 9 mm, 10 mm, 11 mm, 12 mm, or larger diameter of the corneal surface. In some embodiments, masking an astigmatism comprises masking about a 12 mm, 11 mm, 10 mm, 9 mm, 8 mm, 7 mm, 6 mm, 5 mm, 4 mm, 3 mm, 2 mm, 1 mm, or smaller diameter of the corneal surface. In some embodiments, the astigmatic area is within a range defined by any two of the preceding values. In some embodiments, masking an astigmatism comprises masking about a 1 mm to about 12 mm diameter of the corneal surface. In some embodiments, the astigmatic area is between about 8 mm and about 9 mm of the central diameter of the cornea.

In some embodiments, the lens of the disclosure reduces the number of different contact lenses needed to be manufactured and stored. In some embodiments, the soft contact lenses may reduce stock keeping unit (SKU) requirements. In some embodiments, the soft contact lenses may reduce stock keeping unit (SKU) requirements by at least about 30%, at least 40%, at least 50%, at least 60%, at least 70%, at least 80%, at least 90%, at least 95%, at least 99%, or more compared to soft toric contact lenses or other conventional contact lenses. In some embodiments, the soft contact lenses may reduce SKU requirements by at most about 99%, at most 95%, at most 90%, at most 80%, at most 70%, at most 60%, at most 50%, or less compared to soft toric contact lenses or other conventional contact lenses. In some embodiments, a soft contact lens provided herein may reduce SKUs requirements by at least 50%. In some embodiments, a soft contact lens provided herein may reduce SKUs requirements by at least 80%. In some embodiments, a soft contact lens provided herein may reduce SKUs requirements by up to about 95%. The contact lenses may reduce SKU requirements by an amount that is within a range defined by any two of the preceding values. For example, soft toric contact lenses may require greater than 4000 SKUs, and the soft contact lenses described herein may require about 500 SKU, or less. In some embodiments, the lens described here enables reduction in SKUs in at least an order of magnitude and up to two orders of magnitudes to cover the spectrum of powers between −9 diopters and +6 diopters.

In some embodiments, the contact lens may reduce the required fitting time or chair time at the eye care professional, e.g., the time it takes for the user to find the lens prescription that corrects the refractive error to their satisfaction. In some embodiments, the fitting time is reduced as there are fewer lens options to try and/or a single design of the lenses provided herein is configured to correct a wide range of refractive errors. In some embodiments, fitting time is reduced by about 25% or more. In some embodiments, fitting time is reduced by about 50% or more. In some embodiments, fitting time is reduced by about 80% or more. In some embodiments, fitting time is reduced by about 90% or more. In some embodiments, the lens does not require fitting.

In some embodiments, the contact lens may reduce the number of visits to an eye care professional until the final lens fit is determined. In some embodiments, the number of visits to the eye care profession is reduced by about 25% or more. In some embodiments, the number of visits to the eye care profession is reduced by about 50% or more. In some embodiments, the number of visits to the eye care profession is reduced by about 80% or more. In some embodiments, the number of visits to the eye care profession is reduced by at least 1, 2, 3, 4, or 5 visits.

In some embodiments, minimal or no fitting of lens base curve allows for fitting a wide range of corneal base curves. In some embodiments, described herein are methods for correcting vision of a subject. An exemplary method may include steps of identifying a subject in need of vision correction, including astigmatism or an optical aberration of an eye of the subject, and providing at least one of the contact lenses described herein to the subject. In some embodiments, there is minimal need for fitting of a base curve of the at least one contact lens to a base curve of a cornea of the subject. In some cases, no fitting of the base curve of the at least one contact lens to the base curve of the cornea is needed.

In some embodiments, the lens comprises a back (posterior) surface base curve (BC) that is radially the same. For example, the lens comprises the same base curve at the same radius regardless of the meridian angle.

Provided herein are lenses which may be used to correct an astigmatism in an eye of a subject. A side sectional view of an exemplary lens 120 positioned or disposed on an eye 100 of a subject is schematically illustrated in FIG. 1. A top-down three-dimensional ("3D") views of a lens 120 are shown in FIGS. 3A, 3B, 7, 3D, 3E, 3F, 3G, 3H, 3I, and 3J. A 3D side sectional view of the lens 120 providing its dimensions is shown in FIG. 1 and FIGS. 14A and 14B.

FIG. 1 shows a side sectional view of a lens 120 positioned or disposed on an eye 100 of a subject. FIG. 4A illustrates a lens positioned above an eye 100 of a subject. FIG. 4B illustrates a lens disposed on an eye 100 of a subject. In some embodiments, the lens 120 comprises a contact lens. The eye 100 comprises a cornea 150 and an eye lens 110 configured to form an image on the retina (not shown). In some embodiments, the lens 120 is configured to correct or mask an astigmatism of the eye 100. In some embodiments, the lens comprises a soft lens body having an inner portion 210, a peripheral portion 160, and a juncture 130. In some embodiments, the juncture 130 is between the inner portion 210 and peripheral portion 160. In some embodiments, the lens 120 comprises a posterior surface 190 and an anterior surface 170. In some embodiments, either the anterior surface 170, the posterior surface 190, or both, of the lens 120 is axially symmetric when the lens 120 is in a neutral configuration. In some embodiments, the lens is in a neutral configuration when the lens 120 is not placed on any eye or other surface, for instance, when the lens 120 is placed and/or stored in a contact lens solution). In some embodiments, either the anterior surface 170, the posterior surface 190, or both, of the lens 120 is rotationally symmetric when the lens 120 is disposed on an eye 100 of a subject. In some embodiments, the anterior surface 170, the posterior surface 190, or both, of the lens 120 is rotationally symmetric such that the lens 120 has the same base curve throughout regardless of the meridian of the eye, reducing the need for precise rotational stabilization of the lens 120. In some embodiments, the lens does not provide a cylindric optical power when in a neutral configuration. In some embodiments, the lens is axisymmetric. In some embodiments, the lens is rotationally symmetric.

In some embodiments, the peripheral portion 160 of the lens 120 is disposed radially outward from the inner portion 210. In some embodiments, the posterior surface 190 of the peripheral portion 160 is configured to contact a surface of the eye 100 when disposed thereon. In some embodiments, the posterior surface 190 of the peripheral portion 160 is configured to conform to the surface of the eye 100. In some embodiments, at least a portion of the posterior surface 190 of the peripheral portion 160 conforms to the surface of the eye 100. In some embodiments, the posterior surface 190 of the peripheral portion 160 is configured to conform to astigmatism or higher order aberration. In some embodiments, at least a portion of the posterior surface 190 of the peripheral portion 160 conforms to an astigmatism or higher order aberration. In some embodiments, the posterior surface 190 of the peripheral portion 160 is configured to conform to the meridians of the eye 100 such that there is only a negligible difference between the sphericity of the cornea 150 and the sphericity of the peripheral portion 160. In some embodiments, at least one portion of the soft lens body within a peripheral edge of the soft lens body is configured to be suspended over surface of the cornea 150.

In some embodiments, the peripheral portion 160 of the lens 120 is disposed radially outward from the inner portion 210. In some embodiments, the posterior surface of the peripheral portion 160 is configured to contact a surface of the eye 100 when disposed thereon. In some embodiments, the posterior surface of the peripheral portion 160 is configured to conform to the surface of the eye 100. In some embodiments, at least a portion of the posterior surface of the peripheral portion 160 conforms to the surface of the eye 100. In some embodiments, the posterior surface of the peripheral portion 160 is configured to conform to astigmatism or higher order aberration. In some embodiments, at least a portion of the posterior surface of the peripheral portion 160 conforms to an astigmatism or higher order aberration. In some embodiments, the posterior surface of the peripheral portion 160 is configured to conform to the meridians of the eye 100 such that there is only a negligible difference between the sphericity of the cornea 150 and the sphericity of the peripheral portion 160. In some embodiments, at least one portion of the soft lens body within a peripheral edge of the soft lens body is configured to be suspended over surface of the cornea 150.

In some embodiments, at least a portion of the inner portion is suspended further above the surface of the cornea when compared with another portion of the inner portion. In some embodiments, at least a portion of the inner portion is suspended above the surface of the cornea and another portion of the inner portion conforms to the surface of the cornea. In some embodiments, at least a portion of the inner portion and at least a portion of the peripheral portion are suspended above the surface of the cornea. In some embodiments, at least a portion of the inner portion is suspended further above the surface of the cornea when compared with at least a portion of the peripheral portion. In some embodiments, at least a portion of the inner portion conforms to the surface of the cornea and at least a portion of the peripheral portion is suspended above the surface of the surface of the cornea.

In some embodiments, a peripheral portion conforms to both the steep portion and flat portion of the cornea while the inner portion vaults over the steep portion of the cornea and conforms over the flat portion of the cornea. In some embodiments, the mechanical deformation in the peripheral portion as a consequence of its conformation to two different meridional curves does not mechanically transfer the deformation to the inner portion of the lens.

In some embodiments, the diameter from which a lens vaults over at least a portion of the cornea is the location of the discontinuity (e.g., juncture). In some embodiments, a hinged area comprises a discontinuity. In some embodiments, a hinged area comprises a fenestration, thinning, or any other feature that causes local reduction in lens rigidity. In some embodiments, a hinged area comprises a local treatment to the material or its geometry that reduces the force transfer between the inner portion and peripheral portion. In some embodiments, the location of a discontinuity depends on the functional properties desired of such lens. For example, if the desire is to have an inner portion that both vaults and is free of optical aberration when the pupil is dilated to 7 mm, and that the peripheral portion conforms to allow lens stability, then the discontinuity needs to be substantially at 7 mm. For example, if the desire is to allow for smaller optical zone (e.g., inner portion) such as 6 mm, which may improve central vaulting, then in such a case the discontinuity needs to be substantially at 6 mm.

Figure 3D:
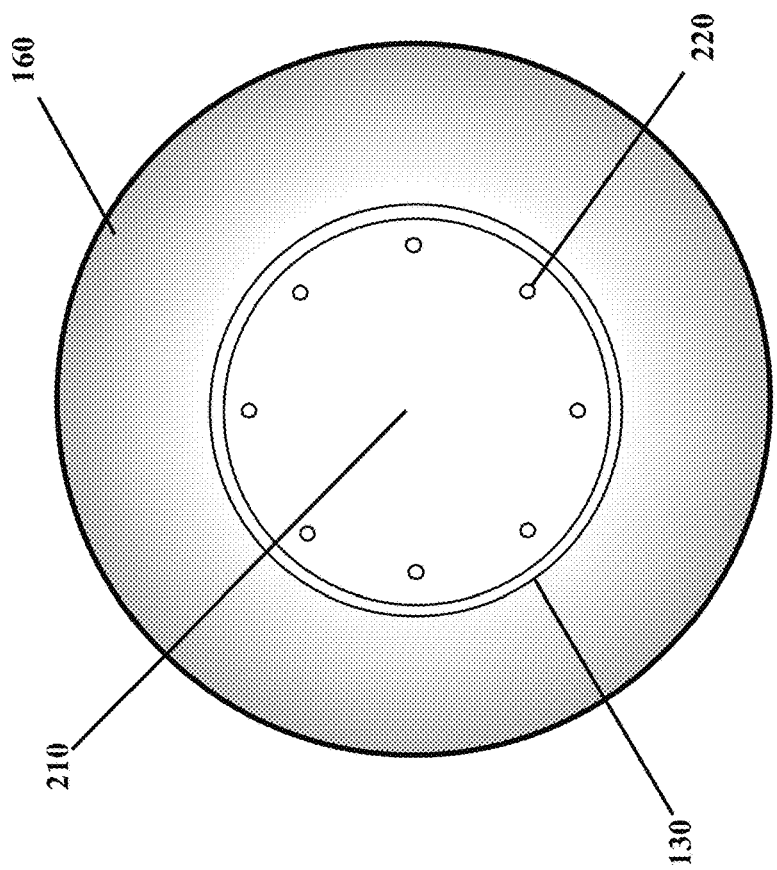
Figure 3C:
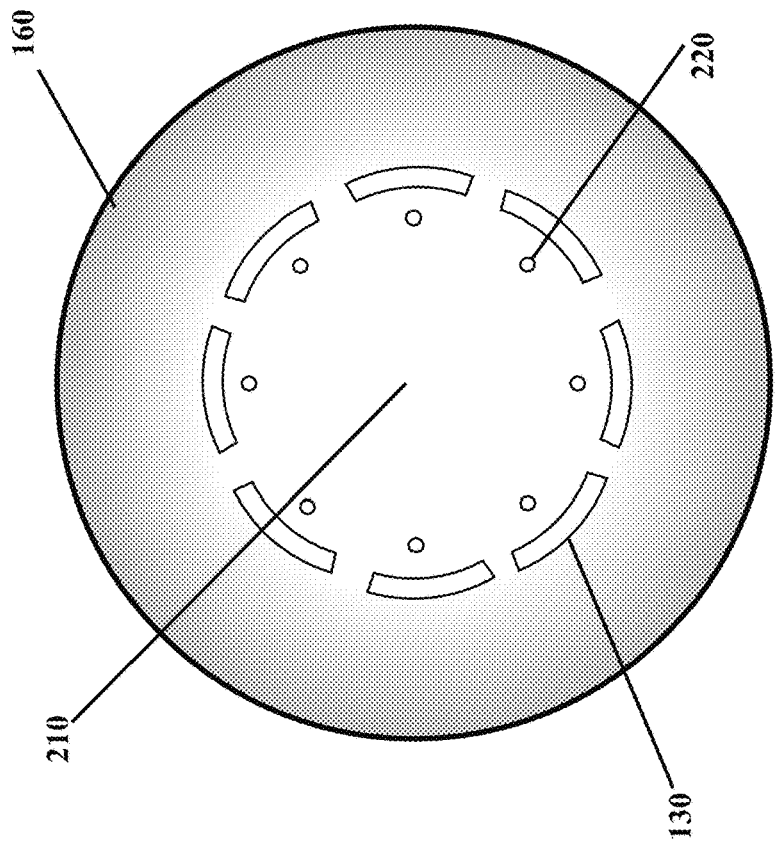

In some embodiments, the lens 120 further comprises a juncture 130. In some embodiments, the juncture 130 is between the inner portion 210 and the peripheral portion 160. In some embodiments, the juncture 130 is positioned in the inner portion 210. In some embodiments, the juncture 130 is positioned in the peripheral portion 160. In some embodiments, the juncture 130 is positioned circumferentially around the center of the inner portion 210. In some embodiments, the juncture 130 is positioned adjacent to the inner portion 210. In some embodiments, the juncture 130 is positioned radially. In some embodiments, the juncture 130 is continuous spanning the entirety of a given circumference. FIG. 3D shows an example of a lens 120 having a continuous juncture 130 positioned circumferentially. In some embodiments, the juncture 130 is discontinuous spanning only discrete portions of a given circumference. FIG. 3C shows an example of a lens 120 having a discontinuous juncture 130 positioned circumferentially. In some embodiments, the juncture 130 is positioned radially (i.e., directed away from the center of the inner portion 210). In some embodiments, the juncture is positioned both circumferentially and radially such that on some meridians the junctures are positioned circumferentially, and on some meridians the junctures are positioned radially. In some embodiments, the juncture 130 is a uniformly circumferential portion. In some embodiments, the juncture 130 is not uniformly circumferential.

In some embodiments, the juncture 130 is configured to allow the peripheral portion 160 to conform to the surface of the eye 100 without deforming the inner portion 210. In some embodiments, at least a portion of the peripheral portion 160 of the soft lens body is configured to conform to the surface of the cornea 150 forming a deformation of the soft lens body. In some embodiments, the juncture 130 is further configured to substantially prevent translation of the deformation to the inner portion 210 of the soft continuous lens body, with the juncture 130 acting as a hinge or pivot, for example. In some embodiments, the juncture 130 is a single groove, multiple grooves, a single thinned region, multiple thinned regions, a single living hinge, multiple living hinges, a single partially disconnected segment, a single partially disconnected segment, multiple partially disconnected segments, a thinner or disconnected segments, distributed around the center of the inner portion 210.

In some embodiments, the juncture configured such the inner portion vaults over a portion of a cornea to form a lenticular volume in between the inner portion and the cornea and at least a portion of the peripheral portion conform to an ocular surface to maintain the lenticular volume when the lens is placed on the eye.

In some embodiments, the covering (e.g., lens) comprises a hinged, weakened, or pivoting area present between the inner portion and the peripheral portion. In some embodiments, a juncture between the inner portion and peripheral portion is a hinged, weakened, or pivoting area. In some embodiments, a juncture is a thinned region (e.g., reduced thickness relative to adjacent parts of the lens). In other embodiments, the juncture comprises a groove, an annulus, a discontinuous segment, or a slit, or a combination thereof. In some embodiments, the juncture comprises a fenestration.

In some embodiments, the juncture is in the shape of an annulus about the center of the lens. In some embodiments, the annulus comprises an inner diameter and an outer diameter. In some embodiments, the inner diameter is a diameter of the juncture as described elsewhere herein. In some embodiments, the outer diameter is a diameter of the juncture as described elsewhere herein. In some embodiments, the width of a juncture is the difference between the outer diameter of an annulus and the inner diameter of an annulus.

In some embodiments, the lens comprises an annulus shaped transition zone relative to the areas immediately central and peripheral to the transition zone. In some embodiments, the lens contains features that reduce the structural integrity of the annulus shaped transition zone relative to the areas immediately central and peripheral to the transition zone.

In some embodiments, the cross-sectional thickness of transition zone is less than the thickness of the areas immediately adjacent in the inner and peripheral portions. In some embodiments, the annulus contains discontinuous features, such as one or more of a well, groove, or fenestration. In some embodiments, the discontinuous features create voids in the lens body. In such embodiments, the voids may weaken the annulus relative to the non-voided areas immediately adjacent in the inner and peripheral directions.

In some embodiments, the structural integrity of the annulus is reduced by imparting a partial thickness cut or slit in the material. In some embodiments, minimal material is removed with a slit, however the mechanical properties may significantly be altered. The region in the area of the slit may not behave as a cohesive body. The slit may effectively impart a hinge mechanism in the annulus. In some embodiments, no material is removed with a slit. In some embodiments, a slit extends from the posterior surface to the anterior surface of the lens. In some embodiments, a slit extends partially through the thickness of a lens. In some embodiments, a juncture comprises a slit. In such embodiments, the width of the juncture is substantially 0 µm.

In some embodiments, the annulus is created by a chemical treatment. In some embodiments, the chemical treatment weakens the juncture by a change in material or composition. For example, by incorporating a lower modulus polymer into the annulus, the annulus may have a reduced rigidity relative to the regions of the lens immediately central and peripheral to the annulus. In some embodiments, the reduced modulus is incorporated via selective curing processes. In some embodiments, the lens is machined from a stock of material that contains annular regions of differing polymers. In some embodiments, the annulus shaped transition zone or annular region is referred to as a juncture or discontinuity herein.

In some embodiments, a weakened area (e.g., discontinuity) located too centrally in comparison to the optical zone may cause optical aberration. In some embodiments, a weakened area located too peripherally in comparison to the optical zone may not allow sufficient vaulting. In some embodiments, an optimal diameter of a weakened area (e.g., juncture) is between 3 mm and 8 mm from the center of the lens. In some embodiments, juncture has a distance of about 2 mm to about 9 mm across the center of the lens.

In some embodiments, the juncture comprises a structurally weakened portion. In some embodiments, a structurally weakened portion may comprise a groove, a thinned region, a hinge, or a disconnected segment. In some embodiments, a structurally weakened portion may comprise a different material composition than the material composition of the lens body.

In some embodiments, the juncture is prepared by removing a portion of the lens to result in a juncture. In some embodiments, removing a portion of the lens comprises cutting of the portion of the lens. In some embodiments, removing a portion of the lens comprises chemically treating the portion of the lens. In some embodiments, the juncture is prepared by chemically treating a portion of the lens comprising the juncture. In some embodiments, chemical treatment comprises selectively curing the portion of the lens. In some embodiments, the juncture is prepared by electrically treating a portion of the lens comprising the juncture.

In some embodiments, the juncture comprises one or more of a groove, a thinned region, a hinge, or a disconnected segment. In some embodiments, the juncture comprises a groove. In some embodiments, the juncture comprises a thinned region. In some embodiments, the juncture comprises a hinge. In some embodiments, the juncture comprises a disconnected segment.

In some embodiments, the juncture has a thinner cross-section than the inner portion or the peripheral portion or the combination thereof.

In some embodiments, the juncture comprises a plurality of disconnected segments. In some embodiments, the juncture comprises any suitable number of disconnected segments. In some embodiments, a juncture comprises at least 2 disconnected segments, at least 3, at least 4, at least 5, at least 6, at least 7, at least 8, at least 9, at least 10, at least 15, at least 20, at least 30, at least 50, at least 60, at least 100, at least 200 disconnected segments. In some embodiments, the juncture comprises at least 2 disconnected segments. In some embodiments, the juncture comprises at least 4 disconnected segments. In some embodiments, the juncture comprises at least 8 disconnected segments. In some embodiments, the juncture comprises at least 20 disconnected segments. In some embodiments, the juncture comprises a perforation in the lens material.

In some embodiments, the juncture comprises a plurality of grooves. In some embodiments, the juncture comprises any suitable number of grooves. In some embodiments, a juncture comprises at least 2 grooves, at least 3, at least 4, at least 5, at least 6, at least 7, at least 8, at least 9, at least 10, at least 15, at least 20, at least 30, at least 50, at least 60, at least 100, at least 200 grooves.

In some embodiments, the juncture comprises a plurality of slits. In some embodiments, the juncture comprises any suitable number of slits. In some embodiments, a juncture comprises at least 2 slits, at least 3, at least 4, at least 5, at least 6, at least 7, at least 8, at least 9, at least 10, at least 15, at least 20, at least 30, at least 50, at least 60, at least 100, at least 200 slits.

In some embodiments, the lens comprises a plurality of fenestrations. In some embodiments, the lens comprises any suitable number of fenestrations. In some embodiments, a lens comprises at least 2 slits, at least 3, at least 4, at least 5, at least 6, at least 7, at least 8, at least 9, at least 10, at least 15, at least 20, at least 30, at least 50, at least 60, at least 100, at least 200 fenestrations.

In some embodiments, the juncture is arranged in an any suitable shape about the center of the lens. In some embodiments, the juncture is arranged in a substantially circular shape about a center of the lens. A circularly shaped juncture may also be referred to as an annulus shaped juncture herein. In some embodiments, the juncture is arranged in a circular shape about a center of the lens. In some embodiments, the juncture is arranged in an ovular shape about a center of the lens. In some embodiments, the juncture is arranged in a substantially square shape about a center of the lens. In some embodiments, the juncture is arranged in a square shape about a center of the lens. In some embodiments, the juncture is symmetrical. In some embodiments, the juncture is oriented substantially circumferentially. In some embodiments, the juncture is oriented substantially radially.

In some embodiments, the juncture is arranged in any suitable shape off-set from the center of the lens. In some embodiments, the juncture is arranged such that the center of the juncture's shape is not positioned exactly over the center of the lens, or the center of the inner portion. In some embodiments, the center of the juncture arrangement is at most 5 mm from the center of the lens. In some embodiments, the center of the arrangement is at most 1 mm from the center of the lens. For example, the center of the juncture arrangement is 1 micron from the center of the lens.

In some embodiments, a lens 120 having a juncture 130 positioned radially requires an additional feature or feature(s) (i.e., pooling areas) to allow at least a portion of the peripheral portion 160 to conform to the surface of the eye 100 without translating the deformation to the inner portion 210. In some embodiments, the pooling areas allow fluids, including tear and artificial tear fluids, to pool or collect. In some embodiments, the juncture 130 is positioned on the posterior surface of the lens 120 which may reduce optical aberrations. In some embodiments, the juncture 130 is positioned on the anterior surface 170 of the lens 120. In some embodiments, the juncture 130 is positioned away from center of the inner portion 210 of the lens 120 to limit the visual impact of optical aberrations caused by the geometry or mechanics of the juncture 130. In some embodiments, the juncture 130 is positioned away from the distal edge of the peripheral portion 160 of the lens 120 to allow at least a portion of the inner portion 210 to be vault (i.e., be suspended) 320 over the surface of the cornea 150. In some embodiments, the juncture 130 defines the area of the ocular refractive error or optical aberration masked, or from which the ocular refractive error or optical aberration is reduced relative to the corneal ocular refractive error or optical aberration. In some embodiments, the area of the ocular refractive error or optical aberration defined by the juncture 130 contains ocular refractive error or optical aberration, such as an astigmatism or coma.

In some embodiments, the juncture 130 allows for a reduction of the mechanical transfer of peripheral deformation towards the inner portion 210 of the lens 120 reducing astigmatism in the inner portion 210. In some embodiments, the inner portion 210 has an astigmatism in the periphery of the inner portion 210 which is reduced near the center of the inner portion 210.

In some embodiments, the juncture has any suitable rigidity. In some embodiments, the juncture has a has a rigidity range from about 1.60E+03 MPa*µm³ to about 5.00E+08 MPa*µm³. In some embodiments, the juncture has a has a rigidity from about 1.60E+03 MPa*µm³ to about 5.00E+08 MPa*µm³. In some embodiments, the thickness of the juncture is less than the thickness either the inner portion or the peripheral portion.

In some embodiments, the juncture is configured to bend to allow the peripheral portion to have a different angle than the inner portion. For example, when the lens is bent, the angle of the of inner portion is greater than the angle of the peripheral portion. In another example, when the lens is bent, the angle of the inner portion is less than the angle of the peripheral portion.

In some embodiments, the juncture allows at least a portion of the peripheral portion to conform to a corneal surface without substantially deforming the inner portion. In some embodiments, a vaulted region is formed in the inner portion as a result of the presence of a juncture. In some embodiments, the juncture reduces a mechanical force transfer from the peripheral portion to the inner portion.

In some embodiments, the juncture comprises one or more of flexibility, shape, thickness, curvature, dimension, or material property that is different than that of the peripheral portion. In some embodiments, the juncture comprises one or more of flexibility, shape, thickness, curvature, dimension, or material property that is different than that of a portion of the peripheral portion adjacent the juncture. In some embodiments, the juncture comprises a flexibility that is different than that of the peripheral portion. In some embodiments, the juncture comprises a higher flexibility than that of the peripheral portion. In some embodiments, the juncture comprises a material property that is different from that of the peripheral portion. For example, the juncture may comprise a lower Young's modulus than the Young's modulus of the peripheral portion.

In some embodiments, the juncture comprises one or more of flexibility, shape, thickness, curvature, dimension, or material property that is different than that of the inner portion. In some embodiments, the juncture comprises one or more of flexibility, shape, thickness, curvature, dimension, or material property that is different than that of a portion of the inner portion adjacent the juncture. In some embodiments, the juncture comprises a flexibility that is different than that of the inner portion. In some embodiments, the juncture comprises a higher flexibility than that of the inner portion. In some embodiments, the juncture comprises a material property that is different from that of the inner portion. For example, the juncture may comprise a lower Young's modulus than the Young's modulus of the inner portion. In some embodiments, the material property comprises flexural modulus. In some embodiments, the juncture has a lower flexural modulus than the inner portion, the peripheral portion, or both. In some embodiments, the material property comprises flexural strength. In some embodiments, the juncture has a lower flexural strength than the inner portion, the peripheral portion, or both.

In some embodiments, adhesion forces cause the lens to adhere to the corneal surface while providing between about 0.1 mm to about 1.0 mm of contact lens movement following a blink. In some embodiments, the lens adheres to the surface of the cornea while providing some lens movement following a blink as commonly desired in the art.

In some embodiments, the body of the lens comprises any material property. In some embodiments, a material property comprises Young's modulus, tensile modulus, tensile strength, or modulus of elasticity.

In some embodiments, the inner portion has any suitable thickness. In some embodiments, the peripheral portion has any suitable thickness. In some embodiments, the inner portion has a thickness from about 50 µm to about 750 µm. In some embodiments, the inner portion has a uniform thickness throughout. In some embodiments, the peripheral portion has a thickness from about 50 µm to about 750 µm. In some embodiments, the peripheral portion has a uniform thickness throughout. In some embodiments, the peripheral portion has a non-uniform thickness. In some embodiments, the thickness of the juncture is about 0 µm. In some embodiments, the thickness of the juncture is at least about 0.1 µm. In some embodiments, the thickness of the peripheral portion is at most about 750 µm. In some embodiments, the juncture has a thickness from about 0 µm to about 750 µm. In some embodiments, the juncture has a thickness from about 0 µm to about 300 µm. In some embodiments, the juncture has a thickness from about 0 µm to about 200 µm. In some embodiments, the juncture has a thickness from 0 µm to about 100 µm. In some embodiments, the juncture has a thickness from about 0.1 µm to about 200 µm. In some embodiments, the juncture has a thickness from about 10 µm to about 200 µm. In some embodiments, the thickness of the juncture is less than the thickness of the inner portion or the thickness of the peripheral portion immediately adjacent to the juncture. In some embodiments, the thickness of the juncture is less than the thickness of the inner portion or the thickness of the peripheral portion near to the juncture.

In some embodiments, the thickness of the inner portion increases the magnitude of astigmatism reduction. In some embodiments, the thickness of the peripheral portion increases the magnitude of astigmatism reduction. In some embodiments, the thickness of the inner portion or the peripheral portion does not significantly affect the magnitude of astigmatism reduction.

In some embodiments, the thickness of the inner portion in non-uniform. In some embodiments, the thickness of the inner portion is uniform.

In some embodiments, the thickness of the peripheral portion varies from the inner circumference to an outer circumference of the peripheral portions. In some embodiments, the thickness of the peripheral portion varies based on distance from the juncture. In some embodiments, the peripheral portion has a thickness gradient from the juncture to an outer circumference. In some embodiments, the thickness of the peripheral portion is non-uniform. In some embodiments, the thickness around a circumference the peripheral portion at a given distance from the center of the lens does not vary more than about 5%, 10%, 15%, 20%, 25%, or 30% around the circumference. In some embodiments, the thickness around a circumference the peripheral portion at a given distance from the center of the lens does not vary more than about 10, 20, 30, 40, 50, 60, 70, 80, 90, or 100 µm around the circumference. In some embodiments, the thickness of the peripheral portion is the same as the thickness of the inner portion. In some embodiments, the thickness of the peripheral portion is different from the thickness of the inner portion.

In some embodiments, the inner circumference of the peripheral portion is or is adjacent to the juncture. In some embodiments, the outer circumference of the peripheral portion is the circumference of the lens. In some embodiments, the out circumference of the inner portion is or is adjacent to the juncture. In some embodiments, the circumference of the juncture is equal to the outer circumference of the inner portion and the inner circumference of the peripheral portion.

In some embodiments, the thickness of the peripheral portion refers to the thickness of the peripheral portion adjacent to the juncture. In some embodiments, the thickness of the peripheral portion refers to the thickness at or near a midpoint from the inner circumference and the outer circumference. In some embodiments, the thickness of the peripheral portion refers to the thickness at or near the inner circumference of the peripheral portion. In some embodiments, the thickness of the peripheral portion refers to the thickness at or near the outer circumference of the peripheral portion. In some embodiments, the thickness of the inner portion refers to the thickness of the inner portion adjacent to the juncture. In some embodiments, the thickness of the inner portion refers to the thickness of the inner portion at or near a midpoint from the center and the outer circumference of the inner portion. In some embodiments, the thickness of the inner portion refers to the thickness at or near the inner circumference of the inner portion. In some embodiments, the thickness of the inner portion refers to the thickness at or near the outer circumference of the inner portion.

In some embodiments, the ratio of the thickness of the juncture to the inner portion ranges from about 1:1 to about 1:1000, about 1:1 to about 1:100, or about 1:1 to about 1:10. In some embodiments, the ratio of the thickness of the juncture to the inner portion is about 1:1 to 1:10.

In some embodiments, the ratio of the thickness of the juncture to the peripheral portion ranges from about 1:1 to about 1:1000, about 1:1 to about 1:100, or about 1:1 to about 1:10. In some embodiments, the ratio of the thickness of the juncture to the peripheral portion is about 1:10 to 1:10.

In some embodiments, the thickness is taken (i.e., measured) from a portion of the inner portion adjacent to the juncture. In some embodiments, the ratio can be infinite (e.g., such as when the juncture has a fenestration where the thickness is 0).

In some embodiments, the thickness refers to the average (e.g., mean) thickness. In some embodiments, the thickness refers to the maximum cross-sectional distance. In some embodiments, the thickness refers to the average cross-sectional distance.

In some embodiments, one or more mechanical properties of the peripheral portion varies from the inner circumference to an outer circumference of the peripheral portions. In some embodiments, one or more mechanical properties of the peripheral portion varies based on distance from the juncture. In some embodiments, the peripheral portion has a gradient of one or more mechanical properties from the juncture to an outer circumference. The mechanical and material properties of the lens and lens components are described elsewhere herein. In some embodiments, the properties are taken from a portion of the peripheral portion adjacent to the juncture.

In some embodiments, the soft contact lens has a posterior surface where at least a portion of the inner portion substantially vaults over the steeper corneal areas and where some portions of the inner portion substantially conform over the flatter corneal areas. In such contact lens, the posterior surface of peripheral areas substantially conforms over both steeper and flatter areas of the peripheral cornea.

In some embodiments, the inner portion 210 vaults (i.e., be suspended) over steeper meridians, or steep areas, and conform to flatter meridians, or flat areas, of the eye 100 when the lens 120 is disposed thereon, allowing the anterior surface 170 of the inner portion 210 to be more spherical than the cornea 150. In some embodiments, the diameter of the vaulted region of the inner portion 210 is determined by the position of the juncture 130 from the center of the inner portion 210. In some embodiments, an astigmatism is present centrally to the juncture 130 and a different masking effect is present in the central part of the inner portion 210. In some embodiments, different effects are more prominent at the peripheral part of the inner portion 210.

In some embodiments, the lens 120 comprises one or more optical zone. In some embodiments, the one or more optical zones are positioned in the suspended portions of the soft lens body, such that the one or more optical zones is positioned over at least a portion of the lenticular volume 180. In some embodiments, the one or more optical zones are positioned away from the suspended portions of the soft lens body, such that the one or more optical zones is not positioned over any portion of the lenticular volume 180. In some embodiments, the diameter of the one or more optical zones is the same as the diameter of the lenticular volume 180. In some embodiments, the diameter of the one or more optical zones is smaller than the diameter of the lenticular volume 180. In some embodiments, the diameter of the one or more optical zones is large then diameter of the lenticular volume 180.

In some embodiments, an inner portion of the lens or lens is an optical zone. In some embodiments, an inner portion of the lens or lens comprises one or more optical zones.

In some embodiments, the diameter of the one or more optical zones is any suitable length. In some embodiments, the diameter of the one or more optical zones is at least about 0.5 mm, at least 1 mm, 1.5 mm, 2 mm, at least 2.5 mm, at least 3.5 mm, at least 4 mm, at least 4.5 mm, at least 5 mm, at least 5.5 mm, at least 6 mm, at least 6.5 mm, at least 7 mm, at least 7.5 mm, at least 8 mm, at least 8.5 mm, at least 9 mm, at least 9.5 mm, at least 10 mm, at least 10.5 mm, at least 11 mm, at least 11.5 mm, at least 12 mm, or any values therebetween. In some embodiments, the diameter of the one or more optical zones is at most about 12 mm, at most 11.5 mm, at most 11 mm, at most 10.5 mm, at most 10 mm, at most 9.5 mm, at most 9 mm, at most 8.5 mm, at most 8 mm, at most 7.5 mm, at most 7 mm, at most 6.5 mm, at most 6 mm, at most 5.5 mm, at most 5 mm, at most 4.5 mm, at most 4 mm, at most 3.5 mm, at most 3 mm, at most 2.5 mm, at most 2 mm, 1.5 mm, 1 mm, 0.5 mm or any values therebetween. In some embodiments, the diameter of the one or more optical zones is within a range defined by any two of the preceding values. In some embodiments, the diameter of the one or more optical zones is about 8 mm. In some embodiments, the diameter of the one or more optical zones is within a range from about 6 mm to about 9 mm.

In some embodiments, the one or more optical zones each independently provide a different optical power to the eye.

In some embodiments, the one or more optical zones are a plurality of optical zones. In some embodiments, the one or more optical zones are simultaneous. In some embodiments, the one or more optical zones are segmented. In some embodiments, the one or more optical zones are simultaneous or segmented. In some embodiments, the one or more simultaneous optical zones are either concentric (concentric circles of varying curvature) or aspheric (has varying curvature across the surface of the lens rather than a uniformly spherical shape). In some embodiments, the one or more simultaneous optical zones are concentric. In some embodiments, the one or more simultaneous optical zones are aspheric.

In some embodiments, the radius of curvature of the anterior surface of the one or more optical zones is at least about 5 mm, at least 5.5 mm, at least 6 mm, at least 6.5 mm, at least 7 mm, at least 7.5 mm, at least 8 mm, at least 8.5 mm, at least 9 mm, at least 9.5 mm, at least 10 mm, at least 10.5 mm, at least 11 mm, at least 11.5 mm, at least 12 mm, at least 12.5 mm, or any values therebetween. In some embodiments, the radius of curvature of the anterior surface of the one or more optical zones is at most about 12.5 mm, at most 12 mm, at most 11.5 mm, at most 11 mm, at most 10.5 mm, at most 10 mm, at most 9.5 mm, at most 9 mm, at most 8.5 mm, at most 8 mm, at most 7.5 mm, at most 7 mm, at most 6.5 mm, at most 6 mm, at most 5.5 mm, at most 5 mm, or any values therebetween. In some embodiments, the radius of curvature of the anterior surface of the one or more optical zones is within a range defined by any two of the preceding values. In some embodiments, the radius of curvature of the anterior surface of the one or more optical zones is about 8.5 mm. In some embodiments, the second radius of curvature of the anterior surface of the one or more optical zones is within a range from about 5 mm to about 12.5 mm.

In some embodiments, the lens has an average base curvature of at least about 5 mm, at least 5.5 mm, at least 6 mm, at least 6.5 mm, at least 7 mm, at least 7.5 mm, at least 8 mm, at least 8.5 mm, at least 9 mm, at least 9.5 mm, at least 10 mm, at least 10.5 mm, at least 11 mm, at least 11.5 mm, at least 12 mm, at least 12.5 mm, or any values therebetween. In some embodiments, the contact lens has an average curvature of at most about 12.5 mm, at most 12 mm, at most 11.5 mm, at most 11 mm, at most 10.5 mm, at most 10 mm, at most 9.5 mm, at most 9 mm, at most 8.5 mm, at most 8 mm, at most 7.5 mm, at most 7 mm, at most 6.5 mm, at most 6 mm, at most 5.5 mm, at most 5 mm, or any values therebetween. In some embodiments, the contact lens has an average curvature that is within a range defined by any two of the preceding values. In some embodiments, the contact lens has an average curvature from about 5 mm to about 12.5 mm. In some embodiments, the contact lens has an average curvature from about 6.5 mm to about 9.5 mm.

In some embodiments, the inner portion 210 comprises the optical zone. In some embodiments, the inner portion is the optical zone.

In some embodiments, the juncture 130 is positioned away from the center of the inner portion 210. (e.g., the center of the optical zone of the lens 120). In some embodiments, the juncture is positioned any suitable distance from the center of the inner portion. In some embodiments, the position of the juncture from the center of the inner portion comprises a radius of the juncture. In some embodiments, the radius of the juncture is used to determine the diameter of the juncture through multiplying the value of the radius by 2. In some embodiments, the juncture 130 is at least about 1 millimeters (mm), at least 1.2 mm, at least 1.4 mm, at least 1.6 mm, at least 1.8 mm, at least 2 mm, at least 2.2 mm, at least 2.4 mm, at least 2.6 mm, at least 2.8 mm, at least 3 mm, at least 3.2 mm, at least 3.4 mm, at least 3.6 mm, at least 3.8 mm, at least 4 mm, at least 4.2 mm, at least 4.4 mm, at least 4.6 mm, at least 4.8 mm, at least 5 mm, at least 5.2 mm, at least 5.4 mm, at least 5.6 mm, at least 5.8 mm, at least 6 mm, at least 6.2 mm, at least 6.4 mm, at least 6.6 mm, at least 6.8 mm, at least 7 mm, at least 7.2 mm, at least 7.4 mm, at least 7.6 mm, at least 7.8 mm, at least 8 mm, at least 8.2 mm, at least 8.4 mm, at least 8.6 mm, at least 8.8 mm, at least 9 mm or more, away from the center of the inner portion 210 of the lens 120, (e.g., the center of the optical zone of the lens 120). In some embodiments, the juncture 130 is at most about 9 mm, at most 8.8 mm, at most 8.6 mm, at most 8.4 mm, at most 8.2 mm, at most 8 mm, at most 7.8 mm, at most 7.6 mm, at most 7.4 mm, at most 7.2 mm, at most 7 mm, at most 6.8 mm, at most 6.6 mm 6.4 mm, at most 6.2 mm, at most 6 mm, at most 5.8 mm, at most 5.6 mm, at most 5.4 mm, at most 5.2 mm, at most 5 mm, at most 4.8 mm, at most 4.6 mm, at most 4.4 mm, at most 4.2 mm, at most 4 mm, at most 3.8 mm, at most 3.6 mm, at most 3.4 mm, at most 3.2 mm, at most 3 mm, at most 2.8 mm, at most 2.6 mm, at most 2.4 mm, at most 2.2 mm, at most 2 mm, at most 1.8 mm, at most 1.6 mm, at most 1.4 mm, at most 1.2 mm, at most 1 mm, or less, away from the center of the inner portion 210 of the lens 120, or center of the optical zone of the lens 120. In some embodiments, the juncture 130 is located a distance away from the center of the inner portion 210 (e.g., the center of the optical zone of the lens 120) that is within a range defined by any two of the preceding values. In some embodiments, the juncture 130 is located from about 1 mm to about 9 mm away from the center of the inner portion 210 of the lens 120 which may comprise or be the optical zone of the lens 120. In some embodiments, the juncture 130 is about 1 mm to about 7 mm away from the center of the inner portion 210. In some embodiments, the juncture 130 is about 2 mm to about 5 mm away from the center of the inner portion 210. In some embodiments, the juncture is located about 1 mm to about 4.5 mm from a center of the lens.

The juncture may have any suitable cross-section geometry. In some embodiments, the juncture 130 has any cross-sectional geometry including square, rectangular, circular, semi-circular, curved, triangular, or any other geometrical shape. In some embodiments, the juncture comprises a square cross-sectional geometry. In some embodiments, the juncture comprises a rectangular cross-sectional geometry. In some embodiments, the juncture comprises a circular cross-sectional geometry. In some embodiments, the juncture comprises a semi-circular cross-sectional geometry. In some embodiments, the juncture comprises a curved cross-sectional geometry. In some embodiments, the juncture comprises a triangular cross-sectional geometry.

In some embodiments, the lens comprises one or more optical zones and one or more non-optical zones (e.g., a peripheral portion). In some embodiments, the lens comprises at least one discrete discontinuity, also referred herein as a discontinuity. In some embodiments, at least one discrete discontinuity is a juncture. In some embodiments, at least one discrete discontinuity is a fenestration. In some embodiments, at least one discrete discontinuity is a channel. In some embodiments, at least one discrete discontinuity is a groove. In some embodiments, at least one discrete discontinuity is an opening. In some embodiments, at least one discrete discontinuity is a slit. In some embodiments, at least one discrete discontinuity is a thinned portion (i.e., thickness of portion is less than the thickness of the inner portion, thickness of portion is less than the thickness of the peripheral portion, or thickness is less than the thickness of both the inner portion and the peripheral portion). In some embodiments, at least one discrete discontinuity is a hinge. In some embodiments, at least one discrete discontinuity is a living hinge.

In some embodiments, the lens comprises at least one discontinuity (e.g., juncture). In some embodiments, the lens comprises a groove. In some embodiments, the lens comprises a fenestration and a groove. In some embodiments, the fenestration is located at or near the discontinuity. In some embodiments, the lens comprises a fenestration and a groove where the groove or the fenestration or both are located on the juncture.

In some embodiments, at least one discrete discontinuity is positioned away from the center of the one or more optical zones. In some embodiments, the at least one discrete discontinuity is at least about 1 millimeters (mm), at least 1.2 mm, at least 1.4 mm, at least 1.6 mm, at least 1.8 mm, at least 2 mm, at least 2.2 mm, at least 2.4 mm, at least 2.6 mm, at least 2.8 mm, at least 3 mm, at least 3.2 mm, at least 3.4 mm, at least 3.6 mm, at least 3.8 mm, at least 4 mm, at least 4.2 mm, at least 4.4 mm, at least 4.6 mm, at least 4.8 mm, at least 5 mm, at least 5.2 mm, at least 5.4 mm, at least 5.6 mm, at least 5.8 mm, at least 6 mm, at least 6.2 mm, at least 6.4 mm, at least 6.6 mm, at least 6.8 mm, at least 7 mm, at least 7.2 mm, at least 7.4 mm, at least 7.6 mm, at least 7.8 mm, at least 8 mm, at least 8.2 mm, at least 8.4 mm, at least 8.6 mm, at least 8.8 mm, at least 9 mm or more, away from the center of the one or more optical zones of the continuous lens body. In some embodiments, at least one discrete discontinuity is at most about 9 mm, at most 8.8 mm, at most 8.6 mm, at most 8.4 mm, at most 8.2 mm, at most 8 mm, at most 7.8 mm, at most 7.6 mm, at most 7.4 mm, at most 7.2 mm, at most 7 mm, at most 6.8 mm, at most 6.6 mm 6.4 mm, at most 6.2 mm, at most 6 mm, at most 5.8 mm, at most 5.6 mm, at most 5.4 mm, at most 5.2 mm, at most 5 mm, at most 4.8 mm, at most 4.6 mm, at most 4.4 mm, at most 4.2 mm, at most 4 mm, at most 3.8 mm, at most 3.6 mm, at most 3.4 mm, at most 3.2 mm, at most 3 mm, at most 2.8 mm, at most 2.6 mm, at most 2.4 mm, at most 2.2 mm, at most 2 mm, at most 1.8 mm, at most 1.6 mm, at most 1.4 mm, at most 1.2 mm, at most 1 mm, or less, away from the center of the one or more optical zones of the continuous lens body. In some embodiments, at least one discrete discontinuity is located a distance away from the center of the one or more optical zones that is within a range defined by any two of the preceding values. In some embodiments, at least one discrete discontinuity is located from about 1 mm to about 9 mm away from the center of the one or more optical zones of the continuous lens body. In some embodiments, at least one discrete discontinuity is about 1 mm to about 7 mm away from the center of the one or more optical zones the continuous lens body. In some embodiments, at least one discrete discontinuity is about 1 mm to about 5 mm away from the center of the one or more optical zones the continuous lens body. In some embodiments, at least one discrete discontinuity is about 1 mm to about 6.5 mm away from the center of the one or more optical zones the continuous lens body. In some embodiments, at least one discrete discontinuity is about 1 mm to about 4.5 mm away from the center of the one or more optical zones the continuous lens body. In some embodiments, at least one discrete discontinuity is about 2 mm to about 6 mm away from the center of the one or more optical zones the continuous lens body. In some embodiments, the juncture has a distance (e.g., a diameter) of about 2 mm to about 13 mm across.

In some embodiments, at least one discrete discontinuity is positioned on any portion of the anterior surface of the lens. In some embodiments, at least one discrete discontinuity is positioned on any portion of the posterior surface of the lens. In some embodiments, at least one discrete discontinuity is positioned on any portion of both the anterior surface and the posterior surface.

In some instances, positioning at least one discrete discontinuity away from the center of either the inner portion or the peripheral portion may decrease potential optical artifacts which, in some cases may be caused by at least one discrete discontinuity.

Figure 3F:
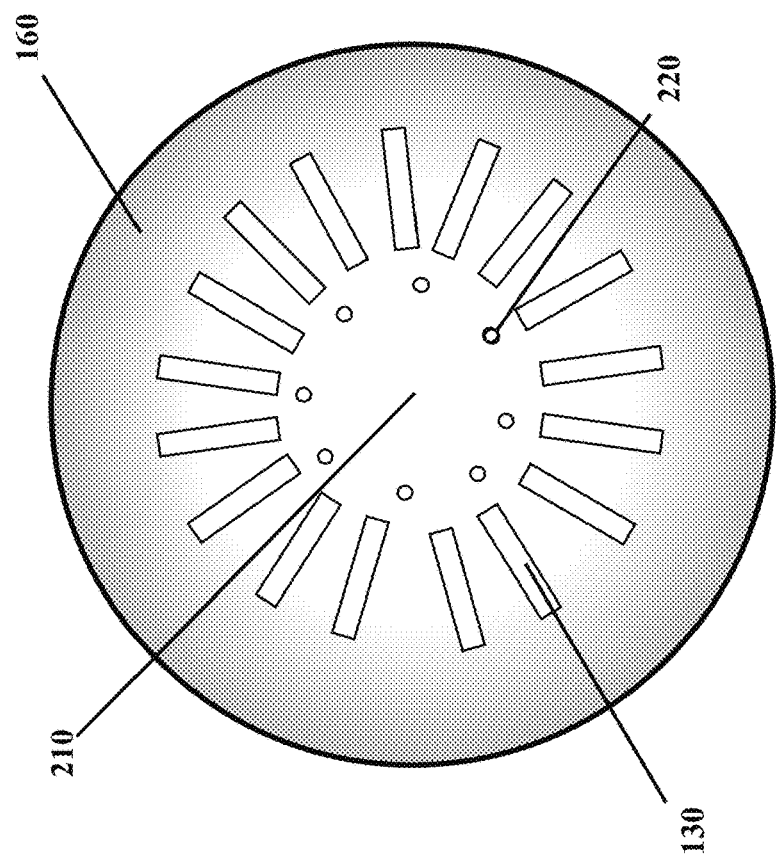
Figure 3E:
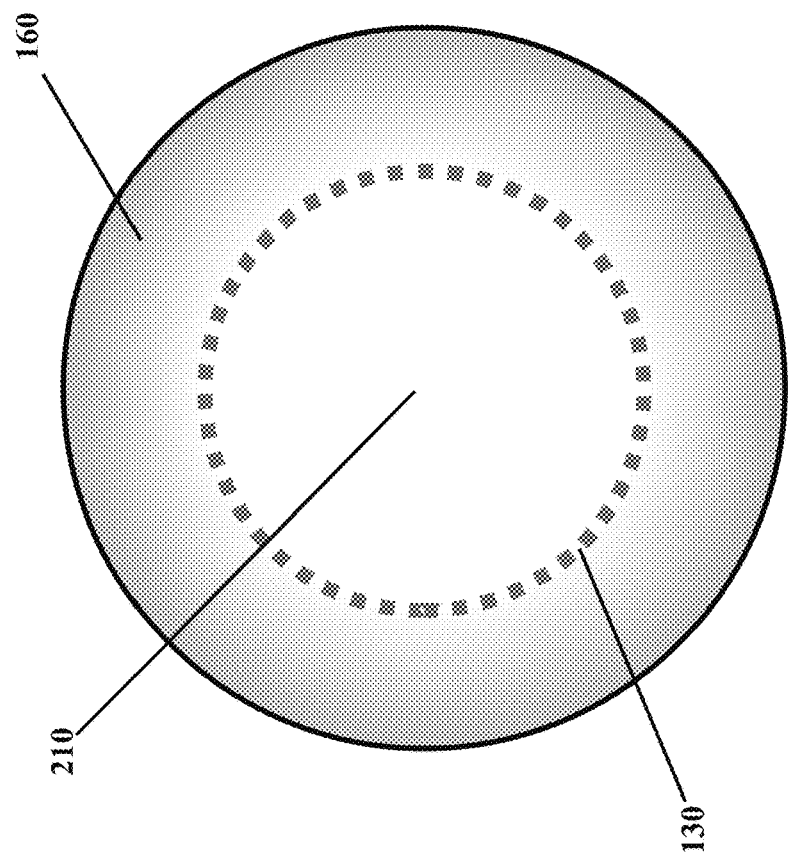
Figure 3H:
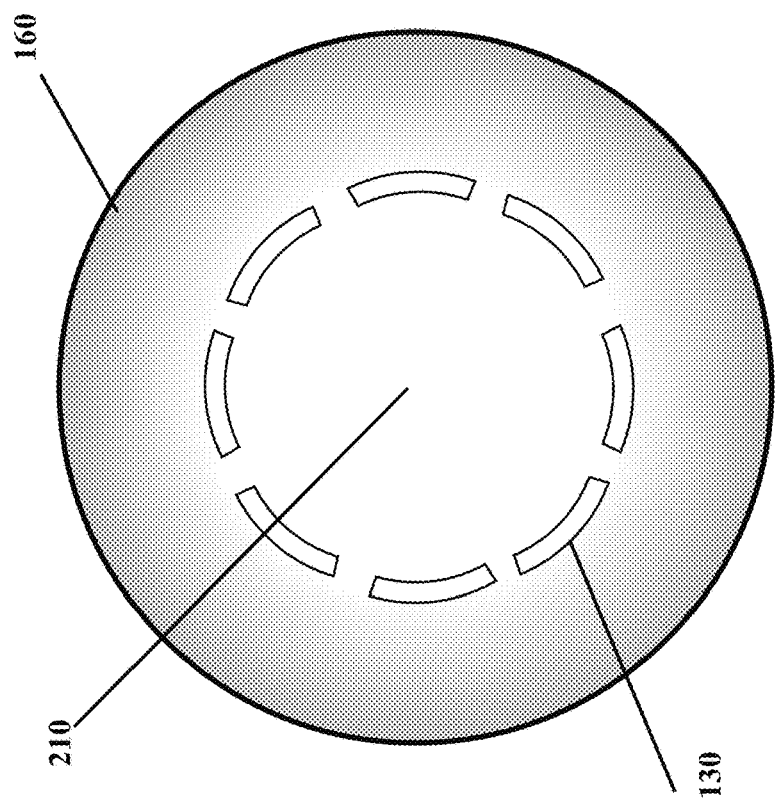
Figure 3G:
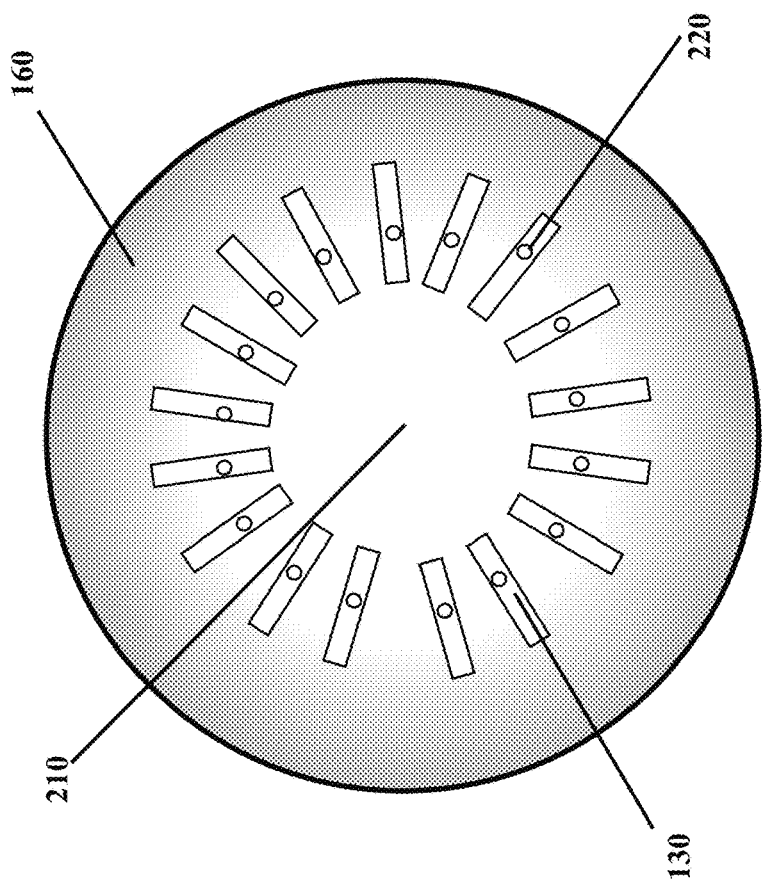
Figure 3J:
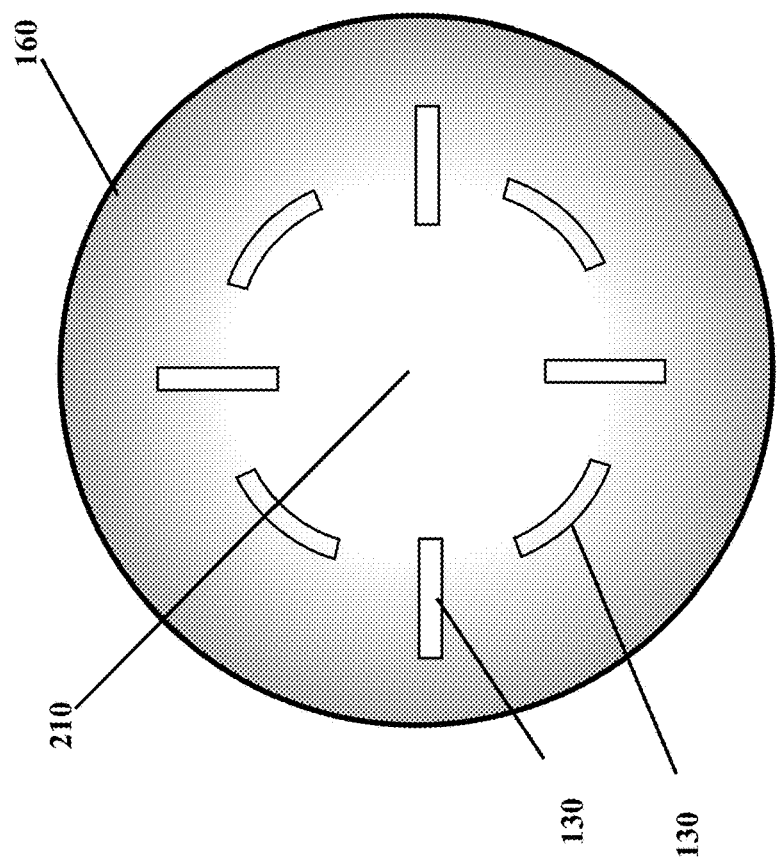
Figure 3I:
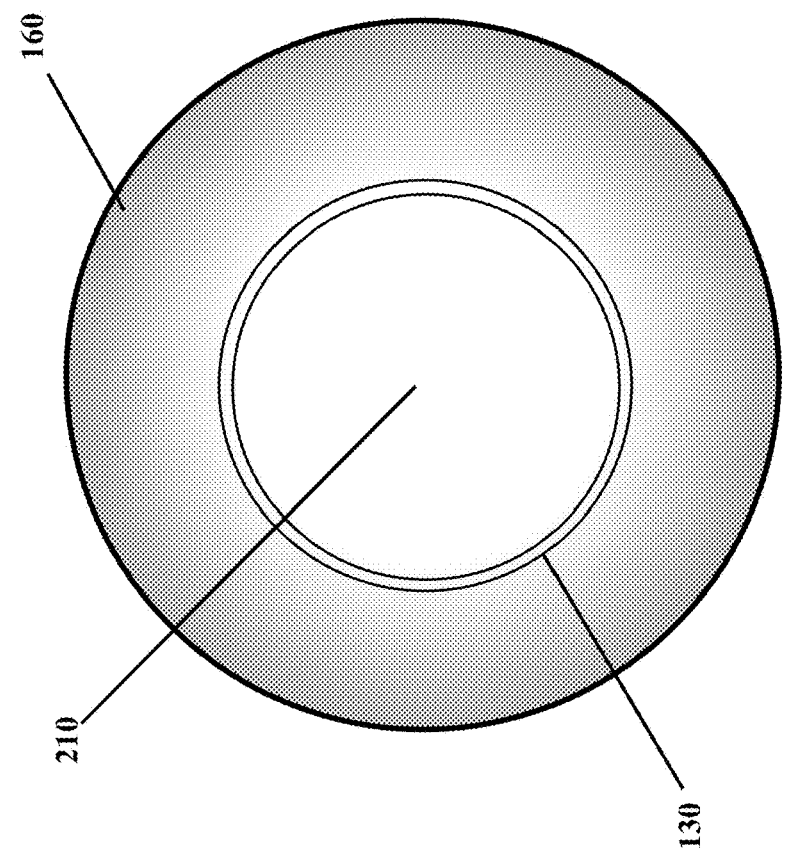

In some embodiments, at least one discrete discontinuity is disposed on either the anterior surface, the posterior surface, or both. In some embodiments, at least one discrete discontinuity spans a given circumference of the lens, as shown in FIG. 3D. In some embodiments, at least one discontinuity spans only discrete portions of a given circumference, as shown in FIGS. 3A-3C, and 3E. In some embodiments, at least one discontinuity does not comprise a fenestration, as shown in FIGS. 3H and 3I. In some embodiments, at least one discrete discontinuity is positioned radially (i.e., directed away from the center of the continuous lens body), as shown in FIGS. 3F-3I. In some embodiments, at least one discrete discontinuity is positioned both circumferentially and radially, as shown in FIG. 3J. In some embodiments, at least one discrete discontinuity is positioned in more than one orientation. In some embodiments, at least one discrete discontinuity is positioned both circumferentially and radially (i.e., on some meridians the at least one discrete discontinuity is positioned circumferentially, and on some meridians the at least one discrete discontinuity is positioned radially). In some embodiments, at least one discrete discontinuity is uniformly disposed about a given circumference of the continuous body. In some embodiments, at least one discrete discontinuity is non-uniformly disposed about a given circumference of the continuous body.

In some embodiments, at least one discrete discontinuity has a different thickness than the continuous lens body.

In some embodiments, the discontinuities are distributed radially. In some embodiments, the radial discontinuities are distributed along at least one axis of the lens body, such as the axis defining a meridian of the lens body. In some embodiments, the radii formed by the radial discontinuities creates one or more sectors of the contact lens. In some embodiments, one or more sectors is defined by an angle between any two adjacent radial distributions of the at least one discontinuity.

In some embodiments, one or more sectors has an angle of at least about 1 degree, 2 degrees, 3 degrees, 4 degrees, 5 degrees, 6 degrees, 7 degrees, 8 degrees, 9 degrees, 10 degrees, 20 degrees, 30 degrees, 40 degrees, 50 degrees, 60 degrees, 70 degrees, 80 degrees, 90 degrees, 100 degrees, 120 degrees, 140 degrees, 160 degrees, 180 degrees, or any values therebetween. In some embodiments, one or more sectors has an angle of at most about 180 degrees, 160 degrees, 140 degrees, 120 degrees, 100 degrees, 90 degrees, 80 degrees, 70 degrees, 60 degrees, 50 degrees, 40 degrees, 30 degrees, 20 degrees, 10 degrees, 9 degrees, 8 degrees, 7 degrees, 6 degrees, 5 degrees, 4 degrees, 3 degrees, 2 degrees, 1 degree, or any values therebetween. In some embodiments, one or more sectors has an angle that is within a range defined by any two of the preceding values. In some embodiments, one or more sectors has an angle from about 1 degree to about 180 degrees. In some embodiments, one or more sectors has an angle from about 70 degrees to about 90 degrees.

In some embodiments, distance between each of the discontinuities distributed radially is about 0.5 mm, 1 mm, 1.5 mm, 2 mm, or any value therebetween.

In some embodiments, the number of discontinuities distributed radially is proportional to the radii formed by the discontinuities distributed radially. For example, if radii of the discontinuities distributed radially is about 8 mm, and the distance between each of the discontinuities distributed radially is about 1 mm, then the number of discontinuities distributed along any given radii is about 4.

In some embodiments, the juncture comprises a plurality of juncture. In some embodiments, the plurality of junctures is evenly distributed around the center of the soft lens body. In some embodiments, a juncture is spaced at least 5, 10, 15, 20, 30, 45, 50, 60, 70, 75, 80, or 90 degrees apart from another juncture. In some embodiments, the plurality of junctures is distributed non-evenly around the center of the soft lens body. In some embodiments, the plurality of junctures is distributed circumferentially. In some embodiments, the plurality of junctures is distributed radially. In some embodiments, at least one juncture of the plurality of junctures is separated from an adjacent juncture by a distance of about 1 mm. In some embodiments, the plurality of junctures is distributed along at least one meridian of the soft lens body. In some embodiments, the radius defined by the plurality of junctures distributed radially is from about 3 mm to about 8 mm. In some embodiments, the plurality of junctures is positioned from about 3 mm to about 9 mm from the center of the soft lens body. In some embodiments, the plurality of junctures is distributed along a length of the soft lens body. In some embodiments, the length of the soft lens body is a radius, diameter, or circumference of the lens body.

In some embodiments, at least one discrete discontinuity is one or more fenestrations located on a single lens body, as shown in FIG. 3A. In some embodiments, at least one discrete discontinuity is a discontinuous juncture along the circumference of the border between the inner portion and the peripheral portion and may comprise one or more fenestrations within each discontinuous region, as shown in FIG. 3B. In some embodiments, at least one discrete discontinuity is a discontinuous juncture along the circumference of the border between the inner portion and the peripheral portion and may comprise one or more fenestrations in proximity to each discontinuous region, as shown in FIG. 3C. In some embodiments, at least one discrete discontinuity is a continuous juncture along the circumference of the border between the inner portion and the peripheral portion and may comprise one or more fenestrations in proximity to the continuous juncture, as shown in FIG. 3D. In some embodiments, at least one discrete discontinuity is a perforated region between the inner portion and peripheral portion, as shown in FIG. 3E. In some embodiments, at least one discrete discontinuity is radially distributed discontinuities around the center of the lens and may comprise one or more fenestrations in proximity to each radial discontinuity, as shown in FIG. 3F. In some embodiments, at least one discrete discontinuity is radially distributed discontinuities around the center of the lens and may comprise one or more fenestrations in each radial discontinuity, as shown in FIG. 3G. In some embodiments, at least one discrete discontinuity is a discontinuous juncture along the circumference of the border between the inner portion and the peripheral portion, as shown in FIG. 3H. In some embodiments, at least one discrete discontinuity is a continuous juncture along the circumference of the border between the inner portion and the peripheral portion, as shown in FIG. 3I. In some embodiments, at least one discrete discontinuity comprises a plurality of discontinuities along the circumference of the border between the inner portion and the peripheral portion and a plurality of discontinuous junctures oriented radially, as shown in FIG. 3J.

In some embodiments, the area under the vaulted regions of the inner portion 210 of the lens 120 forms the lenticular volume 180. In some embodiments, any of the at least one sector of the soft lens body is capable of being suspended over the surface of the cornea 150 to form at least a portion of the lenticular volume 180 when the soft lens body is disposed over the eye 100. In some embodiments, the lenticular volume is formed between an anterior surface of the inner portion and a corneal surface of the eye. In some embodiments, the lenticular volume 180, acts as a chamber. In some embodiments, the chamber is configured to store a fluid, such as tears or artificial tears, which keep the eye 100 or a surface thereof moist and prevent the eye from dehydrating. In some embodiments, a chamber configured to store a fluid adds to the comfort experienced by the subject while the lens 120 is in use. In some embodiments, the lenticular volume 180 is referred to as a tear lens herein. In some embodiments, the lenticular volume forms a tear lens over the corneal surface. In some embodiments, the lenticular volume is filled with a fluid (e.g., tear fluid).

In some embodiments, the lenticular volume 180 provides an optical power to the subject when placed on the eye 100. In some embodiments, the lenticular volume 180 does not provide an optical power when placed on the eye 100. In some embodiments, a combination of the inner portion and the lenticular volume is configured to correct the ocular refractive error of the eye. In some embodiments, a combination of the inner portion and the lenticular volume is configured to correct the ocular refractive error up to about 5.5 diopters (D). In some embodiments, a combination of the inner portion and the lenticular volume is configured to correct the ocular refractive error up to about 2.5 diopters (D). In some embodiments, a combination of the inner portion and the lenticular volume is configured to correct the ocular refractive error up to about 1.5 diopters (D).

FIG. 4A illustrates a lens positioned above an eye 100 of a subject. FIG. 4B illustrates a lens disposed on an eye 100 of a subject. FIGS. 3A-3J show perspective views of a lens 120. In some embodiments, the lens 120 is substantially similar to any of the lenses descried herein. In some embodiments, the lens 120 comprises a plurality of fenestrations 220. In some embodiments, the plurality of fenestrations 220 is configured to promote a fluid, such as tears or artificial tears, to flow into and out of the lenticular volume 180, such as, for example, when the eye 100 blinks. In some embodiments, the flow of fluid creates a tear film on the lens 120 (e.g., covering) and/or on the eye 100 which makes the lens 120 more comfortable to the wearer. In some embodiments, the lenticular volume 180 fills with fluids providing mechanical support to the vaulted regions of the inner portion 210 of the lens 120 and may reduce the effective astigmatism of the eye 100. In some embodiments, the inner portion of a lens is configured to correct the ocular refractive error up to about 5.5 diopters (D). In some embodiments, the inner portion of a lens is configured to correct the ocular refractive error up to about 2.5 diopters (D). In some embodiments, the inner portion of a lens is configured to correct the ocular refractive error up to about 1.5 diopters (D). In some embodiments, optical correction is provided by a combination of the inner portion and the lenticular volume.

In some embodiments, fenestrations 220 have any suitable shape to provide egress of tear fluid. Suitable shapes include, for example, circular, elliptical, oval, rectangular, square, slot, or combination of any of the foregoing. In some embodiments, each of the plurality of fenestrations 220 has the same shape or at least some of the fenestrations may have different shapes. In certain embodiments, the fenestrations have a maximum dimension (hole size) from about 50 µm to about 700 µm. In certain embodiments, the fenestrations have a maximum dimension from about 100 µm to about 500 µm. In certain embodiments, the fenestrations have a maximum dimension from about 200 µm to about 400 µm. Each of the fenestrations may have the same maximum dimension. In some embodiments, at least one of the fenestrations may have a different dimension.

In some embodiments, the fenestrations are distributed radially. In some embodiments, the radial fenestrations are distributed along at least one axis of the lens body, such as the axis defining a meridian of the lens body. In some embodiments, the radii formed by the radial fenestrations creates one or more sectors of the contact lens. In some embodiments, one or more sectors are defined by an angle between any two adjacent radial distributions of the at least one fenestration. In some embodiments, the one or more sectors have an angle of at least about 1 degree, 2 degrees, 3 degrees, 4 degrees, 5 degrees, 6 degrees, 7 degrees, 8 degrees, 9 degrees, 10 degrees, 20 degrees, 30 degrees, 40 degrees, 50 degrees, 60 degrees, 70 degrees, 80 degrees, 90 degrees, 100 degrees, 120 degrees, 140 degrees, 160 degrees, 180 degrees, or any values therebetween. In some embodiments, the one or more sectors have an angle of at most about 180 degrees, 160 degrees, 140 degrees, 120 degrees, 100 degrees, 90 degrees, 80 degrees, 70 degrees, 60 degrees, 50 degrees, 40 degrees, 30 degrees, 20 degrees, 10 degrees, 9 degrees, 8 degrees, 7 degrees, 6 degrees, 5 degrees, 4 degrees, 3 degrees, 2 degrees, 1 degree, or any values therebetween. In some embodiments, one or more sectors have an angle that is within a range defined by any two of the preceding values. In some embodiments, one or more sectors have an angle from about 1 degree to about 180 degrees. In some embodiments, one or more sectors have an angle from about 70 degrees to about 90 degrees.

In some embodiments, distance between each of the fenestrations distributed radially is about 0.5 mm, 1 mm, 1.5 mm, 2 mm, or any value therebetween.

In some embodiments, the number of fenestrations distributed radially is proportional to the radii formed by the fenestrations distributed radially. For example, if radii of the fenestrations distributed radially is about 8 mm, and the distance between each of the fenestrations distributed radially is about 1 mm, then the number of fenestrations distributed along any given radii is about 4.

In some embodiments, the lens comprises a one or more fenestrations. In some embodiments, the number fenestrations is at least about 1, at least 5, at least 10, at least 15, at least 20, at least 25, at least 30, at least 40, or more.

In some embodiments, a plurality of fenestrations is disposed in the inner portion, the outer portion, or both the inner portion and the outer portion. In some embodiments, the fenestrations are positioned adjacent the juncture. In some embodiments, the fenestrations are positioned on the juncture. In some embodiments, the fenestrations are positioned both adjacent to and on the juncture. In some cases, the plurality of fenestrations is configured to induce flow of tear fluid into and out of the lenticular volume, when the eye blinks.

In some embodiments, at least one fenestration of the plurality of fenestrations extends from an anterior surface of the peripheral portion to the posterior surface of the peripheral portion. In some embodiments, the posterior surface of the peripheral portion comprises one or more grooves thereon which is configured to provide a fluid flow pathway between the at least one fenestration and the lenticular volume. In some embodiments, the fenestrations are configured to allow a fluid to flow into and out of a lenticular volume. In some embodiments, the at least one fenestration is connected to at least one groove overlying the tear meniscus at distance, intermediate, and near gazes. In some embodiments, at least one groove is disposed radially or circumferentially on the contact lens. In some embodiments, at least one groove is on the posterior surface of the contact lens. In some embodiments, at least one groove is in fluid communication with the at least one fenestration. In some embodiments, at least one groove extends radially to the outer edge of the contact lens, in at least some cases from the at least one fenestration, such as to facilitate flow of tear fluid from adjacent the outer edge of the contact lens. In some embodiments, at least one groove extends from the at least one fenestration to a relatively more interior portion of the contact lens such as to facilitate flow of tear fluid to the lenticular volume(s) formed. In some embodiments, the contact lens has a plurality of grooves.

In some embodiments, one or more fenestrations comprise a plurality of fenestrations. In some embodiments, the plurality of fenestration is evenly distributed around the center of the soft lens body. In some embodiments, a fenestration is spaced at least 5, 10, 15, 20, 30, 45, 50, 60, 70, 75, 80, or 90 degrees apart from another fenestration. In some embodiments, the plurality of fenestrations is distributed non-evenly around the center of the soft lens body. In some embodiments, the plurality of fenestrations is distributed circumferentially. In some embodiments, the plurality of fenestrations is distributed radially. In some embodiments, at least one fenestration of the plurality of fenestrations is separated from an adjacent fenestration by a distance of about 1 mm. In some embodiments, the plurality of fenestrations is distributed along at least one meridian of the soft lens body. In some embodiments, the radius defined by the plurality of fenestrations distributed radially is from about 3 mm to about 8 mm. In some embodiments, the plurality of fenestrations is positioned from about 3 mm to about 9 mm from the center of the soft lens body. In some embodiments, the plurality of fenestrations is distributed along a length of the soft lens body. In some embodiments, the length of the soft lens body is a radius, diameter, or circumference of the lens body.

In some embodiments, the plurality of fenestrations 220 is positioned on any portion of the anterior surface of the lens 120. In some embodiments, the plurality of fenestrations 220 is positioned on the peripheral portion 160. In some embodiments, the plurality of fenestrations 220 is positioned on the juncture 130. In some embodiments, the plurality of fenestrations 220 is positioned on the inner portion 210.

In some embodiments, the juncture comprises one or more fenestrations.

In some embodiments, one or more fenestrations is positioned at any suitable distance from the center of the inner portion. In some embodiments, a plurality of fenestrations 220 is at least about 3 millimeters (mm), at least 3.1 mm, at least 3.2 mm, at least 3.3 mm, at least 3.4 mm, at least 3.5 mm, at least 3.6 mm, at least 3.6 mm, at least 3.7 mm, at least 3.8 mm, at least 3.9 mm, at least 4 mm, at least 4.1 mm, at least 4.2 mm, at least 4.3 mm, at least 4.4 mm, at least 4.5 mm, at least 4.6 mm, at least 4.7 mm, at least 4.8 mm, at least 4.9 mm, at least 5 mm, at least 5.1 mm, at least 5.2 mm, at least 5.3 mm, at least 5.4 mm, at least 5.5 mm, at least 5.6 mm, at least 5.7 mm, at least 5.8 mm, at least 5.9 mm, at least 6.0 mm, at least 6.1 mm, at least 6.2 mm, at least 6.3 mm, at least 6.4 mm, at least 6.5 mm, at least 6.6 mm, at least 6.7 mm, at least 6.8 mm, at least 6.9 mm, at least 7 mm, at least 7.1 mm, at least 7.2 mm, at least 7.3 mm, at least 7.4 mm, at least 7.5 mm 7.6 mm, at least 7.7 mm, at least 7.8 mm, at least 7.9 mm, at least 8 mm, at least 8.1 mm, at least 8.2 mm, at least 8.3 mm, at least 8.4 mm, at least 8.5 mm, at least 8.6 mm, at least 8.7 mm, at least 8.8 mm, at least 8.9 mm, at least 9 mm, or more, away from the center of the inner portion 210 of the lens 120, (e.g., the center of the optical zone of the lens 120). In some embodiments, the plurality of fenestrations 220 is at most about 9 mm, at most 8.9 mm, at most 8.8 mm, at most 8.7 mm, at most 8.6 mm, at most 8.5 mm, at most 8.4 mm, at most 8.3 mm, at most 8.2 mm, at most 8.1 mm, at most 8 mm, at most 7.9 mm, at most 7.8 mm, at most 7.7 mm, at most 7.6 mm, at most 7.5 mm, at most 7.4 mm, at most 7.3 mm, at most 7.2 mm, at most 7.1 mm, at most 7 mm, at most 6.9 mm, at most 6.8 mm, at most 6.7 mm, at most 6.6 mm, at most 6.5 mm, at most 6.4 mm, at most 6.3 mm, at most 6.2 mm, at most 6.1 mm, at most 6 mm, at most 5.9 mm, at most 5.8 mm, at most 5.7 mm, at most 5.6 mm, at most 5.5 mm, at most 5.4 mm, at most 5.3 mm, at most 5.2 mm, at most 5.1 mm, at most 5 mm, at most 4.9 mm, at most 4.8 mm, at most 4.7 mm, at most 4.6 mm, at most 4.5 mm, at most 4.4 mm, at most 4.3 mm, at most 4.2 mm, at most 4.1 mm, at most 4 mm, at most 3.9 mm, at most 3.8 mm 3.7 mm, at most 3.6 mm, at most 3.5 mm, at most 3.4 mm, at most 3.3 mm, at most 3.2 mm, at most 3.1 mm, at most 3 mm, or less, away from the center of the inner portion 210 or center of the optical zone of the lens 120. In some embodiments, the plurality of fenestrations 220 is located a distance away from the center of the inner portion 210 (e.g., the center of the optical zone of the lens 120) that is within a range defined by any two of the preceding values. In some embodiments, the plurality of fenestrations 220 is located from about 3 mm to about 9 mm away from the center of the inner portion 210 of the lens 120 which may comprise or be the optical zone of the lens. In some embodiments, the plurality of fenestrations 220 is about 5 mm away from the center of the inner portion 210. In some embodiments, as shown in FIG. 1, a fenestration of the plurality of fenestrations 220 is from about 1 mm to about 8 mm away from the center of the inner portion 210. In some embodiments, the plurality of fenestrations 220 is about 3 mm to about 8 mm away from the center of the inner portion 210.

In some embodiments, the distance between the plurality of fenestrations and the juncture is from about 0 mm to about 5 mm. In some embodiments, the distance between a fenestration and the juncture is 0 mm. In some embodiments, the distance between a fenestration and the juncture is about 0 mm to about 5 mm. In some embodiments, the anterior surface is continuous except for the fenestrations.

In some instances, positioning the plurality of fenestrations 220 away from the inner portion 210 (e.g., optical zone) helps to decrease potential optical artifacts which, in some cases may be caused by the plurality of fenestrations 220. In other embodiments, the plurality of fenestrations 220 is inside the inner portion 210 (e.g., optical zone) of the lens 120. In some embodiments, the plurality of fenestrations 220 is partially inside and/or partially outside the inner portion 210 (e.g., optical zone) of the lens 120. In some embodiments, the fenestrations (e.g., the plurality of fenestrations 220 or other fenestrations) are sufficiently small in diameter and sufficiently few so as to not produce perceptible visual artifacts. In some embodiments, the fenestrations are closer to the inner potion 210 (e.g., optical zone) of the lens 120. In some embodiments, the fenestrations are partially inside. In some embodiments, the fenestrations are wholly inside the inner portion 210 (e.g., optical zone) of the lens 120.

In some embodiments, a fenestration has any suitable characteristic dimension. In some embodiments, a characteristic dimension (such as a length, width, or diameter) of the fenestrations (e.g., fenestrations 220) is at least about 0.01 mm, at least 0.02 mm, at least 0.03 mm, at least 0.04 mm, at least 0.05 mm, at least 0.06 mm, at least 0.07 mm, at least 0.08 mm, at least 0.09 mm, at least 0.1 mm, at least 0.2 mm, at least 0.3 mm, at least 0.4 mm, at least 0.5 mm, at least 0.6 mm, at least 0.7 mm, at least 0.8 mm, at least 0.9 mm, at least 1 mm, or more. In some embodiments, a characteristic dimension of the fenestrations is at most about 1 mm, at most 0.9 mm, at most 0.8 mm, at most 0.7 mm, at most 0.6 mm, at most 0.5 mm, at most 0.4 mm, at most 0.3 mm, at most 0.2 mm, at most 0.1 mm, at most 0.09 mm, at most 0.08 mm, at most 0.07 mm, at most 0.06 mm, at most 0.5 mm, at most 0.04 mm, at most 0.03 mm, at most 0.02 mm, at most 0.01 mm, or less. In some embodiments, a characteristic dimension of the fenestrations is within a range defined by any two of the preceding values. In some embodiments, a characteristic dimension of the fenestrations is within a range from about 0.01 mm to about 1 mm. In some embodiments, a characteristic dimension of the fenestrations is within a range from about 0.05 mm to about 1 mm. In some embodiments, a characteristic dimension of the fenestrations is within a range from about 0.05 mm to about 0.5 mm. In some embodiments, a characteristic dimension of the fenestrations is about 0.4 mm.

In some embodiments, a fenestration has any suitable cross-sectional geometry. In some embodiments, the plurality of fenestrations 220 have any cross-sectional geometry including square, rectangular, circular, semi-circular, curved, triangular, or any other geometrical shape. In some embodiments, a fenestration comprises a square cross-section geometry. In some embodiments, a fenestration comprises a rectangular cross-section geometry. In some embodiments, a fenestration comprises a circular cross-section geometry. In some embodiments, a fenestration comprises a semi-circular cross-section geometry. In some embodiments, a fenestration comprises a curved cross-section geometry. In some embodiments, a fenestration comprises a triangular cross-section geometry.

In some embodiments, the fenestration(s) have a cross-sectional area of at least about 0.0001 millimeters squared ("mm2"), 0.0003 $mm^2$, 0.0006 $mm^2$, 0.0009 $mm^2$, 0.001 $mm^2$, 0.002 $mm^2$, 0.004 $mm^2$, 0.006 $mm^2$, 0.008 $mm^2$, 0.01 $mm^2$, 0.02 $mm^2$, 0.04 $mm^2$, 0.06 $mm^2$, 0.08 $mm^2$, 0.1 $mm^2$, 0.2 $mm^2$, 0.3 $mm^2$, 0.4 $mm^2$, 0.5 $mm^2$, 0.6 $mm^2$, 0.7 $mm^2$, 0.8 $mm^2$, 0.9 $mm^2$, 1 $mm^2$, or any values therebetween. In some embodiments, the fenestration(s) have a cross-sectional area of at most about 1 $mm^2$, 0.9 mm2, 0.8 $mm^2$, 0.7 $mm^2$, 0.6 $mm^2$, 0.5 $mm^2$, 0.4 $mm^2$, 0.3 $mm^2$, 0.2 $mm^2$, 0.1 $mm^2$, 0.08 $mm^2$, 0.06 $mm^2$, 0.04 $mm^2$, 0.02 $mm^2$, 0.01 $mm^2$, 0.008 $mm^2$, 0.006 $mm^2$, 0.004 $mm^2$, 0.002 $mm^2$, 0.001 $mm^2$, 0.0009 $mm^2$, 0.0006 $mm^2$, 0.0003 $mm^2$, 0.0001 $mm^2$, or any values therebetween. In some embodiments, the fenestration(s) have a cross-sectional area that is within a range defined by any two of the preceding values. In some embodiments, the fenestration(s) have a cross-sectional area from about 0.0001 $mm^2$ to about 1 $mm^2$. In some embodiments, the fenestration(s) have a cross-sectional area from about 0.0025 mm² to about 0.25 mm².

In some embodiments, the posterior surface of the lens 120 comprises additional features such as discrete pooling areas, radial channels, or a circumferential channel, or combinations thereof, that can facilitate fluid flow from the anterior surface 170 across the posterior surface. In some embodiments, the posterior surface of the lens comprises a discrete pooling area. In some embodiments, the posterior surface of the lens comprises a radial channel. In some embodiments, the posterior surface of the lens comprises a circumferential channel. In some embodiments, an additional feature as described herein is integral with the juncture 130. In some embodiments, the posterior surface of the lens comprises discontinuities. In some embodiments, the posterior surface of the lens comprises a juncture. In some embodiments, an additional feature is a fenestration. In some embodiments, an additional feature is a thinned area of the lens. In some embodiments, an additional feature is any other feature or combination of features that would cause a local reduction in the rigidity of the lens 120, or any other manipulation of the lens material or its geometry that would reduce the force transfer between the inner portion 210 and peripheral portion 160. In some embodiments, additional features traverse the inner portion 210, the juncture 130, and the peripheral portion 160.

In some embodiments, the lens 120 further comprises one or more channels configure to allow a fluid to flow into and out of the lenticular volume 180. In some embodiments, the one or more channels are positioned on the posterior surface.

In some embodiments, one or more channels are positioned radially on the soft lens body. In some embodiments, the one or more channels are positioned radially to allow a fluid to flow from peripheral portion 160 to the inner portion 210.

In some embodiments, the anterior surface 170 and the posterior surface 190 of the lens 120 do not have a protrusion extending from the surface.

In some embodiments, the orientation of the discontinuity affects the reduction in astigmatism.

The dimensions of an example lens are shown in FIGS. 3A-3J, and 5. The juncture 130 (e.g., juncture 130 in FIGS. 1, 3A-3J, and 5) of the lens 120 may comprise a juncture width 420 (for instance, the length between the outer and inner diameters of the juncture 130). In some embodiments, the juncture width is any suitable width. In some embodiments, the juncture width 420 is less than about 2000 micrometers (μm). In some embodiments, the juncture width 420 is at most about 2000 μm, at most 1900 μm, at most 1800 μm, at most 1700 μm, at most 1600 μm, at most 1500 μm, at most 1400 μm, at most 1300 μm, at most 1200 μm, at most 1100 μm, at most 1000 μm, at most 900 μm, at most 800 μm, at most 700 μm, at most 600 μm, at most 500 μm, at most 400 μm, at most 300 μm, at most 200 μm, at most 100 μm, at most 50 μm, at most 10 μm, at most 1 μm, or less. In some embodiments, the width of the juncture is about 0 μm (e.g., slit). In some embodiments, the width of the juncture is at least about 1 μm, at least 10 μm, at least 50 μm, at least 100 μm, at least 200 μm, at least 300 μm, at least 400 μm, at least 500 μm, at least 600 μm, at least 700 μm, at least 800 μm, at least 900 μm, at least 1000 μm, at least 1100 μm, at least 1200 μm, at least 1300 μm, at least 1400 μm, at least 1500 μm, at least 1600 μm, at least 1700 μm, at least 1800 μm, at least 1900 μm, at least 2000 μm, or more. The juncture width 420 is within a range defined by any two of the preceding values. In some embodiments, the juncture width is about 0 μm (e.g., slit). In some embodiments, the juncture width 420 is about 1000 μm. In some embodiments, the juncture comprises a width from about 1 μm to about 2000 μm.

In some embodiments, the sagittal height of the lens 120 describes the height from the central apex of the posterior surface of the lens to the plane that the peripheral edges of the lens circumscribe. In some embodiments, the sagittal height of the lenticular volume is any suitable height. In some embodiments, the sagittal height is within a range of about 5 micrometers of the sagittal height of the cornea. In some embodiments, the sagittal height of the lenticular volume is at least about 1 μm, at least 1.25 μm, at least 1.5 μm, at least 1.75 μm, at least 2 μm, at least 2.25 μm, at least 2.5 μm, at least 2.75 μm, at least 3 μm, at least 3.25 μm, at least 3.5 μm, at least 3.75 μm, at least 4 μm, at least 4.25 μm, at least 4.5 μm, at least 4.6 μm, at least 4.7 μm, at least 4.8 μm, at least 4.9 μm, at least 5 μm, at least 5.1 μm, at least 5.2 μm, at least 5.3 μm, at least 5.4 μm, at least 5.5 μm, at least 5.6 μm, at least 5.7 μm, at least 5.8 μm, at least 5.9 μm, at least 6 μm, at least 6.1 μm, at least 6.2 μm, at least 6.3 μm, at least 6.4 μm, at least 6.5 μm, at least 7 μm, at least 7.5 μm, at least 8 μm, at least 8.5 μm, at least 9 μm, at least 9.5 μm, at least 10 μm, at least 15 μm, at least 20 μm, at least 25 μm, at least 30 μm, or more from the sagittal height of the cornea. In some embodiments, the sagittal height of the lenticular volume is at most about 30 μm, at most 25 μm, at most 20 μm, at most 15 μm, at most 10 μm, at most 9.5 μm, at most 9 μm, at most 8.5 μm, at most 8 μm, at most 7.5 μm, at most 7 μm, at most 6.5 μm, at most 6.4 μm, at most 6.3 μm, at most 6.2 μm, at most 6.1 μm, at most 6 μm, at most 5.9 μm, at most 5.8 μm, at most 5.7 μm, at most 5.6 μm, at most 5.5 μm, at most 5.4 μm, at most 5.3 μm, at most 5.2 μm, at most 5.1 μm, at most 5 μm, at most 4.9 μm, at most 4.8 μm, at most 4.7 μm, at most 4.6 μm, at most 4.5 μm, at most 4.25 μm, at most 4 μm, at most 3.75 μm, at most 3.5 μm, at most 3.25 μm, at most 3 μm, at most 2.75 μm, at most 2.5 μm, at most 2.25 μm, at most 2 μm, at most 1.75 μm, at most 1.5 μm, at most 1.25 μm, at most 1 μm, or less from the sagittal height of the cornea. In some embodiments, the sagittal height of the lenticular volume is within a range defined by any two of the preceding values from the sagittal height of the cornea. In some embodiments, the lens has a sagittal height from about 1 μm to about 100 μm. In some embodiments, the lens has a sagittal height from about 5 μm to about 70 μm.

Figure 5:
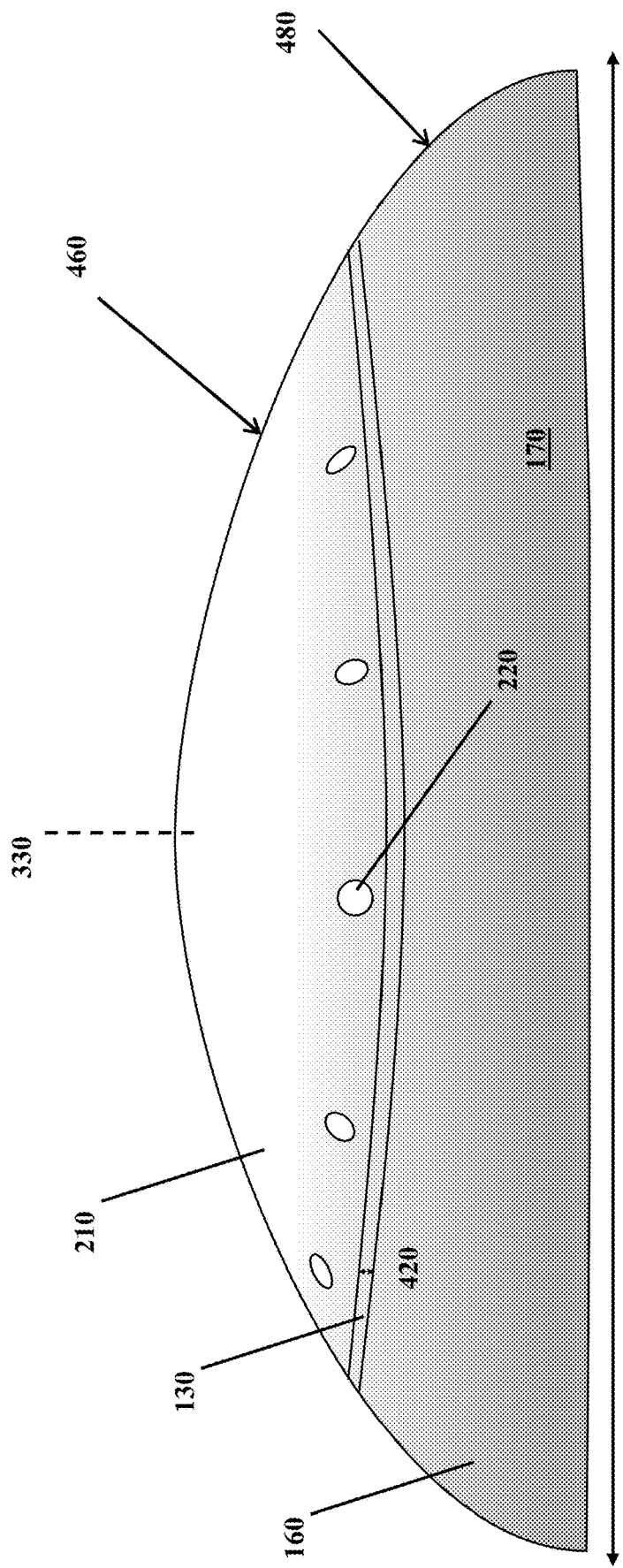
FIG. 5 shows the dimensions of a lens in a side sectional view, according to some embodiments.

The lens 120 may comprise a lens diameter 410 (e.g., as shown in FIG. 5). In some embodiments, the lens diameter 410 is about 14.5 mm. In some embodiments, the diameter 410 of the lens is at least about 8 mm, at least 8.5 mm, at least 9 mm, at least 9.5 mm, at least 10 mm, at least 10.5 mm, at least 11 mm, at least 11.5 mm, at least 12 mm, at least 12.5 mm, at least 13 mm, at least 13.1 mm, at least 13.2 mm, at least 13.3 mm, at least 13.4 mm, at least 13.5 mm, at least 13.6 mm, at least 13.7 mm, at least 13.8 mm, at least 13.9 mm, at least 14 mm, at least 14.1 mm, at least 14.2 mm, at least 14.3 mm, at least 14.4 mm, at least 14.5 mm, at least 14.6 mm, at least 14.7 mm, at least 14.8 mm, at least 14.9 mm, at least 15 mm, at least 15.1 mm, at least 15.2 mm, at least 15.3 mm, at least 15.4 mm, at least 15.5 mm, at least 15.6 mm, at least 15.7 mm, at least 15.8 mm, at least 15.9 mm, at least 16 mm, at least 16.1 mm, at least 16.2 mm, at least 16.3 mm, at least 16.4 mm, at least 16.5 mm, at least 16.6 mm, at least 16.7 mm, at least 16.8 mm, at least 16.9 mm, at least 17 mm, or more. In some embodiments, the lens comprises a diameter 410 of at most about 17 mm, at most 16.9 mm, at most 16.8 mm, at most 16.7 mm, at most 16.6 mm, at most 16.5 mm, at most 16.4 mm, at most 16.3 mm, at most 16.2 mm, at most 16.1 mm, at most 16 mm, at most 15.6 mm, at most 15.5 mm, at most 15.4 mm, at most 15.3 mm, at most 15.2 mm, at most 15.1 mm, at most 15 mm, at most 14.9 mm, at most 14.8 mm, at most 14.7 mm, at most 14.6 mm, at most 14.5 mm, at most 14.4 mm, at most 14.3 mm, at most 14.2 mm, at most 14.1 mm, at most 14 mm, at most 13.9 mm, at most 13.8 mm, at most 13.7 mm, at most 13.6 mm, at most 13.5 mm, at most 13.4 mm, at most 13.3 mm, at most 13.2 mm, at most 13.1 mm, at most 13 mm, at most 12.5 mm, at most 12 mm, at most 11.5 mm, at most 11 mm, at most 10.5 mm, at most 10 mm, at most 9.5 mm, at most 9 mm, at most 8.5 mm, at most 8 mm, or less. In some embodiments, the lens comprises a diameter 410 that is within a range defined by any two of the preceding values. In some embodiments, the diameter of the lens is the diameter when the lens is in neutral position. In some embodiments, the diameter of the lens is the diameter when the lens is flat. In some embodiments, the diameter of the lens is the diameter when the lens is fitted on an eye.

In some embodiments, the lens 120 comprises a base radius (R1) 460 corresponding to a curvature of the inner portion 210 (base curvature, base curve, or radius of curvature of the inner portion). In some embodiments, the lens further comprises a second radius (R2) 480 corresponding to the peripheral portion 160 of the lens (peripheral curvature, or radius of curvature of the peripheral portion). In some embodiments, the base radius (R1) 460 is the about same, or about equal to, the base radius (R2) 480 when the lens 120 is in a neutral configuration (for instance, when the lens 120 is not placed on any eye or other surface, for instance, when the lens 120 is placed and/or stored in a contact lens solution). In some embodiments, the base radius (R1) 460 is different from the base radius (R2) 480. In some embodiments, the base radius (R1) 460 is at least about 7 mm, at least 7.1 mm, at least 7.2 mm, at least 7.3 mm, at least 7.4 mm, at least 7.5 mm, at least 7.6 mm, at least 7.7 mm, at least 7.8 mm, at least 7.86 mm, at least 7.9 mm, at least 8 mm, at least 8.1 mm, at least 8.2 mm, at least 8.3 mm, at least 8.4 mm, at least 8.5 mm, at least 8.6 mm, at least 8.7 mm, at least 8.8 mm, at least 8.9 mm, at least 9 mm, or more. In some embodiments, the base radius is at most about 9 mm, at most 8.9 mm, at most 8.8 mm, at most 8.7 mm, at most 8.6 mm, at most 8.5 mm, at most 8.4 mm, at most 8.3 mm, at most 8.2 mm, at most 8.1 mm, at most 8 mm, at most 7.9 mm, at most 7.8 mm, at most 7.7 mm, at most 7.6 mm, at most 7.5 mm, at most 7.4 mm, at most 7.3 mm, at most 7.2 mm, at most 7.1 mm, at most 7 mm, or less. In some embodiments, the base radius (R1) is within a range defined by any two of the preceding values. In some embodiments, the base radius (R1) 460 is within a range between about 7 mm to 9 mm. In some embodiments, the base radius (R1) 460 is within a range between about 6 mm to 10 mm. In some embodiments, the radius of curvature of the inner portion ranges from about 6 mm to about 10 mm. In some embodiments, the radius of curvature of the inner portion ranges from about 7 mm to about 9 mm.

In some embodiments, the second radius (R2) 480 has a curvature of at least about 6 millimeters (mm), 6.1 mm, at least 6.2 mm, at least 6.3 mm, at least 6.4 mm, at least 6.5 mm, at least 6.6 mm, at least 6.7 mm, at least 6.8 mm, at least 6.9 mm, at least 7 mm, at least 7.1 mm, at least 7.2 mm, at least 7.3 mm, at least 7.4 mm, at least 7.5 mm, at least 7.6 mm, at least 7.7 mm, at least 7.8 mm, at least 7.9 mm, at least 8 mm, at least 8.1 mm, at least 8.2 mm, at least 8.3 mm, at least 8.4 mm, at least 8.5 mm, at least 8.6 mm, at least 8.7 mm, at least 8.8 mm, at least 8.9 mm, at least 9 mm, at least 9.1 mm, at least 9.2 mm, at least 9.3 mm, at least 9.4 mm, at least 9.5 mm, at least 9.6 mm, at least 9.7 mm, at least 9.8 mm, at least 9.9 mm, at least 10 mm, at least 10.1 mm, at least 10.2 mm, at least 10.3 mm, at least 10.4 mm, at least 10.5 mm, at least 10.6 mm, at least 10.7 mm, at least 10.8 mm, at least 10.9 mm, at least 11 mm, at least 11.1 mm, at least 11.2 mm, at least 11.3 mm, at least 11.4 mm, at least 11.5 mm, at least 11.6 mm, at least 11.7 mm, at least 11.8 mm, at least 11.9 mm, at least 12 mm, at least 12.5 mm, at least 13 mm, at least 14 mm, at least 14.5 mm, at least 15 mm or more. In some embodiments, the second radius (R2) 480 has a curvature of at most about 15 mm, at most 14.5 mm, at most 14 mm, at most 13 mm, at most 12.5 mm, at most 12 mm, at most 11.9 mm, at most 11.8 mm, at most 11.7 mm, at most 11.6 mm, at most 11.5 mm, at most 11.4 mm, at most 11.3 mm, at most 11.2 mm, at most 11.1 mm, at most 11 mm, at most 10.9 mm, at most 10.8 mm, at most 10.7 mm, at most 10.6 mm, at most 10.5 mm, at most 10.4 mm, at most 10.3 mm, at most 10.2 mm, at most 10.1 mm, at most 10 mm, at most 9.9 mm, at most 9.8 mm, at most 9.7 mm, at most 9.6 mm, at most 9.5 mm, at most 9.4 mm, at most 9.3 mm, at most 9.2 mm, at most 9.1 mm, at most 9 mm, at most 8.9 mm, at most 8.8 mm, at most 8.7 mm, at most 8.6 mm, at most 8.5 mm, at most 8.4 mm, at most 8.3 mm, at most 8.2 mm, at most 8.1 mm, at most 8 mm, at most 7.9 mm, at most 7.8 mm, at most 7.7 mm, at most 7.6 mm, at most 7.5 mm, at most 7.4 mm, at most 7.3 mm, at most 7.2 mm, at most 7.1 mm, at most 7 mm, at most 6.9 mm, at most 6.8 mm, at most 6.7 mm, at most 6.6 mm, at most 6.5 mm, at most 6.4 mm, at most 6.3 mm, at most 6.2 mm, at most 6.1 mm, at most 6 mm, or less. In some embodiments, the second radius (R2) 480 has a curvature that is within a range defined by any two of the preceding values. In some embodiments, the peripheral curve comprises a radius (R2) 480 within a range from about 9 mm to about 10 mm. In some embodiments, the peripheral curvature comprises a radius (R2) 480 of about 9.324 mm. In some embodiments, the peripheral curve comprises a radius (R2) 480 within a range from about 6.5 mm to about 14.5 mm. In some embodiments, the peripheral curve comprises a radius (R2) 480 within a range from about 6 mm to about 15 mm. In some embodiments, the radius of curvature of the peripheral portion ranges from about 6 mm to about 15 mm.

In some embodiments, the ratio of the base radius (R1) and second radius (R2) is from about 7:15 to about 3:2. In some embodiments, the ratio of the first radius of curvature of the inner portion and the second radius of curvature of the peripheral portion is from about 7:15 to about 3:2. In some embodiments, the ratio of the first radius of curvature of the inner portion and the second radius of curvature of the peripheral portion is from about 1:1. In some embodiments, the R1 is the radius of curvature of the inner portion and R2 is the radius of curvature of the peripheral portion.

In some embodiments, the first radius of curvature of the inner portion changes less than the second radius of the curvature of the peripheral portion when the peripheral portion is subject to a deformation. In some embodiments, the first radius of curvature of the inner portion changing less than the second radius of the curvature of the peripheral portion when the peripheral portion is subject to a deformation refers to the peripheral portion deforming from the juncture to increase the second radius of curvature.

In some embodiments, the inner portion has a circumference from about 0 mm to about 5 mm about the center axis of the lens 330. In some embodiments, the peripheral portion has a circumference from about 1.5 mm to about 8 mm about the center axis of the lens. In some embodiments, the ratio of the circumference of the inner portion to the circumference of the peripheral portion about the center axis of the lens is from about 1:10 to about 5:1.

In some embodiments, the inner portion has a radius from about 0 mm to about 5 mm about the center axis of the lens 330. In some embodiments, the peripheral portion has a radius from about 1.5 mm to about 8 mm about the center axis of the lens. In some embodiments, the ratio of the radius of the inner portion to the radius of the peripheral portion about the center axis of the lens is from about 1:10 to about 5:1.

In some embodiments, the lenticular volume between at least a portion of the posterior surface and the cornea is any suitable volume. In some embodiments, the lenticular volume 180 between at least a portion of the posterior surface and the cornea 150 has a total volume from about 0.001 microliters ("µL") to about 10 µL. In some embodiments, the lenticular volume 180 has a total volume of at least about 0.001 µL, at least 0.002 µL, at least 0.003 µL, at least 0.004 µL, at least 0.005 µL, at least 0.006 µL, at least 0.007 µL, at least 0.008 µL, at least 0.009 µL, at least 0.01 µL, at least 0.02 µL, at least 0.04 µL, at least 0.06 µL 0.08 µL, at least 0.1 µL, at least 0.3 µL, at least 0.6 µL, at least 0.9 µL, at least 1 µL, at least 2 µL, at least 3 µL, at least 4 µL, at least 5 µL, at least 6 µL, at least 7 µL, at least 8 µL, at least 9 µL, at least 10 µL, or any values therebetween. In some embodiments, the lenticular volume 180 has a total volume of at most about 10 µL, at most 9 µL, at most 8 µL, at most 7 µL, at most 6 µL, at most 5 µL, at most 4 µL, at most 3 µL, at most 2 µL, at most 1 µL, at most 0.9 µL, at most 0.6 µL, at most 0.3 µL, at most 0.1 µL, at most 0.08 µL, at most 0.06 µL, at most 0.06 µL, at most 0.04 µL, at most 0.02 µL, at most 0.01 µL, at most 0.009 µL, at most 0.008 µL, at most 0.007 µL, at most 0.006 µL, at most 0.005 µL, at most 0.004 µL, at most 0.003 µL, at most 0.002 µL, at most 0.001 µL, or any values there between. In some embodiments, the lenticular volume 180 has a total volume within a range defined by any two of the preceding values.

In some embodiments, the distribution of the lenticular volume varies across the lens when the lens is fitted to an eye. In some embodiments, the lenticular volume is less in a peripheral portion of the lens in comparison to the inner portion of the lens.

In some embodiments, at least one sector of the soft lens body from a center (e.g., central axis 330) of the soft lens body to a peripheral edge of the soft lens body is configured to be suspended over the cornea 150 to form at least a portion of the lenticular volume 180 when the lens 120 is disposed over the cornea 150. In some embodiments, any of the at least one sector of the soft lens body is capable of being suspended over the cornea 150 to form at least a portion of the lenticular volume 180 when the soft lens body is disposed over the cornea 150.

In some embodiments, the at least one discrete discontinuity is positioned in the optical zone. In some embodiments, the at least one discrete discontinuity is positioned in a non-optical region. In some embodiments, the at least one discrete discontinuity is positioned in both the optical and non-optical regions.

Provided herein are methods for making the lens. In some embodiments, the juncture 130 of the lens 120 is formed by molding, machining, chemical etching, and/or laser etching. In some embodiments, the juncture 130 of the lens 120 is formed by molding. In some embodiments, the juncture 130 of the lens 120 is formed by machining. In some embodiments, the juncture 130 of the lens 120 is formed by etching (e.g., chemical etching or laser etching). In some embodiments, the juncture 130 is formed by methods other than molding or etching as will be understood by one of ordinary skill in the art based on the teachings herein.

In some embodiments, the anterior surface 170 of the inner portion 210 is characterized by a substantially spherical profile. In some embodiments, the substantially spherical profile is molded or etched.

In some embodiments, the lens comprises a polymeric material. In some embodiments, the soft lens body of the lens 120 is made of a single material. In some embodiments, the single material has the same mechanical properties throughout. In some embodiments, the single material is a polymeric material. In some embodiments, the inner portion 210, the juncture 130, and the peripheral portion 160 comprises a hydrogel (e.g., a silicone hydrogel or pure silicone). In some embodiments, the single material is selected from diacetone acrylamide, N,N-dimethylacrylamide, 2-hydroxyethyl methacrylate, methacrylic acid, methyl methacrylate, N-carboxyl vinyl ester, N-vinyl pyrrolidone, poly[dimethylsiloxyl] di[silylbutanol]bis[vinyl carbamate], phosphorylcholine, tris-(trimethylsiloxysilyl)propylvinyl carbamate, tris-(hydroxylmethyl)aminomethane, siloxane, silicone, or polyvinylpyrrolidone. In some embodiments, the inner portion 210, the juncture 130, and the peripheral portion 160 comprises a polymeric material. In some embodiments, the inner portion 210, the juncture 130, and the peripheral portion 160 comprises a soft material (e.g., a material comprising a Young's modulus of less than 4 MPa). In some embodiments, the material used in the inner portion 210, the juncture 130, and the peripheral portion 160 is biocompatible, inert, non-toxic, and/or non-invasive to the eye of the subject. In some embodiments, the material facilitates fitting the lens on the eye. In some embodiments, the soft material of the lens is comfortable on the eye of the subject. In some embodiments, the lens comprises one or more of many optically clear materials, such as synthetic materials or natural materials. In some embodiments, the lens comprises collagen-based materials. Such collagen-based materials, and combinations thereof, are described in U.S. patent application Ser. No. 12/384,659, filed Apr. 6, 2009, entitled "Therapeutic Device for Pain Management and Vision, U.S. Pub. No. US 2010-0036488 A1, published on 11 Feb. 2010, which is herein incorporated by reference in its entirety for all purposes. In some embodiments, the lens comprises a known synthetic material, such as hydroxyethyl methacrylate (HEMA) hydrogel, hydrogel, silicone, hydrated silicone, and derivatives thereof. In some embodiments, the lens comprises HEMA hydrogel. In some embodiments, the optically clear material comprises one or more of silicone, silicone hydrogel, silicone comprising resin, silicone comprising silicate, acrylate, and collagen. In some embodiments, a silicone comprises a cured silicone that is two-part heat cured and room-temperature vulcanized. In some embodiments, polydimethyl siloxane (such as NuSil, or poly(dimethyl) (diphenyl)siloxane) is used to mold the lens, for example with less than 10% water content so as to increase oxygen diffusion through the lens. In some embodiments, the lens 120 comprises perfluoropolyethers or fluorofocal. In some embodiments, the lens comprises an elastic material such as silicone. In some embodiments, the material allows the lens to seal the cornea.

In some embodiments, the lens 120 comprises a single material that is uniformly cured (i.e., each portion of the lens, has or has about the same modulus). In some embodiments, the juncture 130 allows the lens 120 to comprise a single material and to articulate like a dual-rigidity lens (i.e., an eye covering with one material for its central portion and another different rigidity material for its peripheral portion), such that the inner portion 210 maintains its sphericity when the periphery of the lens 120 is deformed.

In some embodiments, the lens material comprises silicone elastomer having optically clear silicate disposed therein. In some embodiments, the material comprises any suitable water content. In some embodiments, the material has a water content of at most about 20%, at most 15%, at most 10%, at most 9% 8%, at most 7%, at most 6%, at most 5%, at most 4%, at most 3%, at most 2%, at most 1%, or less. The material may have a water content of at least about 1%, at least 2%, at least 3%, at least 4%, at least 5%, at least 6%, at least 7%, at least 8%, at least 9%, at least 10%, at least 15%, at least 20%, at least 30%, at least 50%, at least 60%, at least 70%, at least 80%, at least 90%, at least 95%, at least 99% or more. In some embodiments, the material has a water content that is within a range defined by any two of the preceding values. In some embodiments, the material contains at most about 90% water content. In some embodiments, the material contains at most about 10% water content. In some embodiments, the material contains at most about 5% water content.

In some embodiments, the lens comprises have any suitable oxygen permeability (Dk). In some embodiments, the lens has a high oxygen permeability (Dk), which in some embodiments may exceed 150. In some embodiments, the oxygen permeability of the lens is about 30 to 400 Dk. In some embodiments, the silicone lens comprising silicate is treated to provide a wettable surface.

In some embodiments, the lens comprises a hydrogel, for example silicone hydrogel. In some embodiments, the lens comprises one or more of a hydrogel, silicone hydrogel, or silicone. In some embodiments, the lens comprises a hydrogel. In some embodiments, the lens comprises a silicone hydrogel. In some embodiments, the lens comprises silicone.

In some embodiments, the lens comprises one or more of diacetone acrylamide, N,N-dimethylacrylamide, 2-hydroxyethyl methacrylate, methacrylic acid, methyl methacrylate, N-carboxyl vinyl ester, N-vinyl pyrrolidone, poly[dimethylsiloxyl]di[silybutanol]bis[vinyl carbamate], phosphorylcholine, tris-(trimethylsiloxysilyl)propylvinyl carbamate, tris-(hydroxylmethyl)aminomethane, siloxane, or polyvinylpyrrolidone. In some embodiments, the lens comprises diacetone acrylamide. In some embodiments, the lens comprises N,N-dimethylacrylamide. In some embodiments, the lens comprises 2-hydroxyethyl methacrylate. In some embodiments, the lens comprises methacrylic acid. In some embodiments, the lens comprises methyl methacrylate. In some embodiments, the lens comprises N-carboxyl vinyl ester. In some embodiments, the lens comprises N-vinyl pyrrolidone. In some embodiments, the lens comprises poly[dimethylsiloxyl]di[silybutanol]bis[vinyl carbamate]. In some embodiments, the lens comprises phosphorylcholine. In some embodiments, the lens comprises tris-(trimethylsiloxysilyl)propylvinyl carbamate. In some embodiments, the lens comprises tris-(hydroxylmethyl)aminomethane. In some embodiments, the lens comprises siloxane. In some embodiments, the lens comprises polyvinylpyrrolidone.

In some embodiments, the water content of the lens material is at least about 5%, at least 10%, at least 15%, at least 20%, at least 25%, at least 30%, at least 35%, at least 40%, at least 45%, at least 50%, at least 52%, at least 54%, at least 56%, at least 58%, at least 60%, at least 62%, at least 64%, at least 66%, at least 68%, at least 70%, at least 72%, at least 74%, at least 76%, at least 78%, at least 80%, at least 85%, at least 90%, at last 95%, at least 99%, or more. In some embodiments, the water content of the lens material is at most about 99%, at most 95%, at most 90%, at most 85%, at most 80%, at most 78%, at most 76%, at most 74%, at most 72%, at most 70%, at most 68%, at most 66%, at most 64%, at most 62%, at most 60%, at most 58%, at most 56%, at most 54%, at most 52%, at most 50%, at most 45%, at most 40%, at most 35%, at most 30%, at most 25%, at most 20%, at most 15%, at most 10%, at most 5%, or less. In some embodiments, the water content of the lens material is within a range defined by any two of the preceding values. In some embodiments, the covering/lens material comprises a water content within a range from about 5% to about 99%.

In some embodiments, the lens comprises any suitable rigidity. In some embodiments, the lens comprises a rigidity from about $1.25E+0.4$ MPa*$\mu m^3$ to about $5.00E+08$ MPa*$\mu m^3$.

In some embodiments, the inner portion 210 has any suitable rigidity. In some embodiments, the peripheral portion 160 has any suitable rigidity. In some embodiments, the inner portion 210 has a rigidity range from about $1.25E+04$ MPa*$\mu m^3$ to about $5.00E+08$ MPa*$\mu m^3$. In some embodiments, the peripheral portion 160 has rigidity range from about $1.25E+04$ MPa*$\mu m^3$ to about $5.00E+08$ MPa*$\mu m^3$. In some embodiments, the rigidity of the inner portion 210 and the peripheral portion 160 is the same. In some embodiments, the rigidity of the inner portion 210 and the peripheral portion 160 is about the same. In some embodiments, the rigidity of the inner portion 210 and the peripheral portion 160 is different. In some embodiments, the ratio of the rigidity of the inner portion to the peripheral portion is from about 1:3 to about 3:1. In some embodiments, the ratio of the rigidity of the inner portion to the peripheral portion is from about 1:1.

In some embodiments, the inner portion 210 and the peripheral portion 160 have the same Young's modulus. In some embodiments, the soft lens body has a uniform Young's modulus (e.g., isotropic). In some embodiments, the covering/lens material i.e., the material of the soft lens body) has a Young's modulus within a range from about 0.1 to about 10 MPa, such that the lens conforms at least partially to the astigmatism or high order aberration. In some embodiments, the covering/lens material has a Young's modulus that is at least about 0.1 megapascals (MPa), at least 0.2 MPa, at least 0.3 MPa, at least 0.4 MPa, at least 0.5 MPa, at least 0.6 MPa, at least 0.7 MPa, at least 0.8 MPa, at least 0.9 MPa, at least 1 MPa, at least 1.1 MPa, at least 1.2 MPa, at least 1.3 MPa, at least 1.4 MPa, at least 1.5 MPa, at least 1.6 MPa, at least 1.7 MPa, at least 1.8 MPa, at least 1.9 MPa, at least 2 MPa, at least 2.1 MPa, at least 2.2 MPa, at least 2.3 MPa, at least 2.4 MPa, at least 2.5 MPa, at least 2.6 MPa, at least 2.7 MPa, at least 2.8 MPa, at least 2.9 MPa, at least 3 MPa, at least 4 MPa, at least 5 MPa, at least 6 MPa, at least 7 MPa, at least 8 MPa, at least 9 MPa, at least 10 MPa, at least or more. In some embodiments, the Young's modulus is at most about 10 MPa, at most 9 MPa, at most 8 MPa, at most 7 MPa, at most 6 MPa, at most 5 MPa, at most 4 MPa, at most 3 MPa, at most 2.9 MPa, at most 2.8 MPa, at most 2.7 MPa, at most 2.6 MPa, at most 2.5 MPa, at most 2.4 MPa, at most 2.3 MPa, at most 2.2 MPa, at most 2.1 MPa, at most 2 MPa, at most 1.9 MPa, at most 1.8 MPa, at most 1.7 MPa, at most 1.6 MPa, at most 1.5 MPa, at most 1.4 MPa, at most 1.3 MPa, at most 1.2 MPa, at most 1.1 MPa, at most 1 MPa, at most 0.9 MPa, at most 0.8 MPa, at most 0.7 MPa, at most 0.6 MPa, at most 0.5 MPa, at most 0.4 MPa, at most 0.3 MPa, at most 0.2 MPa, at most 0.1 MPa, or less. In some embodiments, the covering/lens material has a Young's modulus that is within a range defined by any two of the preceding values. In some embodiments, the lens material has a Young's modulus from about 0.1 MPa to about 10 MPa. In some embodiments, the lens material has a Young's modulus from about 0.1 MPa to about 3 MPa.

In some embodiments, the Young's modulus is tensile modulus. In some embodiments, the inner portion 210 and the peripheral portion 160 have the same tensile modulus. In some embodiments, the soft lens body has a uniform tensile modulus. In some embodiments, the covering/lens material i.e., the material of the soft lens body) comprises a tensile modulus within a range from about 0.1 to about 10 MPa, such that the lens conforms at least partially to the astigmatism or high order aberration. In some embodiments, the covering/lens material has a tensile modulus is at least about 0.1 megapascals (MPa), at least 0.2 MPa, at least 0.3 MPa, at least 0.4 MPa, at least 0.5 MPa, at least 0.6 MPa, at least 0.7 MPa, at least 0.8 MPa, at least 0.9 MPa, at least 1 MPa, at least 1.1 MPa, at least 1.2 MPa, at least 1.3 MPa, at least 1.4 MPa, at least 1.5 MPa, at least 1.6 MPa, at least 1.7 MPa, at least 1.8 MPa, at least 1.9 MPa, at least 2 MPa, at least 2.1 MPa, at least 2.2 MPa, at least 2.3 MPa, at least 2.4 MPa, at least 2.5 MPa, at least 2.6 MPa, at least 2.7 MPa, at least 2.8 MPa, at least 2.9 MPa, at least 3 MPa, at least 4 MPa, at least 5 MPa, at least 6 MPa, at least 7 MPa, at least 8 MPa, at least 9 MPa, at least 10 MPa, at least or more. In some embodiments, the tensile modulus is at most about 10 MPa, at most 9 MPa, at most 8 MPa, at most 7 MPa, at most 6 MPa, at most 5 MPa, at most 4 MPa, at most 3 MPa, at most 2.9 MPa, at most 2.8 MPa, at most 2.7 MPa, at most 2.6 MPa, at most 2.5 MPa, at most 2.4 MPa, at most 2.3 MPa, at most 2.2 MPa, at most 2.1 MPa, at most 2 MPa, at most 1.9 MPa, at most 1.8 MPa, at most 1.7 MPa, at most 1.6 MPa, at most 1.5 MPa, at most 1.4 MPa, at most 1.3 MPa, at most 1.2 MPa, at most 1.1 MPa, at most 1 MPa, at most 0.9 MPa, at most 0.8 MPa, at most 0.7 MPa, at most 0.6 MPa, at most 0.5 MPa, at most 0.4 MPa, at most 0.3 MPa, at most 0.2 MPa, at most 0.1 MPa, or less. In some embodiments, the covering/lens material comprises a tensile modulus that is within a range defined by any two of the preceding values. In some embodiments, the covering/lens material comprises a tensile modulus from about 0.1 MPa to about 4 MPa. In some embodiments, the tensile modulus of at least one of the inner portion, the peripheral portion, or the juncture ranges from about 0.1 Megapascals (MPa) to about 4 MPa. In some embodiments, the tensile modulus of the inner portion ranges from about 0.1 Megapascals (MPa) to about 4 MPa. In some embodiments, the tensile modulus of the peripheral portion ranges from about 0.1 Megapascals (MPa) to about 4 MPa. In some embodiments, the tensile modulus of the juncture ranges from about 0.1 Megapascals (MPa) to about 4 MPa.

In some embodiments, a ratio of the tensile modulus of the juncture to the inner portion is about 1:1 to about 1:100. In some embodiments, a ratio of the tensile modulus of the juncture to the inner portion is about 1:20 to about 1:100. In some embodiments, a ratio of the tensile modulus of the juncture to the inner portion is about 1:50 to about 1:100. In some embodiments, a ratio of the tensile modulus of the juncture to the inner portion is about 1:70 to about 1:100.

In some embodiments, the ratio of the tensile modulus of the juncture to the peripheral portion is about 1:1 to about 1:100. In some embodiments, the ratio of the tensile modulus of the juncture to the peripheral portion is about 1:20 to about 1:100. In some embodiments, the ratio of the tensile modulus of the juncture to the peripheral portion is about 1:50 to about 1:100. In some embodiments, the ratio of the tensile modulus of the juncture to the peripheral portion is about 1:70 to about 1:100.

In some embodiments, ratio of the tensile modulus of the inner portion to the peripheral portion is about 10:1 to about 1:10. In some embodiments, ratio of the tensile modulus of the inner portion to the peripheral portion is about 3:1 to about 1:3. In some embodiments, ratio of the tensile modulus of the inner portion to the peripheral portion is about 2:1 to about 1:2. In some embodiments, ratio of the tensile modulus of the inner portion to the peripheral portion is about 1:1.

In some embodiments, a ratio of the tensile strength of the juncture to the inner portion is about 1:1 to about 1:100. In some embodiments, a ratio of the tensile strength of the juncture to the inner portion is about 1:20 to about 1:100. In some embodiments, a ratio of the tensile strength of the juncture to the inner portion is about 1:50 to about 1:100. In some embodiments, a ratio of the tensile strength of the juncture to the inner portion is about 1:70 to about 1:100.

In some embodiments, the ratio of the tensile strength of the juncture to the peripheral portion is about 1:1 to about 1:100. In some embodiments, the ratio of the tensile strength of the juncture to the peripheral portion is about 1:20 to about 1:100. In some embodiments, the ratio of the tensile strength of the juncture to the peripheral portion is about 1:50 to about 1:100. In some embodiments, the ratio of the tensile strength of the juncture to the peripheral portion is about 1:70 to about 1:100.

In some embodiments, ratio of the tensile strength of the inner portion to the peripheral portion is about 10:1 to about 1:10. In some embodiments, ratio of the tensile strength of the inner portion to the peripheral portion is about 3:1 to about 1:3. In some embodiments, ratio of the tensile strength of the inner portion to the peripheral portion is about 2:1 to about 1:2. In some embodiments, ratio of the tensile strength of the inner portion to the peripheral portion is about 1:1.

In some embodiments, the elastic modulus of the lens, thickness of the lens, and/or degree of deformation influences how much energy is stored in the lens when the lens conforms to the corneal surface. In some embodiments, the degree of deformation is determined by measuring the volumetric difference between the lens's neutral configuration (i.e., "as-manufactured" shape) and the deformed configuration.

In some embodiments, the lens 120 comprises a single material that is uniformly cured (i.e., each portion of the lens, has or has about the same Young's modulus or modulus of elasticity). In some embodiments, the juncture 130 allows the lens 120 to comprise a single material and to articulate like a dual-rigidity lens (i.e., an eye lens with one material for its central portion and another different rigidity material for its peripheral portion), such that the inner portion 210 can maintain its sphericity when the periphery of the lens 120 is deformed.

In some embodiments, the lens material is cured with a hardness and size and shape such that the lens comprises a Young's modulus or modulus of elasticity. In some embodiments, the modulus of elasticity is at least about 0.1 megapascals (MPa), at least 0.2 MPa, at least 0.3 MPa, at least 0.4 MPa, at least 0.5 MPa, at least 0.6 MPa, at least 0.7 MPa, at least 0.8 MPa, at least 0.9 MPa, at least 1 MPa, at least 1.1 MPa, at least 1.2 MPa, at least 1.3 MPa, at least 1.4 MPa, at least 1.5 MPa, at least 1.6 MPa, at least 1.7 MPa, at least 1.8 MPa, at least 1.9 MPa, at least 2 MPa, at least 2.1 MPa, at least 2.2 MPa, at least 2.3 MPa, at least 2.4 MPa, at least 2.5 MPa, at least 2.6 MPa, at least 2.7 MPa, at least 2.8 MPa, at least 2.9 MPa, at least 3 MPa, at least 4 MPa, at least 5 MPa, at least 6 MPa, at least 7 MPa, at least 8 MPa, at least 9 MPa, at least 10 MPa, or more. In some embodiments, the modulus of elasticity is at most about 10 MPa, at most 9 MPa, at most 8 MPa, at most 7 MPa, at most 6 MPa, at most 5 MPa, at most 4 MPa, at most 3 MPa, at most 2.9 MPa, at most 2.8 MPa, at most 2.7 MPa, at most 2.6 MPa, at most 2.5 MPa, at most 2.4 MPa, at most 2.3 MPa, at most 2.2 MPa, at most 2.1 MPa, at most 2 MPa, at most 1.9 MPa, at most 1.8 MPa, at most 1.7 MPa, at most 1.6 MPa, at most 1.5 MPa, at most 1.4 MPa, at most 1.3 MPa, at most 1.2 MPa, at most 1.1 MPa, at most 1 MPa, at most 0.9 MPa, at most 0.8 MPa, at most 0.7 MPa, at most 0.6 MPa, at most 0.5 MPa, at most 0.4 MPa, at most 0.3 MPa, at most 0.2 MPa, at most 0.1 MPa, or less. In some embodiments, the modulus of elasticity is within a range defined by any two of the preceding values. In some embodiments, the modulus of elasticity is from about 0.1 MPa to about 10 MPa. In some embodiments, the modulus of elasticity of the contact lens is from about 0.1 MPa to about 3 MPa In some embodiments, the lens 120 comprises silicone or silicone hydrogel having a low ionoporosity such that lens seals to the cornea. In some embodiments, the lens comprises silicone or silicone hydrogel comprising any suitable ionoporosity. In some embodiments, the lens 120 comprises silicone hydrogel comprising a low ion permeability, and the range of water is from about 5% to about 35%, such that the Dk is 100 or more. In some embodiments, the low ion permeability comprises an Ionoton Ion Permeability Coefficient of at most about $0.25 \times 10^{-3}$ cm$^2$/sec so as to seal the cornea. In some embodiments, the Ionoton Ion Permeability Coefficient is about $0.05 \times 10^{-3}$ cm$^2$/sec to about $0.10 \times 10^{-3}$ cm$^2$/sec. In some embodiments, the Ionoton Ion Permeability Coefficient is at most about $0.08 \times 10^{-3}$ cm$^2$/sec. In some embodiments, the low ion permeability comprises an Ionoton Ion Permeability Coefficient of at most about $2.6 \times 10^{-6}$ mm$^2$/min to seal the cornea. In some embodiments, the Ionoton Ion Permeability Coefficient is at most about $1.5 \times 10^{-6}$ mm$^2$/min.

In some embodiments, the lens 120 comprises a wettable surface coating disposed on at least the upper side of the lens, such that the tear film of the patient is smooth over the lens and the patient can see. In some embodiments, the wettable surface coating comprises a lubricious coating for patient comfort. In some embodiments, the lubricious coating lubricates the eye when the patient blinks.

In some embodiments, the wettable coating comprises a contact angle of at most about 85 degrees, at most 80 degrees, at most 75 degrees, at most 70 degrees, at most 65 degrees, at most 60 degrees, at most 55 degrees, at most 50 degrees, at most 45 degrees, at most 40 degrees, at most 35 degrees, at most 30 degrees, at most 25 degrees, at most 20 degrees, at most 15 degrees, at most 10 degrees, at most 5 degrees, or less. In some embodiments, the wettable coating comprises a contact angle of at least about 5 degrees, at least 10 degrees, at least 15 degrees, at least 20 degrees, at least 25 degrees, at least 30 degrees, at least 35 degrees, at least 40 degrees, at least 45 degrees, at least 50 degrees, at least 55 degrees, at least 60 degrees, at least 65 degrees, at least 70 degrees, at least 75 degrees, at least 80 degrees, at least 85 degrees, or more. In some embodiments, the wettable coating comprises a contact angle that is within a range defined by any two of the preceding values. In some embodiments, the contact angle is at most 80 degrees. In some embodiments, the contact angle is at most 70 degrees. In some embodiments, the contact angle is within a range from about 55 to 65 degrees to provide a surface with a smooth tear layer for vision. In some embodiments, the wettable coating is disposed on both an upper surface and a lower surface of the lens. In some embodiments, the upper surface comprises the wettable coating extending over at least the inner portion.

Provided herein are methods for correcting a refractive error of the eye. Also provided here are methods for correcting an astigmatism in an eye. In some embodiments, the methods comprise providing any one of the contact lenses described herein. In one aspect, provided herein is a method for correcting an ocular refractive error (e.g., astigmatism) of the eye, the method comprising providing the soft contact lens of the disclosure. In another aspect, provided herein is a method for correcting an ocular refractive error (e.g., astigmatism) of the eye, the method comprising placing the soft contact lens of the disclosure to an ocular surface of the eye.

Provided herein are methods for forming a tear lens. The method may comprise applying the soft contact lens of the disclosure to an ocular surface of the eye.

Provided herein are methods for forming a lenticular volume. The method may comprise applying to an ocular surface of the eye a soft contact lens of the disclosure, wherein the inner portion is configured to form the lenticular volume to form a tear lens over the ocular surface to correct the ocular refractive error.

In some embodiments, the inner portion 210 of the lens 120 comprises or be the optical zone of the lens 120 and is configured to mask an ocular refractive error or aberration of the eye, such as an astigmatism or coma. In some embodiments, the inner portion 210 masks astigmatism independent of the orientation of the lens 120 about a central optical axis of the cornea 150. In some embodiments, the posterior surface of the soft lens body forms a lenticular volume 180 over the eye 100, the lenticular volume 180 configured to form a tear lens over the corneal surface of the eye 100 to mask an astigmatism. In some embodiments, a combination of the optical region and the lenticular volume 180 are configured to mask an astigmatism of the eye 100.

In some embodiments, the lens 120 (e.g., the optic zone of the covering or the contact lens) is configured to mask an astigmatism of an eye of a subject. In some embodiments, the inner portion 210 of the lens 120 is configured to mask astigmatism up to about 5 diopters (D). In some embodiments, the inner portion 210 of the lens 120 is configured to mask astigmatism up to about 2.5 diopters (D). In some embodiments, the inner portion 210 of the lens 120 is configured to mask astigmatism up to about 5 D, up to 4.75 D, up to 4.5 D, up to 4.25 D, up to 4 D, up to 3.75 D, up to 3.5 D, up to 3.25 D, up to 3 D, up to 2.75 D, up to 2.5 D, up to 2.25 D, up to 2.0 D, up to 1.75 D, up to 1.5 D, up to 1 D, up to 0.7 D, up to 0.5 D, up to 0.1D, or less. In some embodiments, the inner portion 210 of the lens 120 is configured to mask astigmatism up to about 0.1 D, up to 0.5 D, up to 0.7 D, up to 1 D, up to 1.5 D, up to 1.75 D, up to 2.0 D, up to 2.25 D, up to 2.5 D, up to 2.75 D, up to 3 D, up to 3.25 D, up to 3.5 D, up to 3.75 D, up to 4 D, up to 4.25 D, up to 4.5 D, up to 4.75 D, up to 5 D, or more. The lens 120 is configured to mask an astigmatism that is within a range defined by any two of the preceding values. In some embodiments, the astigmatism is within a range from about 2.25 D to about 2.5 D. In some embodiments, the lens 120 is configured to mask an astigmatism in increments of 0.01 D due to the sensitivity of the tear lens formation and is not limited to 0.25 D increments as is customary in standard toric lens). In some embodiments, the inner portion 210 of the lens 120 is configured to mask astigmatism up to about 5 D, up to 4.9 D, up to 4.8 D, up to 4.7 D, up to 4.6 D, up to 4.5 D, up to 4.4 D, up to 4.3 D, up to 4.2 D, up to 4.1 D, up to 4 D, up to 3.9 D, up to 3.8 D, up to 3.7 D, up to 3.6 D, up to 3.5 D, up to 3.4 D, up to 3.3 D, up to 3.2 D, up to 3.1 D, up to 3 D, up to 2.9 D, up to 2.8 D, up to 2.7 D, up to 2.6 D, up to 2.5 D, up to 2.4 D, up to 2.3 D, up to 2.2 D, up to 2.1 D, up to 2.0, up to 1.9 D, up to 1.8 D, up to 1.7 D, up to 1.6 D, up to 1.5 D, up to 1.4 D, up to 1.3 D, up to 1.2 D, up to 1 D, up to 0.9 D, up to 0.8 D, up to 0.7 D, up to 0.6 D, up to 0.5 D, up to 0.4 D, up to 0.3 D, up to 0.2 D, up to 0.1 D, or less. In some embodiments, the inner portion 210 of the lens 120 is configured to mask astigmatism up to about 0.1 D, up to 0.2 D, up to 0.3 D, up to 0.4 D, up to 0.5 D, up to 0.6 D, up to 0.7 D, up to 0.8 D, up to 0.9 D, up to 1 D, up to 1.1 D, up to 1.2 D, up to 1.3 D, up to 1.4 D, up to 1.5 D, up to 1.6 D, up to 1.7 D, up to 1.8 D, up to 1.9 D, up to 2 D, up to 2.1 D, up to 2.2 D, up to 2.3 D, up to 2.4 D, up to 2.5 D, up to 2.6 D, up to 2.7 D, up to 2.8 D, up to 2.9 D, up to 3 D, up to 3.1 D, up to 3.2 D, up to 3.3 D, up to 3.4 D, up to 3.5 D, up to 3.6 D, up to 3.7 D, up to 3.8 D, up to 3.9 D, up to 4 D, up to 4.1 D, up to 4.2 D 4.3 D, up to 4.4 D, up to 4.5 D, up to 4.6 D, up to 4.7 D, up to 4.8, up to 4.9 D, up to 5 D, or more. In some embodiments, the astigmatism is within a range from about 2.1 D to about 2.6 D.

In some embodiments, the lens 120 is configured to such that only the spherical power of the lens is required to correct the vision of a subject in need thereof, to their best corrected visual acuity. In some embodiments, the lens 120 is configured to mask an astigmatism such that only the spherical power of the lens is required to correct the vision of a subject in need thereof, to a visual acuity In some embodiments, the lens 120 is configured to correct for meridian angle of the refractive error.

In some embodiments, the lens 120 is configured to correct for differences in corneal power between meridians of about 3 D to about 0 D. In some embodiments, the lens 120 is configured to correct for differences in corneal power up to about 3 D, up to 2.9 D, up to 2.8 D, up to 2.7 D, up to 2.6 D, up to 2.5 D, up to 2.4 D, up to 2.3 D, up to 2.2 D, up to 2.1 D, up to 2 D, up to 1.9 D, up to 1.8 D, up to 1.7 D, up to 1.6 D, up to 1.5 D, up to 1.4 D, up to 1.3 D, up to 1.2D, up to 1 D, up to 0.9 D, up to 0.8 D, up to 0.7 D, up to 0.6 D, up to 0.5 D, up to 0.4 D, up to 0.3 D, up to 0.2 D, up to 0.1 D, or less. In some embodiments, the lens 120 is configured to correct for differences in corneal power up to about 0.1 D, up to 0.2 D, up to 0.3 D, up to 0.4 D, up to 0.5 D, up to 0.6 D, up to 0.7 D, up to 0.8 D, up to 0.9 D, up to 1 D, up to 1.1 D, up to 1.2 D, up to 1.3 D, up to 1.4 D, up to 1.5 D, up to 1.6 D, up to 1.7 D, up to 1.8 D, up to 1.9 D, up to 2 D, up to 2.1 D, up to 2.2 D, up to 2.3 D, up to 2.4 D 2.5 D, up to 2.6 D, up to 2.7 D, up to 2.8 D, up to 2.9 D, up to 3 D, or more. The lens 120 is configured to correct for differences in corneal power that is within a range defined by any two of the preceding values. In some embodiments, the differences in corneal power is within a range from about 0.5 D and about 2.5 D. In some embodiments, the lens described herein corrects for differences in corneal power between meridians that are smaller than 0.75 diopters, smaller than 0.5 diopters, smaller than 0.25 diopters and smaller than 0.1 diopters.

Provided herein are kits for correcting an ocular refractive error of an eye. In some embodiments, a kit comprises a soft contact lens of the disclosure. In some embodiments, a kit further comprises a casing for the soft contact lens. In some embodiments, a kit comprises a solution (e.g., a contact lens solution). for the soft contact lens.

In the detailed description provided herein, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments, however, the order of description should not be construed to imply that these operations are order dependent. The structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Unless otherwise defined, all technical terms used herein have the same meaning as commonly understood by one of ordinary skill in the art to which this disclosure belongs. As used herein, the singular forms "a," "an," and "the" include plural references unless the context clearly indicates otherwise. Any reference to "or" herein is intended to encompass "and/or" unless otherwise stated. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for case of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present disclosure.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," "less than or equal to," or "at most" precedes the first numerical value in a series of two or more numerical values, the term "no more than," "less than," "less than or equal to," or "at most" applies to each of the numerical values in that series of numerical values. For example, less than or equal to 3, 2, or 1 is equivalent to less than or equal to 3, less than or equal to 2, or less than or equal to 1.

Where values are described as ranges, it will be understood that such disclosure includes the disclosure of all possible sub-ranges within such ranges, as well as specific numerical values that fall within such ranges irrespective of whether a specific numerical value or specific sub-range is expressly stated.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

As used herein, a lens is used to refer to an ophthalmic device that covers at least a portion of an ocular surface of an eye of a patient. In some embodiments, the lens does not by itself provide refractive vision correction. In some embodiments, ophthalmic devices that provide refractive correction are referred to herein as contact lenses or ophthalmic lenses. In some embodiments, a covering is a contact lens. In some embodiments, a covering is a soft contact lens.

As used herein, mathematical equations and scientific notation can be used to values in many ways understood by a person of ordinary skill in the art, for example so as to express data in accordance with notations used in many commercially available spreadsheets such as Excel™ commercially available from Microsoft. As used herein the symbol "E" can be used to express an exponent in base 10, such that 1E1 equals about 10, 2E1 equals about 20, and 4E2 equals about 400. As used herein the symbol "A" can be used to express an exponent, such that AAB equals AB. Units can be expressed in many ways and as would be understood by a person of ordinary skill in the art, for example "m" as meters, "Pa" as the Pascal unit for pressure, "MPa" as Mega Pascal.

As used herein, a siloxane bond encompasses a covalent Si—O—Si bond, for example of a silicone elastomer.

The optical power of the cornea in Diopters ("D") can be related to the radius R of curvature with the formula $D=(1.3375-1)/R$, where 1.3375 corresponds to the index of refraction of the aqueous humor and R corresponds to the radius of curvature of the cornea. The curvature of the cornea may be inversely related to the radius of curvature R such that as the radius of curvature increases the curvature of the cornea decreases and such that as the radius of curvature decreases the curvature of the cornea increases.

In some embodiments, the curvature of the lens or a portion of the lens may be inversely related to the radius of curvature R such that as the radius of curvature increases the curvature of the lens or the portion of the lens decreases and such that as the radius of curvature decreases the curvature of the lens or the portion of the lens increases.

As used herein, a discontinuity, also sometime referred herein as a discrete discontinuity, comprise a physical separation between two portions of the lens. In some cases, the discontinuity comprises a region of the lens having a different material integrity than an adjacent portion of the lens. In some cases, the discontinuity comprises a region having a different material property than an adjacent portion of the lens. In some cases, the discontinuity comprises a region of the lens having a different physical property than an adjacent portion of the lens. In some cases, the physical property comprises a mechanical property. In some embodiments, a discontinuity is a weakened area. In some embodiments, the structural integrity of the discontinuity is weakened (e.g., reduced) as compared to the adjacent portion of the lens. In some embodiments, a discontinuity is a juncture positioned between an inner portion of the lens and a peripheral portion of the lens. In some embodiments, a juncture is a thinned region (e.g., reduced thickness relative to adjacent parts of the lens). In other embodiments, a discrete discontinuity comprises grooves, fenestrations, or slits, or a combination thereof.

As used herein, the term "inner portion" may be referred to as "central portion," "central region," "center region," or "center portion."

As used herein, the thickness refers a cross-sectional distance. In some embodiments, the thickness refers to the average (e.g., mean) thickness. In some embodiments, the thickness refers to the maximum cross-sectional distance. In some embodiments, the thickness refers to the average cross-sectional distance.

As used herein, power refers to optical power, spherical power, cylindrical power, and/or axis.

While preferred embodiments of the present disclosure have been shown and described herein, it will be obvious to those skilled in the art that such embodiments are provided by way of example only. It is not intended that the scope of the present disclosure be limited by the specific embodiments provided within the specification. While the embodiments of the present disclosure have been described with reference to the aforementioned specification, the descriptions and illustrations of the embodiments herein are not meant to be construed in a limiting sense. Numerous variations, changes, and substitutions will now occur to those skilled in the art without departing from the scope of the present disclosure. Furthermore, it shall be understood that all aspects of the present disclosure are not limited to the specific depictions, configurations or relative proportions set forth herein which depend upon a variety of conditions and variables. It should be understood that various alternatives to the embodiments of the present disclosure described herein may be employed in practicing the embodiments of the present disclosure. It is therefore contemplated that the present disclosure shall also cover any such alternatives, modifications, variations or equivalents. It is intended that the following claims define the scope of the invention and that methods and structures within the scope of these claims and their equivalents be covered thereby.

EXAMPLES

The inventions of the present disclosure now being generally described, it will more readily be understood to by reference to the following examples which are included merely for the purpose of illustration of certain aspects and embodiments of the present disclosure and are not intended to limit the scope of the present disclosure in any way.

Example 1: Comparison of Eye Lens Thickness

Figure 2C:
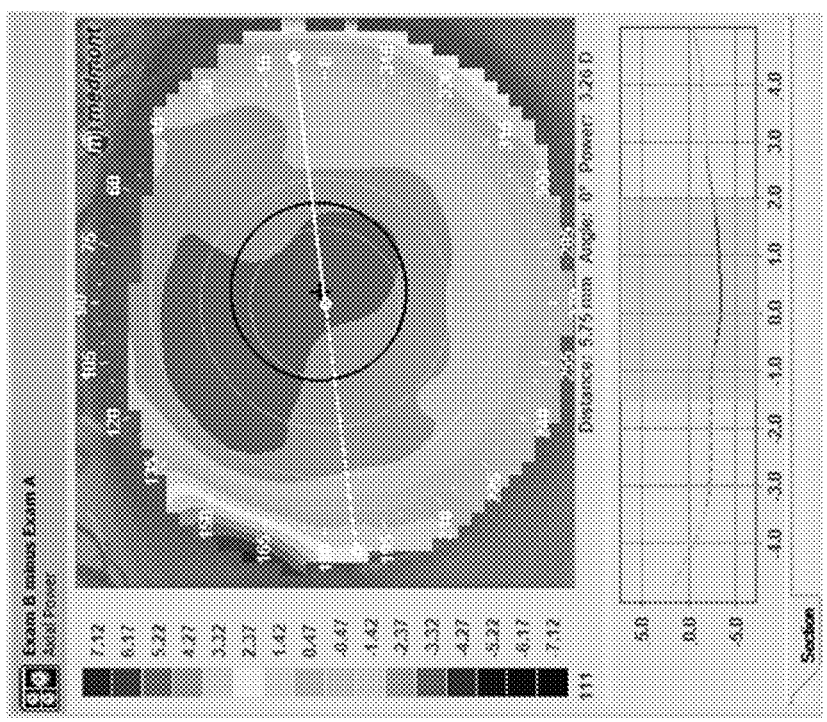
FIGS. 2A-2C illustrate the topography of a bare eye having an astigmatism (FIG. 2A), as compared with the topography of the same eye fitted with exemplary lenses (FIG. 2B), and a subtraction image of the two topographies (FIG. 2C).
Figure 2A:
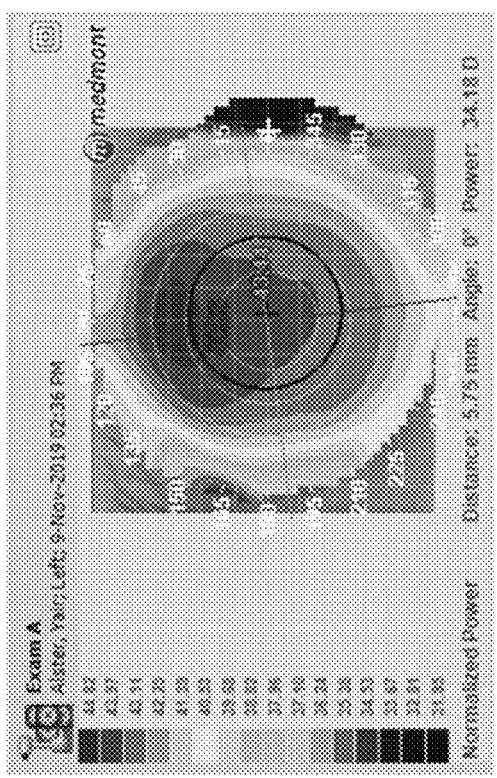
Figure 2B:
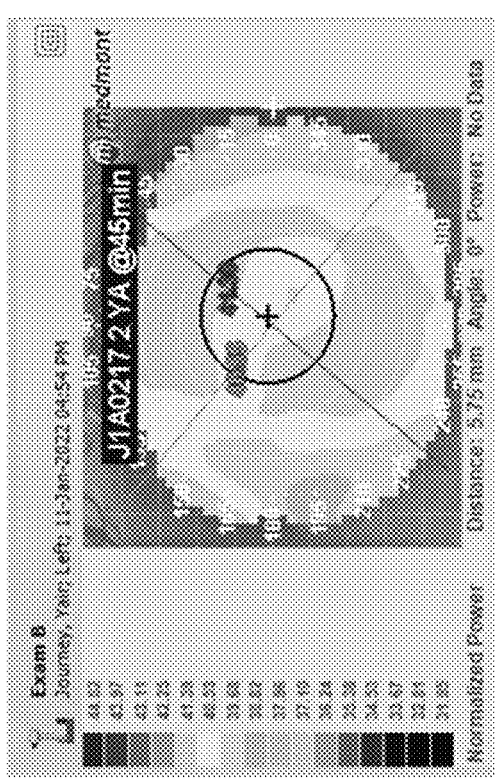

Three sets of astigmatism correcting eye lenses were prepared. The as-prepared eye lenses had a central thickness of 200 µm, 300 µm, and 400 µm, although other thicknesses have been contemplated. The bare eye characteristics of best refraction and corneal topography were measured in subjects having an astigmatism. Five subjects were fitted with the 400 µm thickness lens, three subjects were fitted with the 300 µm thickness eye lens, and one subject was fitted with the 200 µm thickness eye lens. The amount of astigmatism reduction was compared between the uncorrected eyes, eyes having the 200 µm thick lens, eyes having the 300 µm thick lens, and eyes having the 400 µm thick lenses. The subjects had an average astigmatism of 1.4 D±0.7 D. Subjects fitted with the 200 µm thick lens had an astigmatism reduction of about 1.5 D. Subjects fitted with the 300 µm thick lenses had an astigmatism reduction of about 0.6 D±0.1 D. Subjects fitted with the 400 µm thick lenses had an astigmatism reduction of about 0.7 D±0.1 D. All subjects having fitted lenses experienced a reduced astigmatism. FIGS. 2A and 2B illustrate the topography of a bare eye having an astigmatism, as compared with the topography of the same eye fitted with the astigmatism correcting lenses of the present disclosure, respectively. FIG. 2B shows a contact lens with a thickness at the optical region of 400 µm, a radius of curvature at the optical region of 7.86 mm, a juncture positioned 6.6 mm away from the center axis of the lens 330, the lens capable of masking 0.75 D of an astigmatism of the eye. FIG. 2C illustrates a subtraction of the images of FIG. 2B and FIG. 2A. Such a subtraction image represents the masking provided by the contact lens and the tear lens formed by the wearing of the lens. In some embodiments, the contact lens effectively reduces an astigmatism. As shown in FIGS. 2A and 2B, a darker color region indicates a larger gap (e.g., optical gap or physical gap) in comparison to a lighter color, which indicates a flatter region. As shown in FIG. 2C, a darker color region indicates a steeper region (e.g., optical gap or physical gap) in comparison to a lighter color which indicates a relatively flat region.

Example 2: Comparison of Juncture Characteristics

Figure 6:
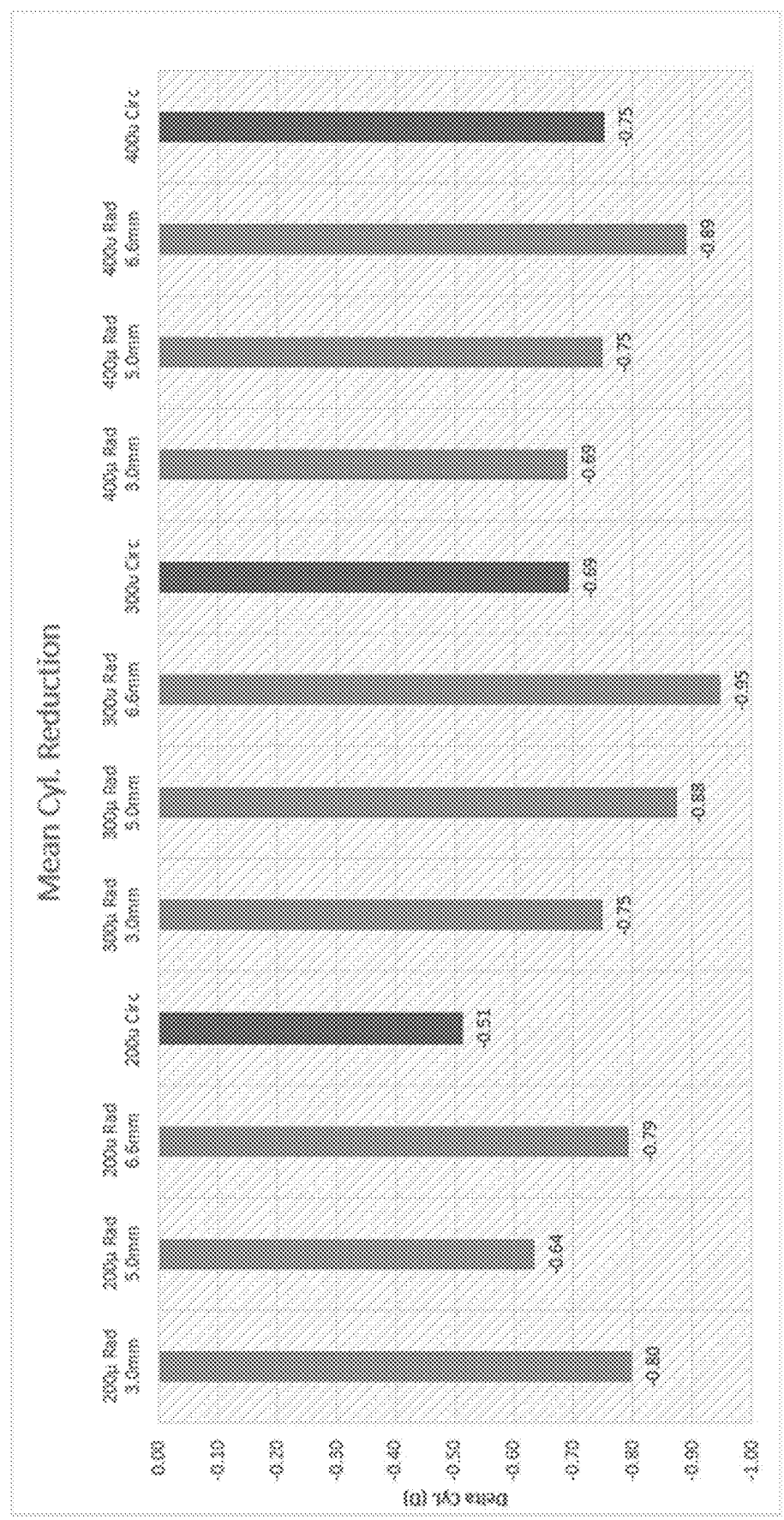
FIG. 6 shows the average (mean) cylinder reduction, according to some embodiments.

The lenses were prepared with varying combinations of thickness, discontinuity orientations, and location of discontinuity from the center of the lens. For example, the lenses comprised a thickness of 200 micrometers, 300 micrometers, or 400 micrometers, radial or circular discontinuities. The radial discontinuities were located 3.0 mm, 5.0 mm, or 6.6 mm from the center of the lens, whereas the circular discontinuity was located 3.3 mm from the center of the lens. 10 subjects with astigmatism ranging from 0.75 D to 2.5 D were each tested with a few versions of the lenses to determine a change in diopters (cylinders) as shown in FIG. 6. All versions had the same material and geometry, namely being made of a silicone hydrogel available as Unisil from Contamac, having a base curve of 7.87 mm, having a diameter of 14.5 mm, having 8 grooves, and having 8 fenestrations, each with a radius of 400 µm. All versions of the tested lenses reduced astigmatism by a range of 0.51 D to 0.95 D. A lens comprising a discontinuity result in improved astigmatism reduction. In some examples, the magnitude of the astigmatism reduction is related to variables such as lens thickness, discontinuity orientation, and/or location of the discontinuity on the lens. This demonstrates that discontinuities as provided herein can correct a refractive error of the eye. This shows that the level of correction may be tailored by various factors, including but not limited to thickness of the lens, distance of the discontinuities from the center of the lens, distance of the discontinuities from each other, and orientation of the discontinuities.

Example 3: Soft Contact Lenses with Vaulted Region

FIGS. 2A-2C illustrate the effectiveness of exemplary lenses comprising a vaulted region in masking an astigmatism. FIG. 2A shows the topography of a bare cornea having an astigmatism. FIG. 2B shows the topography of the same cornea covered with a lens of the disclosure. FIG. 2C shows the difference (i.e., subtraction) in topography of FIG. 2A and FIG. 2B (i.e., shows the power imparted through the contact lens and the tear lens). In some embodiments, the contact lens effectively reduces (e.g., masks) an astigmatism.

In the topography illustrations, a darker region indicates a larger physical or optical gap while a lighter region indicates a smaller physical or optical gap (i.e., more smooth topography).

Example 4: Exemplary Lenses

A non-limiting description of one specific embodiment is a soft contact lens is shown in FIG. 4B, where the inner portion (210) vaults over the steeper meridians and lies relatively flat over the flat meridians such that the front surface of the inner portion is more spheric than the cornea under it. Such lens has a peripheral portion (160) that substantially conforms to either meridian such that there is not much difference between the corneal sphericity and the sphericity of the peripheral part of the lens over it. Such lens also has a juncture (130) between the inner portion and the peripheral portion. Such a juncture is weakened such that it does not transfer the deformation from the peripheral portion of the lens to the inner portion of the lens. Such lens has one or more fenestrations 220 that allows fluid to flow under the lens such that the inner portion 210 can vault over the steep meridians 140. The space between the cornea and the posterior surface of the contact lens is filled with tear fluid which provides mechanical support to the vaulted portions of inner portion and plays an important optical role in reducing the effective astigmatism of the ocular system. The posterior surface of the lens can contain geometries such as discrete pooling areas, radial channels, or a circumferential channel that facilitate tear flow with anterior surface and tear distribution across the posterior surface. These posterior surface features may be integral with the juncture (130) or may traverse two or more of regions the inner portion, the peripheral portion, and the juncture.

Example 5: Astigmatism Masking in Subjects

Figure 7A:
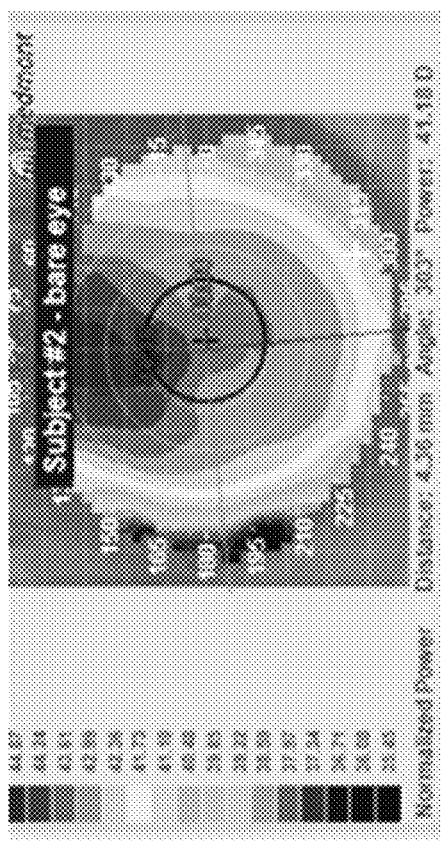
FIGS. 7A-7H illustrate the topography of four separate subjects' bare eye having an astigmatism, as compared with the topography of the same eye with an exemplary astigmatism correcting lens of the present disclosure.
Figure 7C:
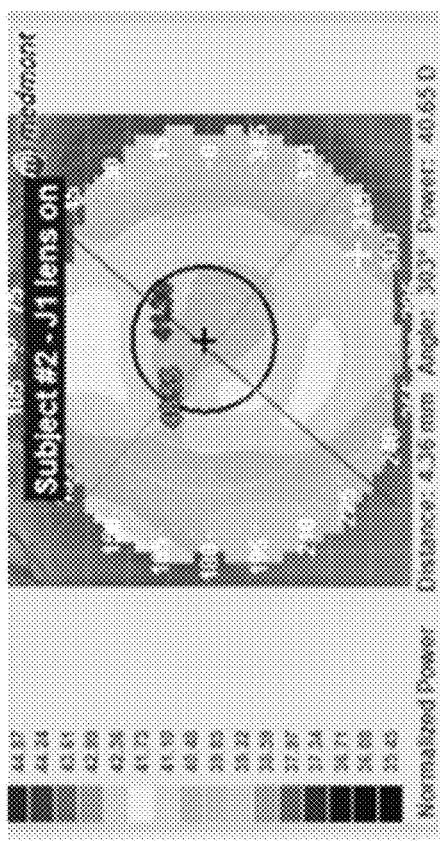
Figure 7B:
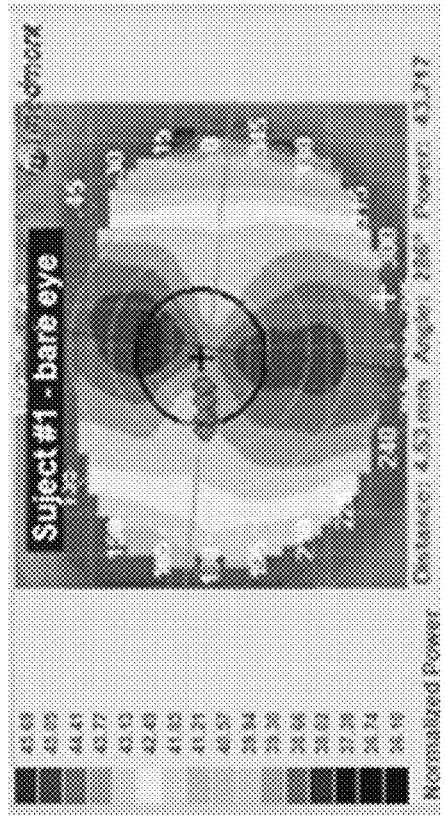
Figure 7D:
Figure 7G:
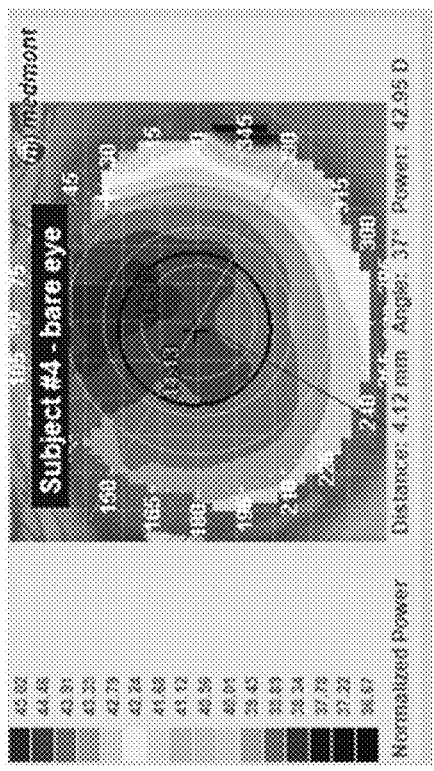
Figure 7H:
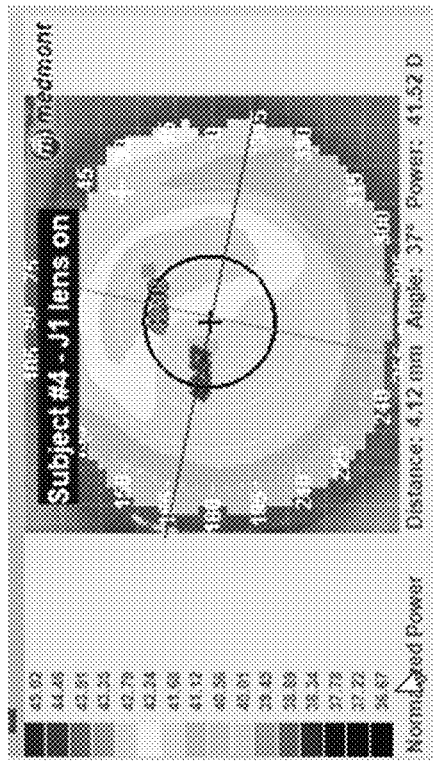
Figure 7E:
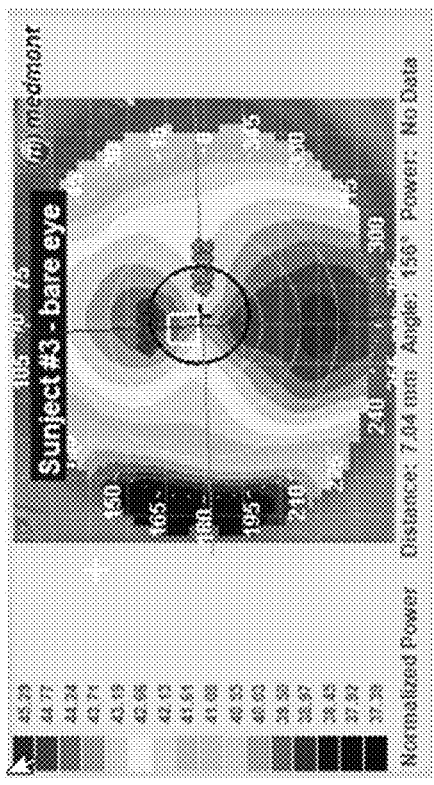
Figure 7F:
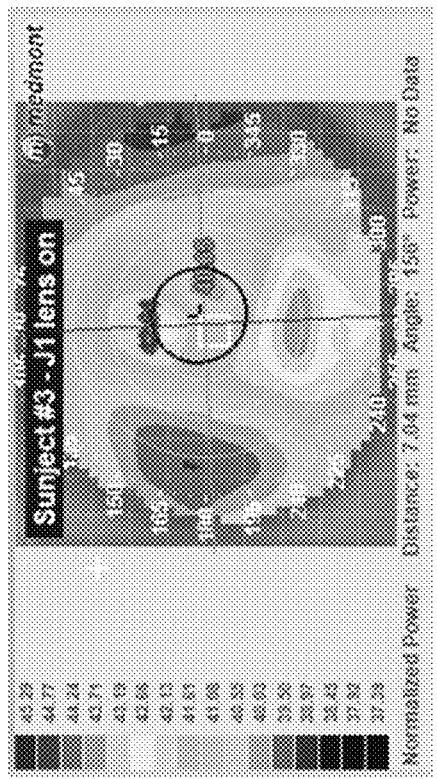

As shown in FIGS. 7A-7H, each subject tested with a soft contact lens of the present disclosure had a reduction in astigmatism of about 0.5 D to about 1 D. FIGS. 7A and 7B illustrate the topography of a bare eye of subject #1 having an astigmatism, as compared with the topography of the same eye fitted with the astigmatism correcting lenses of the present disclosure, respectively, reducing the astigmatism by 1 D. FIGS. 7C and 7D illustrate the topography of a bare eye of subject #2 having an astigmatism, as compared with the topography of the same eye fitted with the astigmatism correcting lenses of the present disclosure, respectively, reducing the astigmatism by 0.75 D. FIGS. 7E and 7F illustrate the topography of a bare eye of subject #3 having an astigmatism, as compared with the topography of the same eye fitted with the astigmatism correcting lenses of the present disclosure, respectively, reducing the astigmatism by 0.50 D. FIGS. 7G and 7H illustrate the topography of a bare eye of subject #4 having an astigmatism, as compared with the topography of the same eye fitted with the astigmatism correcting lenses of the present disclosure, respectively, reducing the astigmatism by 0.75 D. As shown in FIGS. 7A and 7H, a darker color region indicates a larger gap (e.g., optical gap or physical gap) in comparison to a lighter color (e.g., gray), which indicates a flatter, or smoother region.

Figure 8B:
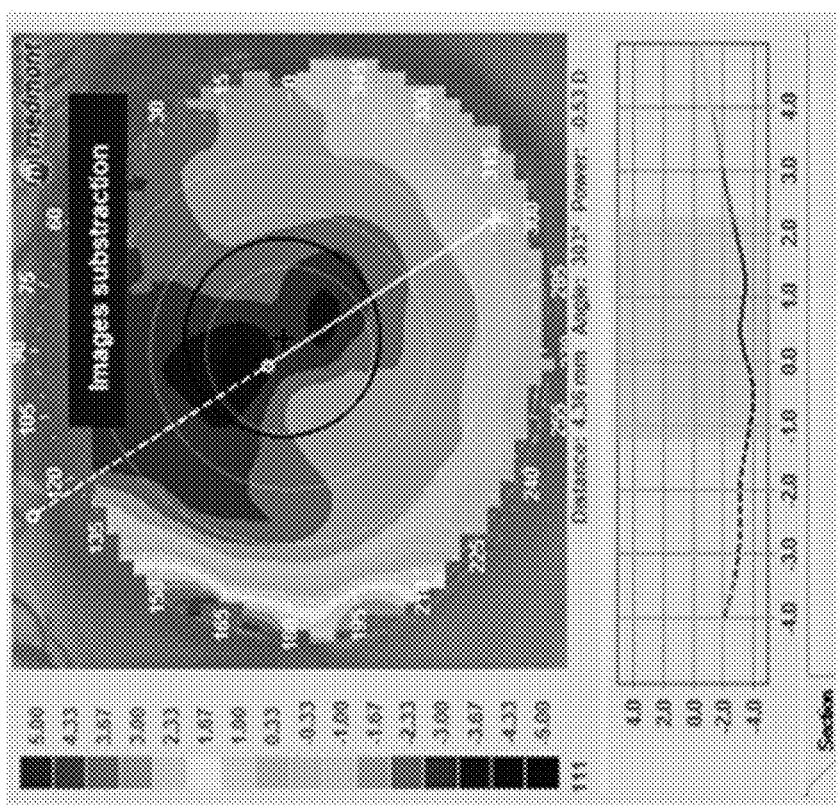
FIGS. 8A-8D illustrate the subtraction of the topography of an eye having a lens and a bare eye having an astigmatism, corresponding to subjects 1-4, respectively.
Figure 8A:
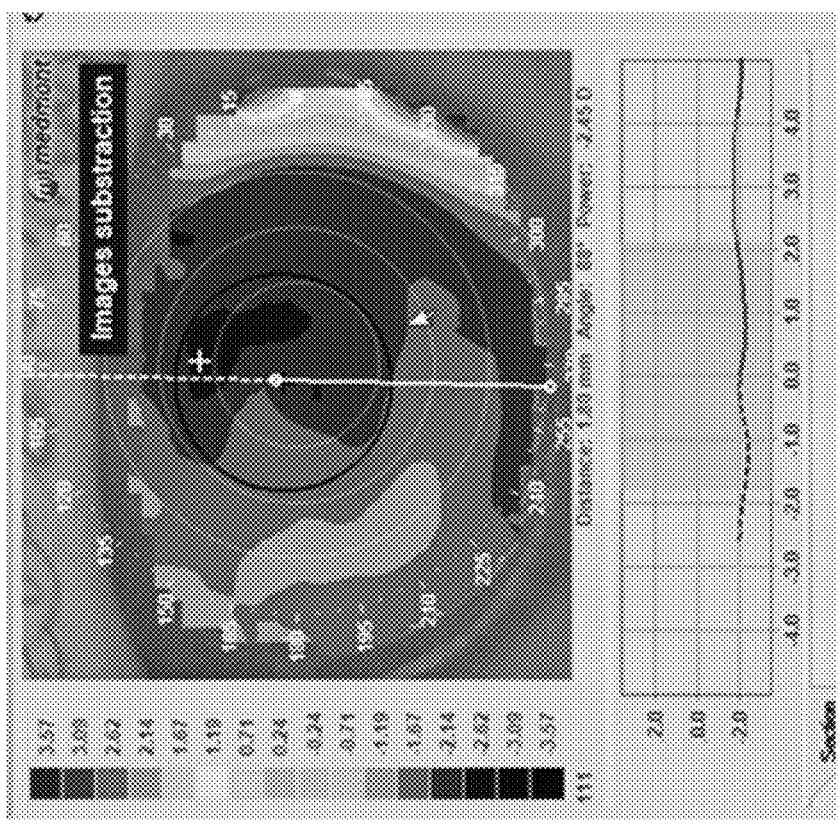
Figure 8D:
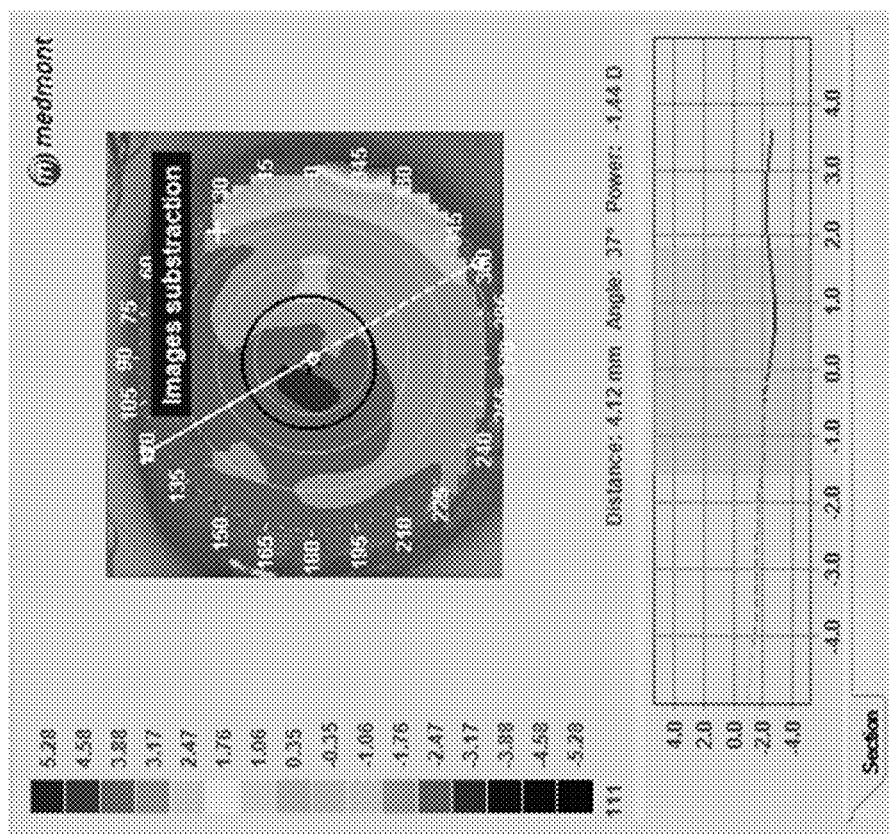
Figure 8C:
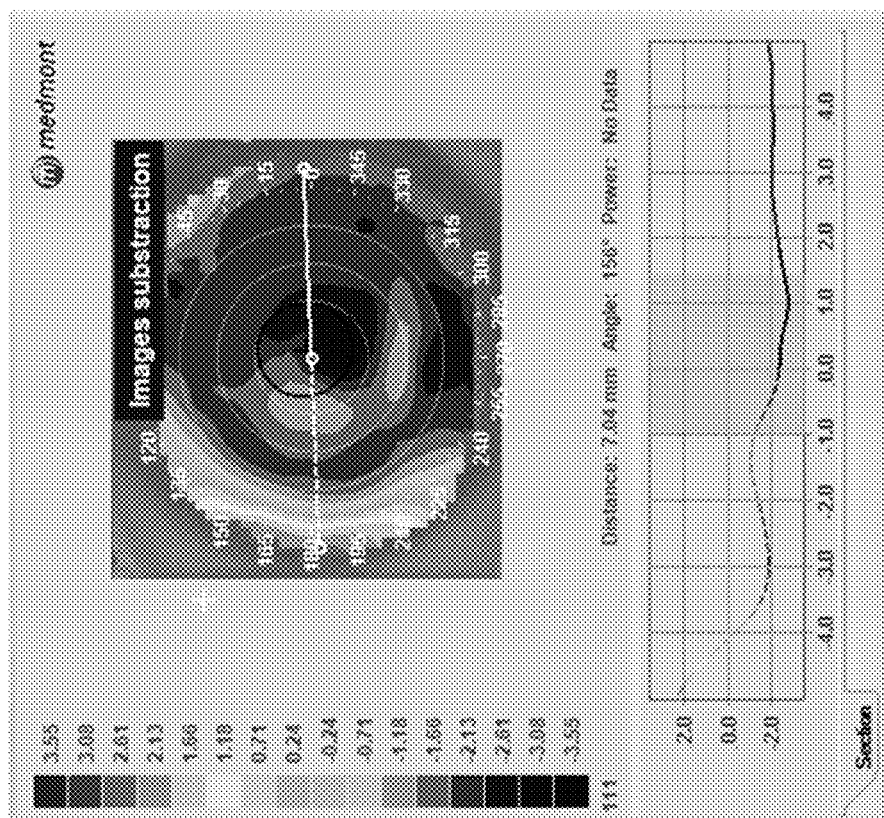

As shown in FIGS. 8A-8D, the difference in the topography of a cornea having the lens and the bare cornea having an astigmatism provides in the topography of the contact lens itself. FIG. 8A corresponds to subject 1, FIG. 8B corresponds to subject 2, FIG. 8C corresponds to subject 3, and FIG. 8D corresponds to subject 4. As shown in FIGS. 8A-8D, a darker region corresponds to a steeper meridian for which the lens effectively masked. The refraction and BCDVA results of each of the four subjects is presented in Table 1. The autorefractometer results of the subjects is presented in Table 2.

TABLE 1

Refraction and BCDVA result

| Subject | | Sphere | Cylinder | Astigmatism reduction | Axis | BCDVA |
|---|---|---|---|---|---|---|
| #1 | Bare eye | 1.5 | −2.75 | 1D | 180 | 20/25 |
| | J1 CL | 1.5 | −1.75 | | 175 | 20/25 |
| #2 | Bare eye | −3 | −0.75 | 0.75D | 170 | 20/20 |
| | J1CL | −3 | 0 | | | 20/25 |
| #3 | Bare eye | 2 | −1.25 | 0.5D | 170 | 20/20 |
| | J1CL | 2 | −0.75 | | 160 | 20/20 |
| #4 | Bare eye | −2.75 | −0.75 | 0.75D | 90 | 20/20 |
| | J1CL | −2.75 | 0 | | | 20/20 |

TABLE 2

Autorefractometer results

| | | | Bare Eye | |
|---|---|---|---|---|
| Subject | | Sphere | Cylinder | Axis |
| #1 | Bare eye | 1 | −2 | 180 |
| | J1 CL | 1 | −1 | 180 |

Figure 9C:
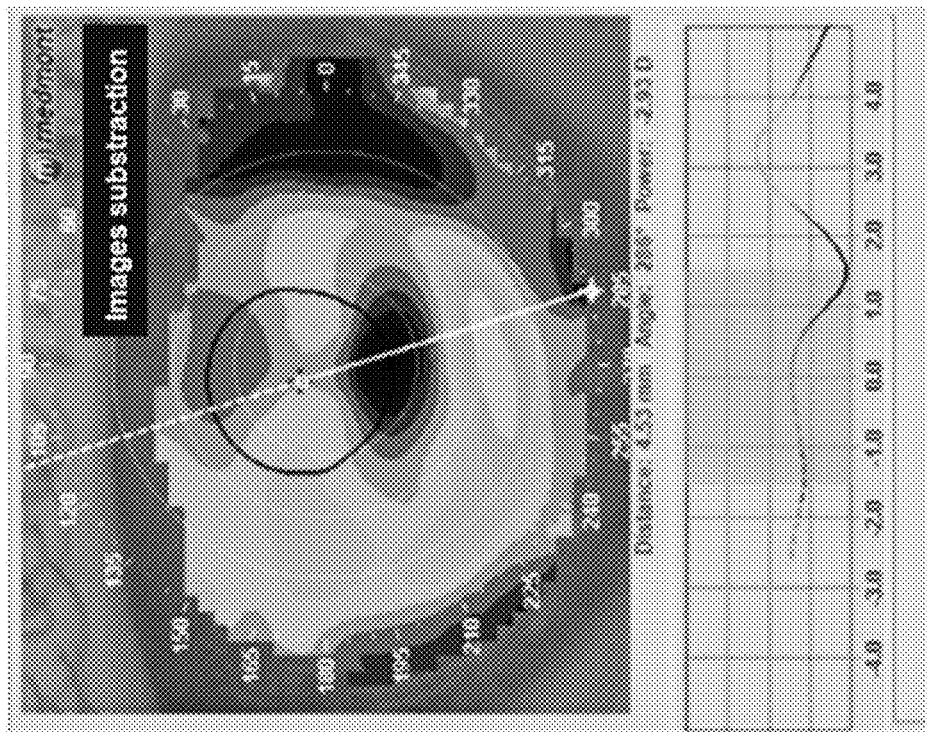
FIGS. 9A-9C illustrate the topography of subject 1's bare eye with an astigmatism and when fitted with a soft-toric lens to provide optical correction.
Figure 9A:
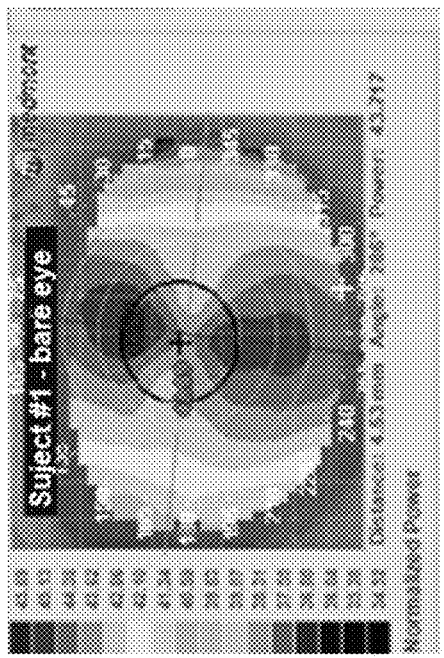
Figure 9B:
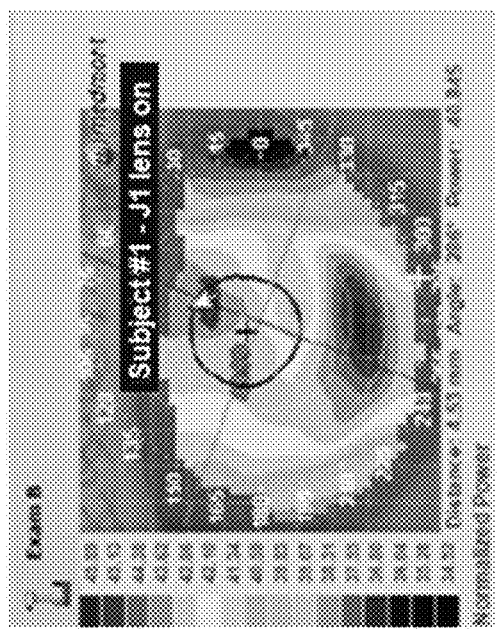

In comparison, FIGS. 9A-9C illustrate the effectiveness of masking an astigmatism with a soft-toric lens. FIG. 9A illustrates the topography of subject 1's bare eye, while FIG. 9B illustrates the same eye covered with a soft-toric lens. Here, a darker region depicts a larger physical or optical gap while a lighter region corresponds to a smoother region. FIG. 9C illustrates the subtraction of FIG. 9B and FIG. 9A to provide the topography of the soft-toric lens only, and demonstrates the contact lens's being able to mask an astigmatism. In some embodiments, the soft-toric lens effectively reduces an astigmatism.

Also, in comparison, FIGS. 12A-12C illustrate the effectiveness of masking an astigmatism with a rigid gas permeable (RGP) lens. FIG. 12A illustrates the topography of subject 2's bare eye, while FIG. 12B illustrates the same eye covered with the RGP lens. Here, a darker region depicts a larger physical or optical gap while a lighter region corresponds to a smoother region. FIG. 12C illustrates the subtraction of FIG. 12B and FIG. 12A to provide the topography of the RGP lens only, and demonstrates the contact lens's being able to mask an astigmatism. In some embodiments, the RGP lens effectively reduces an astigmatism.

What is claimed is:

1. A soft contact lens for correcting an ocular refractive error of an eye, the lens comprising: an inner portion, a peripheral portion, and a juncture connecting the inner portion and the peripheral portion, wherein the inner and peripheral portions have a single Young's modulus ranging from 0.1 MPa to 4 MPa; wherein the juncture is configured such that the inner portion vaults over a portion of a cornea to form a lenticular volume in between the inner portion and the cornea and at least a portion of the peripheral portion conforms to an ocular surface when the lens is placed on the eye; and wherein the juncture is configured to have a higher flexibility than both the peripheral portion and the inner portion; and wherein the juncture is configured to reduce a mechanical force transfer from the peripheral portion to the inner portion.

2. The lens of claim 1, wherein the juncture allows at least a portion of the peripheral portion deform without substantially deforming the inner portion.

3. The lens of claim 1, wherein the juncture allows at least a portion of the peripheral portion to conform to a corneal surface without substantially deforming the inner portion.

4. The lens of claim 1, wherein the juncture comprises one or more of flexibility, shape, thickness, curvature, dimension, or material property that is different than that of the inner portion.

5. The lens of claim 1, wherein the juncture comprises one or more of flexibility, shape, thickness, curvature, dimension, or material property that is different than that of the peripheral portion.

6. The lens of claim 1, wherein the juncture comprises a tensile modulus; wherein a ratio of the tensile modulus of the juncture to the inner portion is about 1:1 to about 1:100.

7. The lens of claim 1, wherein the juncture comprises a tensile strength; wherein a ratio of the tensile strength of the juncture to the inner portion is about 1:1 to about 1:100.

8. The lens of claim 1, wherein the juncture comprises one or more of a groove, a thinned region, a hinge, a slit, or a disconnected segment.

9. The lens of claim 1, wherein the juncture arranged in a substantially circular shape about a center of the lens.

10. The lens of claim 1, wherein the juncture has a thinner cross-section than the inner portion or the peripheral portion or the combination thereof.

11. The lens of claim 1, wherein the juncture has a width ranging from about 0.1 μm to about 2000 μm.

12. The lens of claim 1, wherein the juncture comprises one or more fenestrations.

13. The lens of claim 1, wherein the lenticular volume is formed between a posterior surface of the inner portion and a corneal surface of the eye.

14. The lens of claim 1, wherein the lenticular volume is filled with a fluid.

15. The lens of claim 1, wherein the lenticular volume forms a tear lens over the corneal surface.

16. The lens of claim 1, wherein a combination of the inner portion and the lenticular volume is configured to correct the ocular refractive error of the eye.

17. The lens of claim 1, wherein the ocular refractive error comprises a corneal irregularity, astigmatism, or higher order aberration of the eye.

18. The lens of claim 1, wherein an optical correction is provided by a combination of the inner portion and the lenticular volume.

19. The lens of claim 1, wherein the inner portion has a first radius of curvature and the peripheral portion has a second radius of curvature.

20. The lens of claim 1, wherein the juncture connects an outer circumference of the inner portion and an inner circumference of the peripheral portion.

21. The lens of claim 1, wherein when the peripheral portion is subject to a deformation the first radius of curvature of the inner portion changes less than the second radius of the curvature of the peripheral portion.

22. The lens of claim 1, wherein the inner portion and peripheral portion have the same radius of curvature when the juncture is in a neutral position.

23. The lens of claim 1, wherein the inner portion and the peripheral portion have a different radius of curvature when the juncture is in a flexed position.

24. The lens of claim 1, wherein the juncture is configured to bend to allow the peripheral portion to have a different angle than the inner portion.

25. The lens of claim 1, wherein the first radius of curvature of the inner portion changing less than the second radius of the curvature of the peripheral portion when the peripheral portion is subject to a deformation refers to the peripheral portion deforming from the juncture to increase the second radius of curvature.

26. The lens of claim 1, wherein a thickness of the peripheral portion varies from the inner circumference to an outer circumference of the peripheral portions.

27. The lens of claim 1, wherein one or more mechanical properties of the peripheral portion varies from the inner circumference to an outer circumference of the peripheral portions.

28. The lens of claim 1, wherein one or more mechanical properties of the peripheral portion varies based on distance from the juncture.

29. A method for correcting an ocular refractive error of the eye, the method comprising providing a soft contact lens according to claim 1; placing said soft contact lens to an ocular surface of the eye.

* * * * *